(12) United States Patent
Peng et al.

(10) Patent No.: US 11,977,810 B2
(45) Date of Patent: May 7, 2024

(54) MULTI-SCREEN COLLABORATIVE DISPLAY METHOD AND ELECTRONIC DEVICE

(71) Applicant: HUAWEI TECHNOLOGIES CO., LTD., Guangdong (CN)

(72) Inventors: Guanqi Peng, Wuhan (CN); Xiaoxiao Duan, Wuhan (CN); Jinbo Wang, Wuhan (CN); Xiaofei Zhong, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/254,472

(22) PCT Filed: Nov. 30, 2021

(86) PCT No.: PCT/CN2021/134390
§ 371 (c)(1),
(2) Date: May 25, 2023

(87) PCT Pub. No.: WO2022/111727
PCT Pub. Date: Jun. 2, 2022

(65) Prior Publication Data
US 2024/0053946 A1    Feb. 15, 2024

(30) Foreign Application Priority Data
Nov. 30, 2020   (CN) .......................... 202011381303.4

(51) Int. Cl.
*G06F 3/14*    (2006.01)
(52) U.S. Cl.
CPC ................. *G06F 3/1462* (2013.01)

(58) Field of Classification Search
CPC .................................................... G06F 3/1462
See application file for complete search history.

(56) References Cited

U.S. PATENT DOCUMENTS

| 5,612,744 A | * | 3/1997 | Lee | ...... H04N 19/105 |
| | | | | 375/E7.133 |
| 5,805,221 A | * | 9/1998 | Lee | ........... G06T 9/20 |
| | | | | 375/240.1 |

(Continued)

FOREIGN PATENT DOCUMENTS

| CN | 103281539 A | * | 9/2013 | ......... H04N 19/132 |
| CN | 111459428 A | | 7/2020 | |

OTHER PUBLICATIONS

Extended European Search Report in European Appln No. 21897227.1, dated Mar. 21, 2024, 8 pages.

*Primary Examiner* — Benyam Ketema
(74) *Attorney, Agent, or Firm* — Fish & Richardson P.C.

(57) ABSTRACT

An example method includes displaying a first interface image. The first interface image is encoded to obtain encoded data of the first interface image. Encoded information of the first interface image is sent to the second electronic device. An $i^{th}$ frame of interface image is displayed in response to an update operation on the first interface image. N difference regions in the $i^{th}$ frame of interface image compared with an $(i-1)^{th}$ frame of interface image are obtained. If an area proportion of the N difference regions in the $i^{th}$ frame of interface image is less than a preset value, image content of the N difference regions is encoded to obtain first encoded data. First encoded information is sent to the second electronic device, where the first encoded (Continued)

information includes the first encoded data and location information of the N difference regions in the $i^{th}$ frame of interface image.

20 Claims, 33 Drawing Sheets

(56) References Cited

U.S. PATENT DOCUMENTS

| | | | | |
|---|---|---|---|---|
| 2005/0114646 | A1* | 5/2005 | Rekimoto | H04M 7/0027 |
| | | | | 713/150 |
| 2006/0136127 | A1* | 6/2006 | Coch | G09B 29/10 |
| | | | | 701/468 |
| 2012/0001832 | A1* | 1/2012 | Braghis | H04N 19/132 |
| | | | | 345/2.2 |
| 2012/0159472 | A1* | 6/2012 | Hong | H04W 4/21 |
| | | | | 709/204 |
| 2013/0147903 | A1* | 6/2013 | Weiser | H04L 65/1053 |
| | | | | 348/E7.083 |
| 2013/0222275 | A1* | 8/2013 | Byrd | G06F 3/0488 |
| | | | | 345/173 |
| 2013/0308633 | A1* | 11/2013 | Bergkvist | H04L 65/1069 |
| | | | | 370/352 |
| 2013/0339536 | A1* | 12/2013 | Burckart | H04L 12/1822 |
| | | | | 709/227 |
| 2014/0002389 | A1* | 1/2014 | Kim | H04N 21/43615 |
| | | | | 345/1.3 |
| 2014/0258441 | A1* | 9/2014 | L'Heureux | H04L 12/66 |
| | | | | 709/217 |
| 2014/0317530 | A1* | 10/2014 | Chang | H04M 1/72412 |
| | | | | 715/748 |
| 2014/0365580 | A1* | 12/2014 | Azenkot | G06F 3/0346 |
| | | | | 709/205 |
| 2015/0339090 | A1* | 11/2015 | Lee | G06F 3/0488 |
| | | | | 345/173 |
| 2015/0346937 | A1* | 12/2015 | Mahmoudian-Bidgoly | |
| | | | | G06F 16/954 |
| | | | | 715/753 |
| 2016/0065717 | A1* | 3/2016 | Ilmonen | H04W 4/60 |
| | | | | 455/410 |
| 2016/0366713 | A1* | 12/2016 | Sonnino | G09G 5/12 |
| 2018/0121663 | A1* | 5/2018 | Hassan | G06F 21/84 |
| 2018/0316893 | A1* | 11/2018 | Rosenberg | H04N 7/152 |
| 2020/0333994 | A1* | 10/2020 | Sepulveda | G06F 3/04817 |
| 2020/0402393 | A1* | 12/2020 | Jonietz | G08G 1/0133 |

* cited by examiner

|  | Encoding | First timestamp | Second timestamp | First reference timestamp |
|---|---|---|---|---|
| First interface image |  |  | T0 | $T1_{1\text{-}jz} = T0$ |
| First frame of interface image | First frame of interface image (I frame or P frame) | T1 |  | $T2_{1\text{-}jz} = T1$ |
| Second frame of interface image | N difference regions of the second frame | T2 |  | $T3_{1\text{-}jz} = T2_{1\text{-}jz} = T1$ |
| Third frame of interface image | N difference regions of the third frame | T3 |  | $T4_{1\text{-}jz} = T3_{1\text{-}jz} = T2_{1\text{-}jz} = T1$ |
| Fourth frame of interface image | Fourth frame of interface image (I frame or P frame) | T4 |  | $T5_{1\text{-}jz} = T4$ |
| Fifth frame of interface image | N difference regions of the fifth frame | T5 |  |  |

FIG. 11B

MULTI-SCREEN COLLABORATIVE DISPLAY METHOD AND ELECTRONIC DEVICE

CROSS-REFERENCE TO RELATED APPLICATIONS

This application is a National Stage of International Application No. PCT/CN2021/134390, filed on Nov. 30, 2021, which claims priority to Chinese Patent Application No. 202011381303.4, filed on Nov. 30, 2020. Both of the aforementioned applications are hereby incorporated by reference in their entireties.

TECHNICAL FIELD

Embodiments of this application relate to the field of distributed control technologies, and in particular, to a multi-screen collaborative display method and an electronic device.

BACKGROUND

In a multi-screen collaboration scenario, after a connection (for example, a wired connection or a wireless connection) is established between a projection device (for example, a mobile phone) and a projected device (for example, a personal computer (PC)), the mobile phone may project an interface image of the mobile phone onto the PC for display.

In a first usage scenario, in a process in which the mobile phone performs projection onto the PC, the mobile phone may receive an update operation performed by a user on the interface image. In response to the update operation, the mobile phone may update the interface image of the mobile phone, and indicate the PC to also update an interface image of the PC.

In a second usage scenario (referred to as a reverse control scenario), in a process in which the mobile phone performs projection onto the PC, which may receive an update operation performed by a user on an interface image displayed by the PC. The PC may receive the update operation performed by the user on the PC. Then, the PC sends an update instruction to the mobile phone, to indicate the mobile phone to update the interface image in response to the update instruction. In response to the update instruction, the mobile phone may update the interface image of the mobile phone, and indicate the PC to also update the interface image of the PC.

That the mobile phone indicates the PC to update the interface image may specifically include: The mobile phone encodes an updated interface image to obtain encoded data; the mobile phone transmits the encoded data to the PC; the PC receives the encoded data, and decodes the encoded data to obtain the updated interface image; and the PC displays the updated interface image.

Due to long encoding and decoding time, network fluctuation, and the like, frame freezing occurs when the PC updates the interface image in a multi-screen collaboration scenario. In addition, as a user has an increasingly high requirement on a display image resolution of a device, a frame freezing problem that occurs in the multi-screen collaboration scenario becomes more serious. Especially in the foregoing reverse control scenario, only when the PC receives the update operation and sends the update instruction to the mobile phone, the mobile phone can update the interface image in response to the update instruction, and indicate the PC to update the interface image. This undoubtedly increases time spent on updating the interface image on the PC, and further increases a possibility of frame freezing when the PC updates the interface image.

SUMMARY

This application provides a multi-screen collaborative display method and an electronic device, to resolve a frame freezing problem that occurs when a second electronic device updates an interface image in a multi-screen collaboration scenario.

To achieve the foregoing objectives, the following technical solutions are used in this application:

A first aspect provides a multi-screen collaborative display method, applied to a first electronic device, where the first electronic device is connected to a second electronic device. The display method includes: The first electronic device first displays a first interface image, and encodes the first interface image to obtain encoded data of the first interface image, then the first electronic device sends encoded information of the first interface image to the second electronic device, if the first electronic device receives an update operation on the first interface image, the first electronic device displays, in response to the update operation, an $i^{th}$ frame of interface image, and obtains N difference regions in the $i^{th}$ frame of interface image compared with an $(i-1)^{th}$ frame of interface image, if an area proportion of the N difference regions in the $i^{th}$ frame of interface image is less than a preset value, the first electronic device encodes image content of the N difference regions, to obtain first encoded data; and finally the first electronic device sends first encoded information to the second electronic device.

The encoded information of the first interface image includes the encoded data of the first interface image, the encoded information of the first interface image is used to trigger the second electronic device to display a first projection interface based on the encoded information of the first interface image, and content of the first projection interface is a mirror image of the first interface image. The update operation is used to trigger the first electronic device to sequentially display M frames of interface images, where M is a positive integer. i is sequentially set to values in {1, . . . , M}, a $0^{th}$ frame of interface image is the first interface image, a pixel value of a pixel in the N difference regions is different from a pixel value of a corresponding pixel in the $(i-1)^{th}$ frame of interface image, and N is a positive integer. The first encoded information includes the first encoded data and location information of the N difference regions in the $i^{th}$ frame of interface image, the first encoded information is used to trigger the second electronic device to update, based on the first encoded information, the $(i-1)^{th}$ frame of interface image to obtain a second projection interface and display the second projection interface, and content of the second projection interface is a mirror image of the $i^{th}$ frame of interface image.

According to the multi-screen collaborative display method provided in the first aspect, the first electronic device displays the first interface image, and projects the content of the first interface image onto the second electronic device. If the first electronic device receives the update operation on the first interface image, the first electronic device displays the M frames of interface images, and obtains the N difference regions in the $i^{th}$ frame of interface image compared with the $(i-1)^{th}$ frame of interface image. If the area proportion of the N difference regions in the $i^{th}$ frame of interface image is less than the preset value, the first electronic device encodes only the N difference regions to obtain the first encoded data, and then sends the first encoded information including the first encoded data to the second electronic device. The N difference regions include the pixels that are in the $i^{th}$ frame of interface image and whose pixel values are different from those of the $(i-1)^{th}$ frame of interface image. In this case, encoding the N difference regions by the first electronic device is encoding content that is in the $i^{th}$ frame of interface image and that is different from that in the $(i-1)^{th}$ frame of interface image. Compared with encoding the $i^{th}$ frame of interface image, this can reduce time spent on encoding and decoding and an amount of the first encoded data. In addition, transmission duration of the first encoded data may also be shortened by transmitting a small amount of the first encoded data. Further, because the time spent on encoding and decoding is reduced and the transmission duration of the first encoded data is shortened, the second electronic device may update the $(i-1)^{th}$ frame of interface image more quickly by using the first encoded information including the first encoded data, and display the mirror image of the $i^{th}$ frame of interface image. In this way, the frame freezing problem that occurs when the second electronic device updates the interface image in the multi-screen collaboration scenario can be resolved.

In a possible design manner, that the first electronic device receives an update operation on the first interface image includes: The first electronic device receives an update instruction from the second electronic device, where the update instruction is triggered by an update operation on the first projection interface; or the first electronic device receives the update operation performed by a user on the first interface image displayed by the first electronic device.

In this design manner, several usage scenarios of the display method are described. In a first usage scenario, the first electronic device directly receives the update operation performed by the user on the first interface image displayed by the first electronic device, updates the interface image of the first electronic device, and indicates (or triggers) the second electronic device to update the interface image. In a reverse control scenario, the second electronic device receives the update operation performed by the user on the first interface image displayed by the first electronic device, and then sends an update instruction to the first electronic device. In response to the update instruction, the first electronic device updates the interface image of the first electronic device, and indicates (or triggers) the second electronic device to update the interface image.

It can be learned from the foregoing analysis that by using the display method, the second electronic device can update the $(i-1)^{th}$ frame of interface image more quickly by using the first encoded information including the first encoded data, and display the mirror image of the $i^{th}$ frame of interface image. Therefore, in the reverse control scenario, after receiving the update operation of the user, the second electronic device quickly updates the $(i-1)^{th}$ frame of interface image by using the first encoded information including the first encoded data, which indicates that a delay in reverse control performed by the first electronic device on the second electronic device is short. In other words, when the display method is used in the reverse control scenario, the delay in reverse control performed by the first electronic device on the second electronic device can be reduced.

In another possible design manner, the obtaining N difference regions in the $i^{th}$ frame of interface image compared with an $(i-1)^{th}$ frame of interface image includes: The first electronic device compares a pixel value of each pixel in the $i^{th}$ frame of interface image with a pixel value of a corresponding pixel in the $(i-1)^{th}$ frame of interface image, to obtain a difference pixel in the $i^{th}$ frame of interface image; and the first electronic device determines the N difference regions including the difference pixel in the $i^{th}$ frame of interface image. A pixel value of the difference pixel is different from the pixel value of the corresponding pixel in the $(i-1)^{th}$ frame of interface image.

In this design manner, an implementation in which the first electronic device obtains the N difference regions in the $i^{th}$ frame of interface image compared with the $(i-1)^{th}$ frame of interface image is described.

In another possible design manner, the display method further includes: If the area proportion of the N difference regions in the $i^{th}$ frame of interface image is greater than the preset value, the first electronic device encodes the $i^{th}$ frame of interface image, to obtain second encoded data, and the first electronic device sends second encoded information to the second electronic device, where the second encoded information includes the second encoded data, the second encoded information is used to trigger the second electronic device to display a third projection interface based on the second encoded information, and content of the third projection interface is the mirror image of the $i^{th}$ frame of interface image.

In this design manner, if the area proportion of the N difference regions in the $i^{th}$ frame of interface image is greater than the preset value, time spent on encoding and decoding the N difference regions is similar to time spent on encoding and decoding the $i^{th}$ frame of interface image. In other words, when the first electronic device encodes the N difference regions and then sends the encoded N difference regions to the second electronic device or encodes the $i^{th}$ frame of interface image and then sends the encoded $i^{th}$ frame of interface image to the second electronic device, frame freezing degrees do not differ greatly when the second electronic device updates the interface image. Therefore, the first electronic device may encode the $i^{th}$ frame of interface image by using a conventional technology and transmit the encoded $i^{th}$ frame of interface image when the area proportion of the N difference regions in the $i^{th}$ frame of interface image is greater than the preset value.

In another possible design manner, the display method further includes: The first electronic device generates a first timestamp of the $i^{th}$ frame in response to the update operation, where the first timestamp of the $i^{th}$ frame is used to record a time at which the first electronic device generates the $i^{th}$ frame of interface image, and the second encoded information further includes the first timestamp of the $i^{th}$ frame.

In this design manner, an implementation in which the first electronic device generates the second encoded information is described. Considering that although the first electronic device sequentially sends, to the second electronic device based on a sequence of generating the M frames of interface images, encoded information (that is, the first encoded information or the second encoded information) corresponding to the M frames of interface images, due to different amounts of encoded data, network fluctuation, or the like, a sequence in which the second electronic device receives the plurality of pieces of encoded information (that is, the first encoded information or the second encoded information) may be different from the sequence in which the second electronic device generates the M frames of interface images. For example, when the first electronic device sequentially sends, to the second electronic device, the encoded information (that is, the first encoded information or the second encoded information) corresponding to the $i^{th}$ frame of interface image and the encoded information (that is, the first encoded information or the second encoded information) corresponding to the $(i+1)^{th}$ frame of interface image, due to different amounts of encoded data, network fluctuation, or the like, the second electronic device may first receive the encoded information corresponding to the $(i+1)^{th}$ frame of interface image, and then receive the encoded information corresponding to the $i^{th}$ frame of interface image. Therefore, both the first encoded information and the second encoded information may include the first timestamp of the $i^{th}$ frame, to indicate that the second electronic device may display the interface image in a time sequence with reference to the first timestamp.

In another possible design manner, the display method further includes: The first electronic device generates a second timestamp, and saves the second timestamp, where the second timestamp is used to record a time at which the first electronic device generates the first interface image, the second timestamp is a first reference timestamp of a first frame, and the first reference timestamp is a reference time at which the first electronic device records projection; and if the area proportion of the N difference regions in the $i^{th}$ frame of interface image is greater than the preset value, the first electronic device determines that a first reference timestamp of an $(i+1)^{th}$ frame is the first timestamp of the $i^{th}$ frame; or if the area proportion of the N difference regions in the $i^{th}$ frame of interface image is less than the preset value, the first electronic device determines that the first reference timestamp of the $(i+1)^{th}$ frame is a first reference timestamp of the $i^{th}$ frame. The first encoded information further includes the first timestamp of the $i^{th}$ frame and the first reference timestamp of the $i^{th}$ frame.

It may be understood that if the area proportion of the N difference regions in the $i^{th}$ frame of interface image compared with the $(i-1)^{th}$ frame of interface image (N difference regions of the $i^{th}$ frame for short) in the $i^{th}$ frame of interface image is less than the preset value, it indicates that the $i^{th}$ frame of interface image differs slightly from the $(i-1)^{th}$ frame of interface image. In addition, if an area proportion of N difference regions in the $(i-1)^{th}$ frame of interface image compared with an $(i-2)^{th}$ frame of interface image (N difference regions of the $(i-1)^{th}$ frame for short) in the $(i-2)^{th}$ frame of interface image is greater than the preset value, it indicates that the $(i-1)^{th}$ frame of interface image differs greatly from the $(i-2)^{th}$ frame of interface image. The $i^{th}$ frame of interface image differs slightly from the $(i-1)^{th}$ frame of interface image, so that the $i^{th}$ frame of interface image also differs greatly from the $(i-2)^{th}$ frame of interface image.

Likewise, if an area proportion of N difference regions in an $(i-k)^{th}$ frame of interface image compared with an $(i-k-1)^{th}$ frame of interface image (N difference regions of the $(i-k)^{th}$ frame for short) in the $(i-k)^{th}$ frame of interface image is greater than the preset value, it indicates that the $(i-k)^{th}$ frame of interface image differs greatly from the $(i-k-1)^{th}$ frame of interface image and other interface images before the $(i-k-1)^{th}$ frame of interface image, where k is a positive integer. In addition, if an area proportion of N difference regions of any frame from an $(i-k+1)^{th}$ frame of interface image to the $i^{th}$ frame of interface image in any frame of interface image is less than the preset value, it indicates that the $i^{th}$ frame of interface image differs slightly from the $(i-k)^{th}$ frame of interface image and frames of interface images between the $(i-k)^{th}$ frame of interface image and the $i^{th}$ frame of interface image. Therefore, if the second electronic device first receives first encoded information of the $i^{th}$ frame of interface image before the $(i-k)^{th}$ frame of interface image due to different amounts of encoded data, network fluctuation, or the like, and displays content of the $i^{th}$ frame of interface image by using the received first encoded information before displaying the $(i-k)^{th}$ frame of interface image, a problem of picture misplacement occurs.

For the problem of picture misplacement, when determining that the area proportion of the N difference regions in the $i^{th}$ frame of interface image is greater than or equal to the preset value, the first electronic device uses the first timestamp of the $i^{th}$ frame as the first reference timestamp of the $(i+1)^{th}$ frame; otherwise, the first electronic device uses the first reference timestamp of the $i^{th}$ frame as the first reference timestamp of the $(i+1)^{th}$ frame. With reference to the foregoing description of "an area proportion of N difference regions of an $(i-k)^{th}$ frame in the $(i-k)^{th}$ frame of interface image is greater than the preset value", it may be learned that a first reference timestamp of the $(i-k+1)^{th}$ frame is equal to a first timestamp of the $(i-k)^{th}$ frame of interface image. With reference to the foregoing description of "an area proportion of N difference regions of any frame from an $(i-k+1)^{th}$ frame of interface image to the $i^{th}$ frame of interface image in any frame of interface image is less than the preset value", it may be learned that a first reference timestamp of any frame from the $(i-k+1)^{th}$ frame of interface image to the $i^{th}$ frame is equal to the first reference timestamp of the $(i-k+1)^{th}$ frame. Because the first reference timestamp of the $(i-k+1)^{th}$ frame is equal to the first timestamp of the $(i-k)^{th}$ frame of interface image, the first reference timestamp of the $i^{th}$ frame is equal to the first timestamp of the $(i-k)^{th}$ frame of interface image.

In addition, the first electronic device carries the first timestamp of the $i^{th}$ frame and the first reference timestamp of the $i^{th}$ frame in the first encoded information. Because the first reference timestamp of the $i^{th}$ frame is equal to the first timestamp of the $(i-k)^{th}$ frame of interface image, the first reference timestamp of the $i^{th}$ frame can be used to indicate the second electronic device to display the content of the $i^{th}$ frame of interface image after the $(i-k)^{th}$ frame of interface image. In this way, a problem of picture misplacement generated because the content of the $i^{th}$ frame of interface image is displayed before the $(i-k)^{th}$ frame of interface image can be avoided.

A second aspect provides a multi-screen collaborative display method, applied to a second electronic device, where the second electronic device is connected to a first electronic device. The display method includes: The second electronic device displays a first projection interface, where content of the first projection interface is a mirror image of a first interface image displayed by the first electronic device; the second electronic device receives first encoded information from the first electronic device, where the first encoded information includes first encoded data and location information of N difference regions in an $i^{th}$ frame of interface image compared with an $(i-1)^{th}$ frame of interface image; the second electronic device decodes the first encoded data to obtain image content of the N difference regions; and the second electronic device displays a second projection interface.

The $i^{th}$ frame of interface image is generated by the first electronic device in response to an update operation, and the update operation is used to trigger the first electronic device to sequentially display M frames of interface images. M is a positive integer, i is sequentially set to values in $\{1, \ldots, M\}$, and a $0^{th}$ frame of interface image is the first interface image. A pixel value of a pixel in the N difference regions is different from a pixel value of a corresponding pixel in the $(i-1)^{th}$ frame of interface image, where N is a positive integer. The first encoded data is obtained by encoding the image content of the N difference regions. Content of the second projection interface is a mirror image of the $i^{th}$ frame of interface image, and the $i^{th}$ frame of interface image is obtained by updating the $(i-1)^{th}$ frame of interface image based on the image content of the N difference regions and the location information.

The second aspect provides a multi-screen collaborative display method applied to the second electronic device, and the second electronic device displays the content of the first interface image projected from the first electronic device. The second electronic device may receive the first encoded information from the first electronic device, decode the first encoded data in the first encoded information to obtain the image content of the N difference regions, and then display the second projection interface. Because the content of the second projection interface is the mirror image of the $i^{th}$ frame of interface image, and the $i^{th}$ frame of interface image is obtained by updating the $(i-1)^{th}$ frame of interface image based on the image content and location information of the N difference regions, it may be learned that the second projection interface may display an updated interface image by using the image content of the N difference regions obtained through decoding. Because the N difference regions are content that is in the $i^{th}$ frame of interface image and that is different from the $(i-1)^{th}$ frame of interface image, the first encoded data obtained by encoding the N difference regions is less than other encoded data obtained by encoding the $i^{th}$ frame of interface image. Further, time spent by the second electronic device on decoding the first encoded data is less than time spent on decoding the other encoded data, so that the second electronic device may update the $(i-1)^{th}$ frame of interface image more quickly by using the first encoded information including the first encoded data, and display the mirror image of the $i^{th}$ frame of interface image. In this way, the frame freezing problem that occurs when the second electronic device updates the interface image in the multi-screen collaboration scenario can be resolved.

In a possible design manner, before the second electronic device receives the first encoded information from the first electronic device, the display method further includes: The second electronic device receives the update operation performed by a user on the first projection interface, and sends an update instruction to the first electronic device in response to the update operation.

The update instruction is used to trigger the first electronic device to sequentially display the M frames of interface images. The second electronic device receives, by using an external device connected to the second electronic device, the update operation on the first projection interface, where the external device includes any one of a display, a remote control, a mouse, or a stylus of the second electronic device.

In this design manner, a reverse control scenario of the display method is described. In the reverse control scenario, the second electronic device receives the update operation performed by the user on the first interface image displayed by the first electronic device, and then sends the update instruction to the first electronic device to indicate (or trigger) the first electronic device to update the interface image.

In another possible implementation, the display method further includes: The second electronic device receives second encoded information from the first electronic device, where the second encoded information includes second encoded data, and the second encoded data is obtained by encoding the $i^{th}$ frame of interface image; the second electronic device decodes the second encoded data to obtain the $i^{th}$ frame of interface image; and the second electronic device displays a third projection interface, where content of the third projection interface is the mirror image of the $i^{th}$ frame of interface image.

In this design manner, another implementation in which the second electronic device updates the interface image is described.

In another possible design, the second encoded information further includes a first timestamp of the $i^{th}$ frame, and the first timestamp of the $i^{th}$ frame is used to record a time at which the first electronic device generates the $i^{th}$ frame of interface image. After the second electronic device receives the second encoded information from the first electronic device, the display method further includes: The second electronic device determines that a second reference timestamp of an $(i+1)^{th}$ frame is the first timestamp of the $i^{th}$ frame, where the second reference timestamp is a reference time at which the second electronic device records projection.

In this design manner, after the second electronic device receives the second encoded information of the $i^{th}$ frame of interface image, it indicates that an area proportion of the N difference regions of the $i^{th}$ frame in the $i^{th}$ frame of interface image is greater than a preset value, and that the area proportion of the N difference regions of the $i^{th}$ frame in the $i^{th}$ frame of interface image is greater than the preset value indicates that the $i^{th}$ frame of interface image differs greatly from the $(i-1)^{th}$ frame of interface image. Therefore, the $(i+1)^{th}$ frame of interface image differs greatly from the $(i-1)^{th}$ frame of interface image, so that the first timestamp of the $i^{th}$ frame in the second encoded information is used as the second reference timestamp of the $(i+1)^{th}$ frame.

In another possible design manner, the first encoded information further includes the first timestamp of the $i^{th}$ frame and a first reference timestamp of the $i^{th}$ frame, where the first reference timestamp is a reference time at which the first electronic device records projection. After the second electronic device receives the first encoded information from the first electronic device, and before the second electronic device decodes the first encoded data to obtain the image content of the N difference regions, the display method further includes: The second electronic device determines that a time recorded by the first timestamp of the $i^{th}$ frame is later than a time recorded by the first reference timestamp of the $i^{th}$ frame, and the time recorded by the first reference timestamp of the $i^{th}$ frame is equal to a time recorded by the second reference timestamp of the $i^{th}$ frame.

In this design manner, if the second electronic device receives the second encoded information of the $(i-1)^{th}$ frame of interface image (second encoded information of the $(i-1)^{th}$ frame for short), the second electronic device uses a first timestamp of the (i-1)th frame in the second encoded information of the $(i-1)^{th}$ frame as the second reference timestamp of the $i^{th}$ frame (that is, the second reference timestamp of the $i^{th}$ frame is equal to the first timestamp of the $(i-1)^{th}$ frame), and further displays content of the $(i-1)^{th}$ frame of interface image by using the second encoded information of the $(i-1)^{th}$ frame. That the second encoded information of the $(i-1)^{th}$ frame is received indicates that an area proportion of N difference regions of the $(i-1)^{th}$ frame in the $(i-1)^{th}$ frame of interface image is greater than the preset value, and that the area proportion of the N difference regions of the $(i-1)^{th}$ frame in the $(i-1)^{th}$ frame of interface image is greater than the preset value indicates that the $(i-1)^{th}$ frame of interface image differs greatly from an $(i-2)^{th}$ frame of interface image. Therefore, the $i^{th}$ frame of interface image differs more greatly from the $(i-2)^{th}$ frame of interface image. Then, if the second electronic device further receives the first encoded information of the $i^{th}$ frame of interface image (the first encoded information of the $i^{th}$ frame for short), it indicates that the area proportion of the N difference regions of the $i^{th}$ frame in the $i^{th}$ frame of interface image is less than the preset value, and that the area proportion of the N difference regions of the $i^{th}$ frame in the $i^{th}$ frame of interface image is less than the preset value indicates that the $i^{th}$ frame of interface image differs slightly from the $(i-1)^{th}$ frame of interface image. The first encoded information of the $i^{th}$ frame of interface image may include the first reference timestamp of the $i^{th}$ frame. When determining that the area proportion of the N difference regions of the $(i-1)^{th}$ frame in the $(i-1)^{th}$ frame of interface image is greater than the preset value, the first electronic device uses the first timestamp of the $(i-1)^{th}$ frame as the first reference timestamp of the $i^{th}$ frame, that is, the first reference timestamp of the $i^{th}$ frame is equal to the first timestamp of the $(i-1)^{th}$ frame. Further, because the second reference timestamp of the $i^{th}$ frame is equal to the first timestamp of the $(i-1)$th frame, it can be learned that the first reference timestamp of the $i^{th}$ frame is equal to the second reference timestamp of the $i^{th}$ frame.

In conclusion, it can be learned that, when the first reference timestamp of the $i^{th}$ frame is equal to the second reference timestamp of the $i^{th}$ frame, it indicates that the $i^{th}$ frame of interface image differs slightly from the $(i-1)^{th}$ frame of interface image, and further indicates that the second electronic device already displays the content of the $(i-1)$th frame of interface image. In this case, when the first reference timestamp of the $i^{th}$ frame is equal to the second reference timestamp of the $i^{th}$ frame, the second electronic device displays the content of the $i^{th}$ frame of interface image by using the first encoded information of the $i^{th}$ frame. Because the content of the $i^{th}$ frame of interface image differs slightly from the content of the displayed $(i-1)^{th}$ frame of interface image, a problem of picture misplacement because a sequence in which the second electronic device receives encoded information (that is, the first encoded information or the second encoded information) corresponding to the M frames of interface images is different from a sequence in which the first electronic device generates the M frames of interface images can be avoided.

A third aspect provides a first electronic device. The first electronic device includes an apparatus, a module, or a unit for performing the first aspect and the possible methods in the first aspect.

A fourth aspect provides a second electronic device. The second electronic device includes an apparatus, a module, or a unit for performing the second aspect and the possible methods in the second aspect.

A fifth aspect provides a first electronic device, where the first electronic device includes a processor and a memory. The memory is configured to store computer program code, and the computer program code includes computer instructions. The processor is configured to run the computer instructions, so that the first electronic device is enabled to perform the method according to any one of the first aspect and the possible design manners of the first aspect.

A sixth aspect provides a second electronic device, where the second electronic device includes a processor and a memory. The memory is configured to store computer program code, and the computer program code includes computer instructions. The processor is configured to run the computer instructions, so that the second electronic device is enabled to perform the method according to any one of the second aspect and the possible design manners of the second aspect.

A seventh aspect provides a computer-readable storage medium, where the computer-readable storage medium stores computer instructions, and when the computer instructions are run on a first electronic device, the first electronic device is enabled to perform the method according to any one of the first aspect and the possible design manners of the first aspect.

An eighth aspect provides a computer-readable storage medium, where the computer-readable storage medium stores computer instructions, and when the computer instructions are run on a second electronic device, the second electronic device is enabled to perform the method according to any one of the second aspect and the possible design manners of the second aspect.

A ninth aspect further provides a computer program product, including one or more instructions, where the one or more instructions may be run on a first electronic device, so that the first electronic device is enabled to perform the method according to any one of the first aspect and the possible design manners of the first aspect.

A tenth aspect further provides a computer program product, including one or more instructions, where the one or more instructions may be run on a second electronic device, so that the second electronic device is enabled to perform the method according to any one of the second aspect and the possible design manners of the second aspect.

For technical effects brought by any one of the third aspect and the possible design manners of the third aspect, the fifth aspect, the seventh aspect, and the ninth aspect of this application, refer to technical effects brought by different design manners in the first aspect. For technical effects brought by any one of the fourth aspect and the possible design manners of the fourth aspect, the sixth aspect, the eighth aspect, and the tenth aspect, refer to technical effects brought by different design manners in the second aspect. Details are not described herein again.

BRIEF DESCRIPTION OF DRAWINGS

FIG. 8(a)-1 to FIG. 8(b)-2 each are a schematic diagram 1 of multi-screen display in a first usage scenario according to an embodiment of this application;

FIG. 11B is a time sequence diagram in which a first electronic device displays an interface image and updates a timestamp according to an embodiment of this application;

FIG. 15(a)-1 to FIG. 15(b)-2 each are a schematic diagram 1 of multi-screen display in a reverse control scenario according to an embodiment of this application;

DESCRIPTION OF EMBODIMENTS

Terms such as "first" and "second" mentioned below are merely intended for a purpose of description, and shall not be understood as an indication or implication of relative importance or implicit indication of a quantity of indicated technical features. Therefore, a feature limited by "first", "second" and the like may explicitly indicate or implicitly include one or more such features.

Currently, in a multi-screen collaboration scenario, after a connection (for example, a wired connection or a wireless connection) is established between a first electronic device (for example, a mobile phone) and a second electronic device (for example, a PC), the first electronic device may project an interface image of the first electronic device onto the second electronic device for display. The wireless connection may be a Bluetooth connection, a near field communication (NFC) connection, or a Wireless Fidelity (Wi-Fi) connection.

In a first usage scenario, in a process in which a first electronic device projects an interface to a second electronic device, the first electronic device may receive an update operation performed by a user on an interface image. In response to the update operation, the first electronic device may update an interface image of the first electronic device, and indicate (or trigger) the second electronic device to also update an interface image of the second electronic device.

The first usage scenario may include a multi-screen extension scenario and a multi-screen non-mirroring scenario. In the multi-screen extension scenario, the first electronic device generates and displays a first interface image. The first electronic device further generates a second interface image, and indicates (or triggers) the second electronic device to display a mirror image of the second interface image. The first electronic device does not display the second interface image. In the multi-screen non-mirroring scenario, the first electronic device may display a first interface image. The first electronic device further displays a second interface image, and indicates (or triggers) the second electronic device to display a mirror image of the second interface image.

Figure 1:
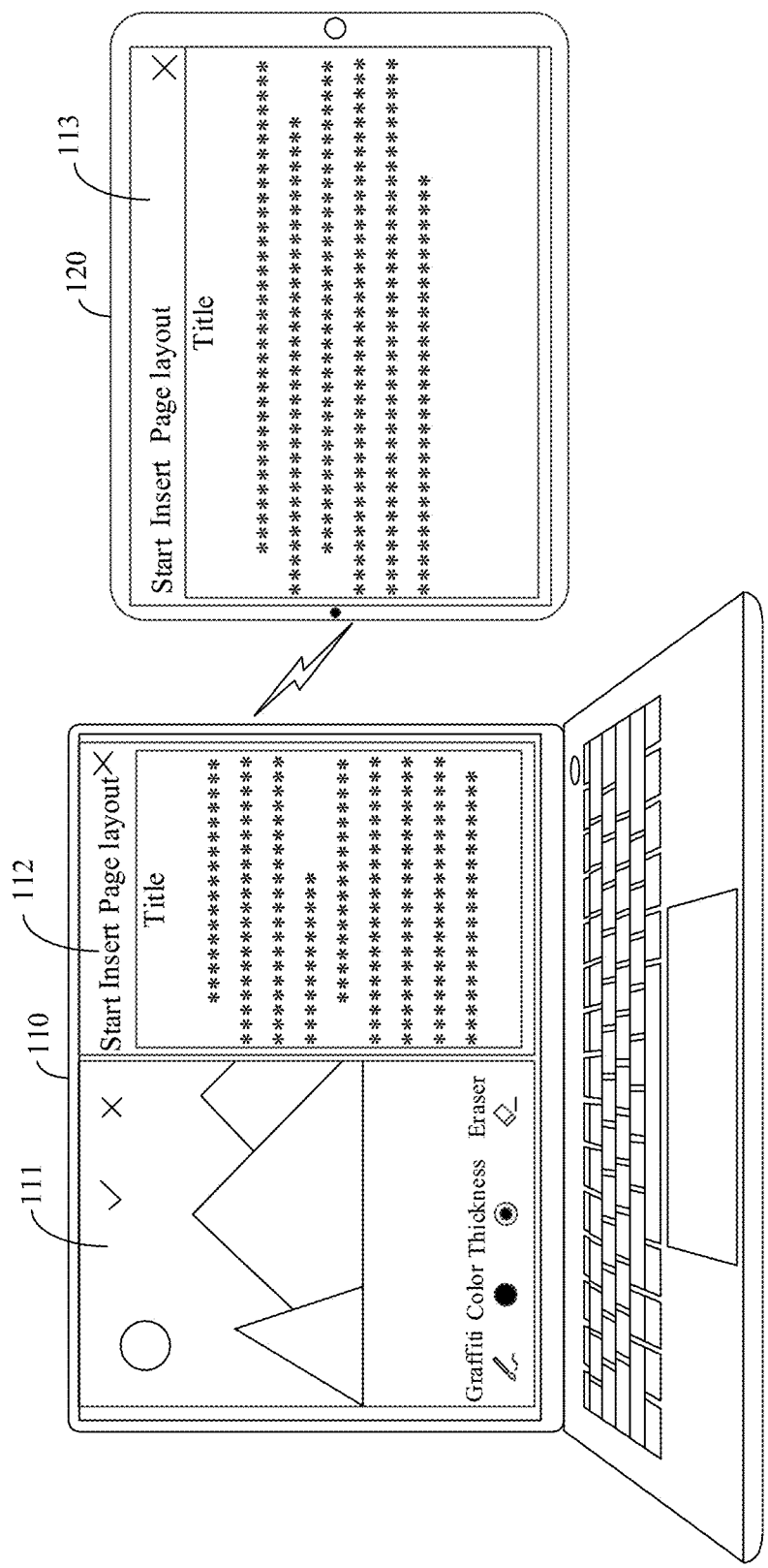
FIG. 1 is a schematic diagram of multi-screen display in a multi-screen non-mirroring scenario according to a conventional technology.

For example, the first electronic device is a notebook computer and the second electronic device is a tablet computer. As shown in FIG. 1, in a multi-screen non-mirroring scenario, a notebook computer 110 is connected to a tablet computer 120 in a wireless connection manner. The notebook computer 110 displays a first interface image 111 and a second interface image 112. The tablet computer also indicates the tablet computer 120 to display a mirror image 113 of the second interface image 112. Content of the first interface image 111 includes picture editing options such as "Graffiti", "Color", "Thickness", and "Eraser". Content of the second interface image 112 includes a "Title", and further includes document operation options such as "Start", "Insert", and "Page Layout".

Figure 2:
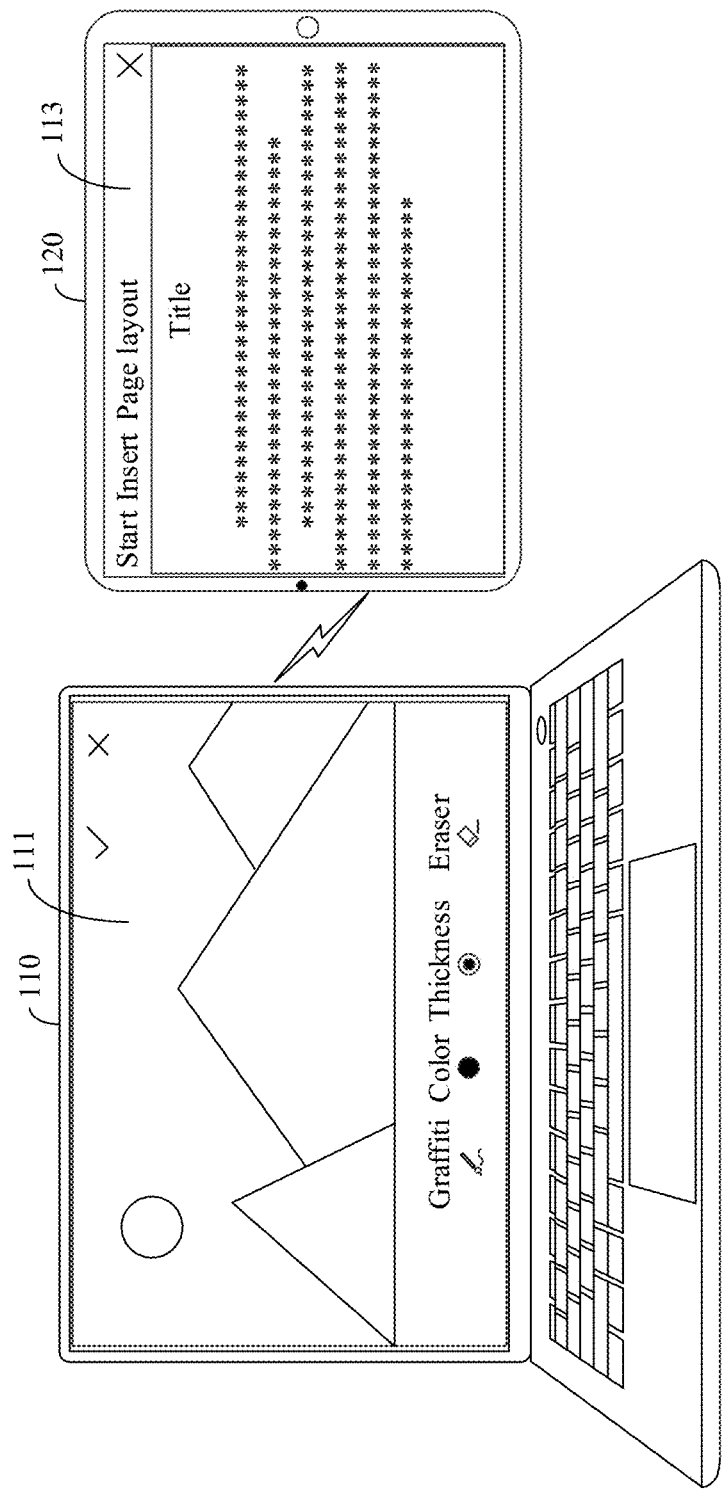
FIG. 2 is a schematic diagram of multi-screen display in a multi-screen extension scenario according to a conventional technology.

For example, the first electronic device is a notebook computer and the second electronic device is a tablet computer. As shown in FIG. 2, in a multi-screen extension scenario, a notebook computer 110 is connected to a tablet computer 120 in a wireless connection manner. The notebook computer 110 generates and displays a first interface image 111. The notebook computer 110 further generates a second interface image 112, and indicates the tablet computer 120 to display a mirror image 113 of the second interface image 112. The notebook computer 110 does not display the second interface image 112.

In a second usage scenario (referred to as a reverse control scenario), in a process in which a first electronic device projects an interface to a second electronic device, the second electronic device may further receive an update operation performed by a user on an interface image displayed by the second electronic device. The second electronic device may receive, by using an external device such as a stylus, a remote control, or a mouse connected to the second electronic device, an update operation performed by a user on the second electronic device, and then sends an update instruction to the first electronic device, to indicate (or trigger) the first electronic device to update an interface image in response to the update instruction. In response to the update instruction, the first electronic device may update the interface image of the first electronic device, and indicate (or trigger) the second electronic device to also update the interface image of the second electronic device.

The reverse control scenario may include a multi-screen mirroring scenario and the foregoing multi-screen non-mirroring scenario. In the multi-screen mirroring scenario, after a first electronic device projects an interface onto a second electronic device, the second electronic device may display, in a full-screen or non-full-screen manner, content displayed by the first electronic device. In the multi-screen mirroring scenario, the second electronic device may display the content displayed by the first electronic device in a full-screen manner. In the multi-screen mirroring scenario, the second electronic device may display the content displayed by the first electronic device in a non-full-screen manner, and the second electronic device does not display other content.

Figure 3:
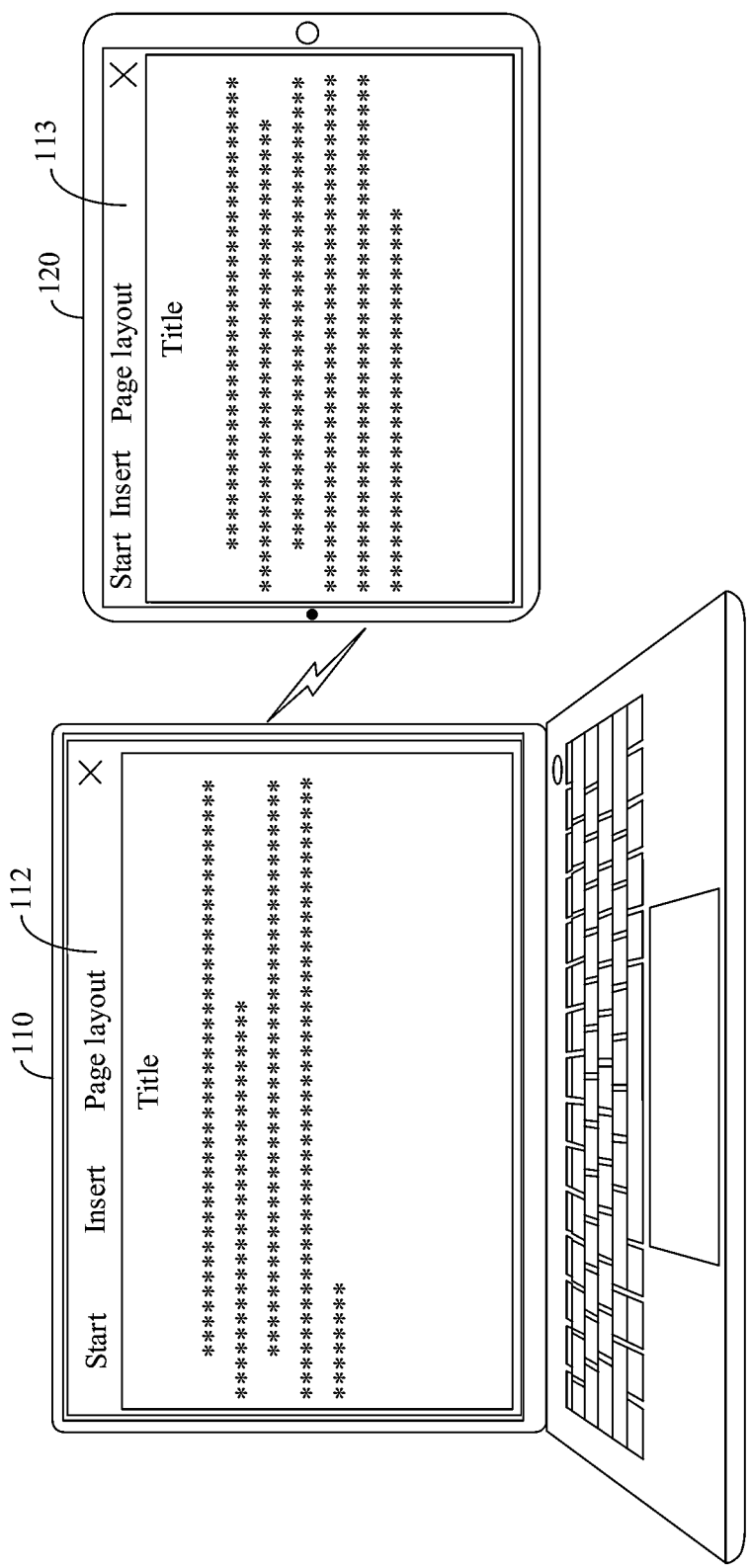
FIG. 3 is a schematic diagram of multi-screen display in a multi-screen mirroring scenario according to a conventional technology.

For example, the first electronic device is a notebook computer and the second electronic device is a tablet computer. As shown in FIG. 3, in a multi-screen mirroring scenario, a notebook computer 110 is connected to a tablet computer 120 in a wireless connection manner. The notebook computer 110 displays a second interface image 112, and indicates the tablet computer 120 to display a mirror image 113 of the second interface image 112. The tablet computer 120 displays the mirror image 113 of the second interface image 112 in a full-screen manner.

In the foregoing solution, that the first electronic device indicates (or triggers) the second electronic device to update the interface image may specifically include: The first electronic device encodes the updated interface image by using a codec standard such as H.262, H.263, or H.264, to obtain encoded data; the first electronic device transmits the encoded data to the second electronic device; the second electronic device receives the encoded data, and decodes the encoded data by using a same codec standard as that of the first electronic device, to obtain the updated interface image; and the second electronic device displays the updated interface image.

However, because an entire interface image is encoded in the foregoing solution, encoding and decoding consume a long time, and the encoded data has a large amount. In addition, the large amount of the encoded data increases a transmission time of the encoded data. Both a long encoding and decoding time and a long transmission time cause that the second electronic device updates, by using the encoded data sent by the first electronic device, the interface image slowly. In the multi-screen collaboration scenario, if the second electronic device updates the interface image slowly, obvious frame freezing occurs when the second electronic device updates the interface image. Further, as a user has an increasingly high requirement on a display image resolution of a device, a frame freezing problem that occurs in the multi-screen collaboration scenario becomes more and more serious. Especially in the foregoing reverse control scenario, only when the second electronic device receives the update operation and sends the update instruction to the first electronic device, the first electronic device can update the interface image in response to the update instruction, and indicate (or trigger) the second electronic device to update the interface image. This undoubtedly increases time spent on updating the interface image on the second electronic device, and further increases a possibility of frame freezing when the second electronic device updates the interface image.

Figure 4:
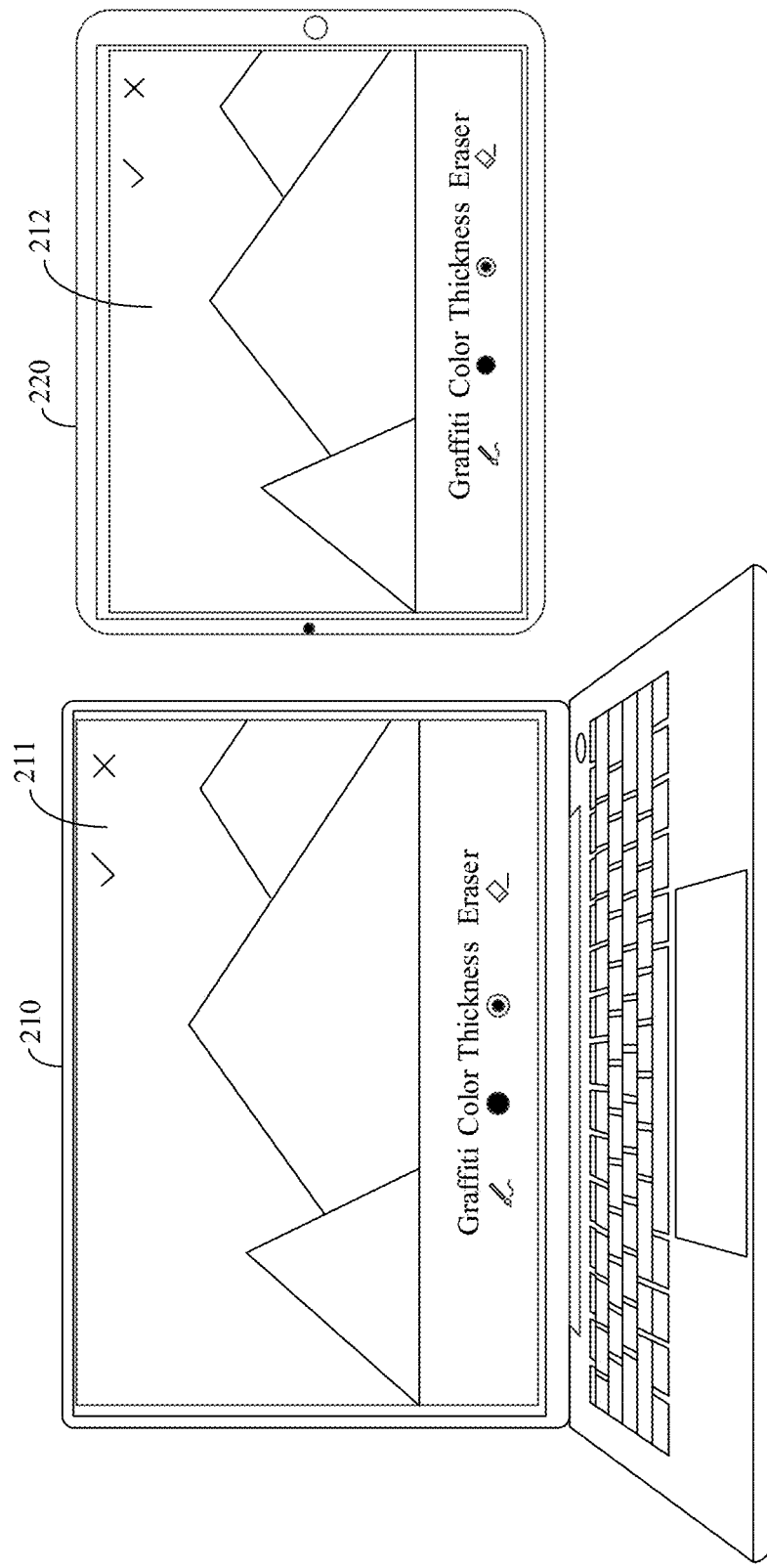
FIG. 4 is a schematic diagram of multi-screen display in a multi-screen scenario according to a conventional technology.

For example, a process of updating an interface image in the foregoing solution is described by using an example in which the first electronic device is a notebook computer and the second electronic device is a tablet computer. As shown in FIG. 4, a notebook computer 210 is connected to a tablet computer 220 in a wireless connection manner. The notebook computer 210 displays a frame of interface image (for example, an editing interface image 211 for editing a picture) and projects content of the editing interface image 211 onto the tablet computer 220. The tablet computer 220 displays a mirror image 212 of the editing interface image 211. It can be learned from FIG. 4 that the content of the editing interface image 211 includes a plurality of picture editing options, such as "Graffiti", "Color", "Thickness", and "Eraser".

Further, when the tablet computer 220 displays the content of the editing interface image 211, the tablet computer 220 receives an update operation performed by a user on the editing interface image 211 (for example, drawing a heart on the editing interface image). After receiving the drawing operation, the tablet computer 220 sends an update instruction to the notebook computer 210 to indicate the notebook computer 210 to display the drawn heart in response to the update instruction. The notebook computer 210 sequentially displays, in response to the update instruction, a plurality of frames of interface images in a heart drawing process. The notebook computer 210 further encodes each frame of interface image of the plurality of frames of interface images to obtain encoded data, and transmits the encoded data to the tablet computer 220. However, due to reasons such as a long encoding and decoding time and a large amount of the encoded data, it takes a long time for the tablet computer 220 to receive and decode each frame of interface image after receiving the drawing operation.

Figure 5:
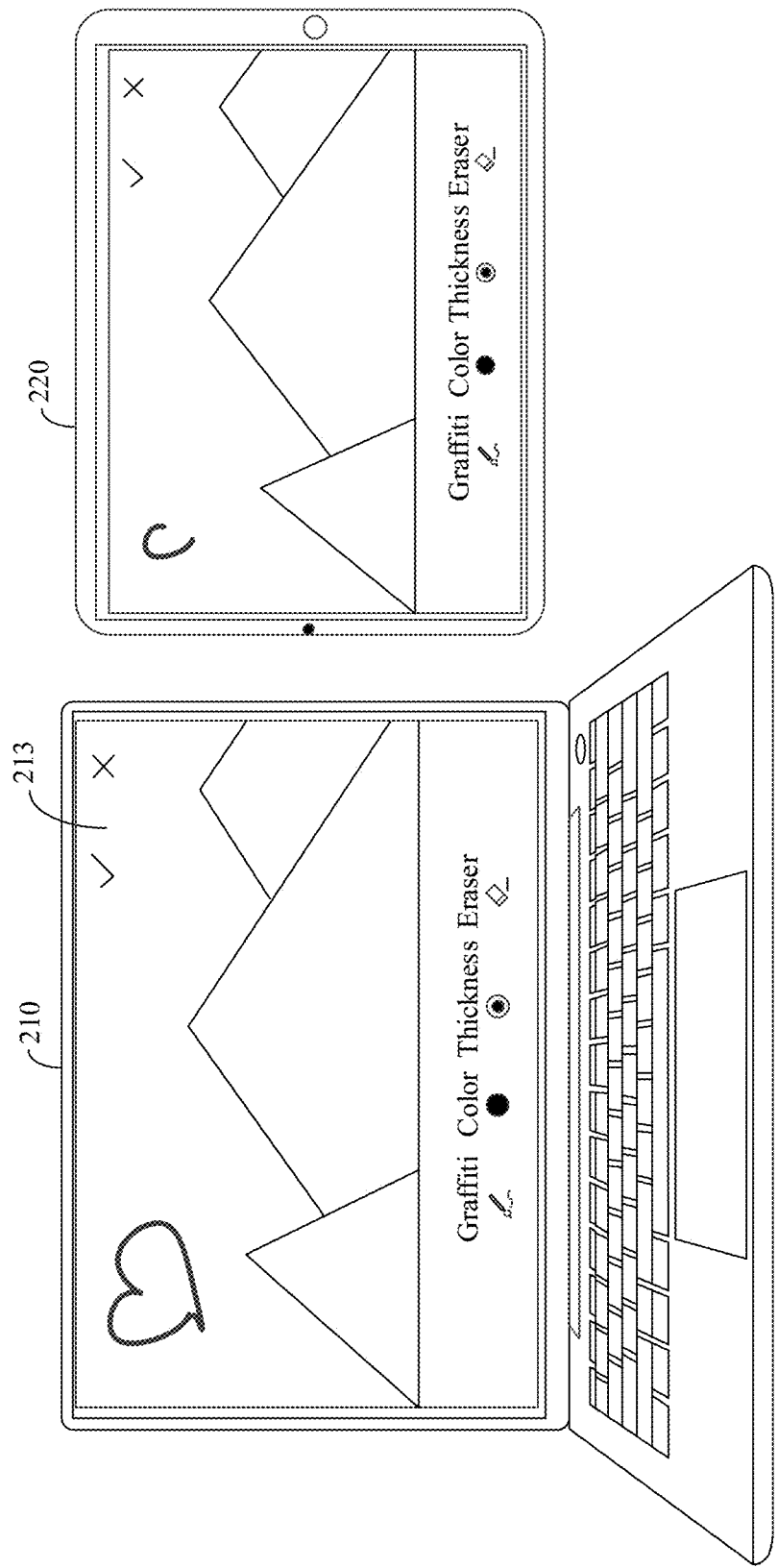
FIG. 5 is a schematic diagram of multi-screen display after an interface image is updated in a multi-screen scenario according to a conventional technology.

As shown in FIG. 5, in response to the update instruction, the notebook computer 210 sequentially displays all interface images in the heart drawing process, and displays an editing interface image 213 including a heart. However, after the tablet computer 220 receives the drawing operation, because it takes a long time to receive and decode each frame of interface image, only a part of the heart is displayed at this time by using a part of the interface images in the heart drawing process. The tablet computer 220 displays a heart by using all interface images in the heart drawing process after a long time after receiving the drawing operation.

It may be understood that frame freezing occurs when the tablet computer displays the updated interface image including the heart after receiving the drawing operation. In addition, in the reverse control scenario in which the notebook computer reversely controls the tablet computer, a frame freezing situation when the tablet computer displays the updated interface image including the heart after receiving the drawing operation is more obvious, and a delay in reverse control performed by the tablet computer on the notebook computer is long.

To solve a frame freezing problem that occurs when the second electronic device updates the interface image in a multi-screen collaboration scenario and a problem that a delay in reverse control performed by the first electronic device on the second electronic device in a reverse control scenario is long in the foregoing solutions, an embodiment of this application provides a multi-screen collaborative display method, to solve a frame freezing problem that occurs when the second electronic device updates the interface image in a multi-screen collaboration scenario, and reduce a delay in reverse control performed by the first electronic device on the second electronic device in a reverse control scenario.

It should be noted that the first electronic device in this embodiment of this application may be a mobile phone, a PC, a tablet computer, a notebook computer, an ultra-mobile personal computer (UMPC), a netbook, a personal digital assistant (PDA), or the like. The second electronic device in the first usage scenario may be any display apparatus such as a display of a PC, a television, or a projector, or may be an electronic device including a display. The second electronic device in the reverse control scenario may be an electronic device including a display. The electronic device including a display may be a PC, a tablet computer, a notebook computer, a UMPC, a netbook, a PDA, a large-screen device, a smart TV, or the like. Specific forms of the first electronic device and the second electronic device are not limited in this embodiment of this application.

Figure 6:
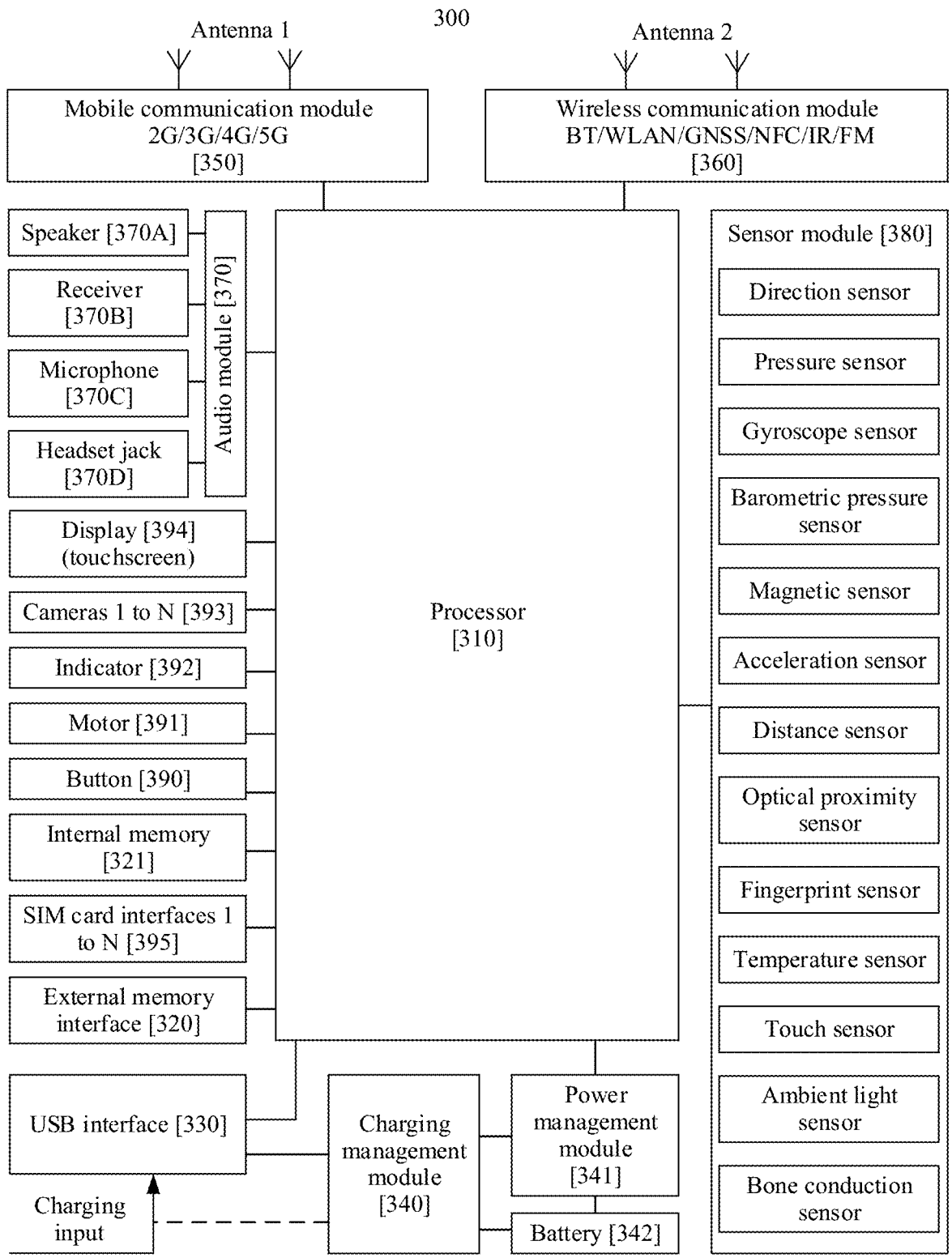
FIG. 6 is a schematic diagram of a hardware structure of a first electronic device according to an embodiment of this application.

The following continues to describe a hardware structure of the first electronic device by using an example in which the first electronic device is a mobile phone: As shown in FIG. 6, the mobile phone 300 may include a processor 310, an external memory interface 320, an internal memory 321, a universal serial bus (USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393 (which may include cameras 1 to N), a display 394 (for example, a touchscreen), a subscriber identification module (SIM) card interface 395 (which may include SIM car interfaces 1 to N), and the like.

The sensor module 380 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that an illustrated structure in this embodiment does not constitute a specific limitation on the mobile phone 300. In other embodiments of this application, the mobile phone 300 may include more or fewer components than those shown in the figure, or some components may be combined, or some components may be split, or there may be a different component layout. The components shown in the figure may be implemented by using hardware, software, or a combination of software and hardware.

The processor 310 may include one or more processing units. For example, the processor 310 may include an application processor (AP), a modem processor, a graphics processing unit (GPU), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the mobile phone 300. The controller may generate an operation control signal based on instruction operation code and a time sequence signal, to complete control of instruction fetching and instruction execution.

A memory may be further disposed in the processor 310, and is configured to store instructions and data. In some embodiments, the memory in the processor 310 is a cache memory. The memory may store instructions or data just used or cyclically used by the processor 310. If the processor 310 needs to use the instructions or the data again, the processor 310 may directly invoke the instructions or the data from the memory. This avoids repeated access, reduces a waiting time of the processor 310, and improves system efficiency.

In some embodiments, the processor 310 may include one or more interfaces. It may be understood that an interface connection relationship between the modules shown in this embodiment is merely an example for description, and does not constitute a limitation on the structure of the mobile phone 300. In some other embodiments, the mobile phone 300 may alternatively use an interface connection manner different from that in the foregoing embodiment, or use a combination of a plurality of interface connection manners.

The charging management module 340 is configured to receive a charging input from a charger (a charging input of a wired charger and/or a wireless charging input) to charge the battery 342. The charger may be a wireless charger or a wired charger. The charging management module 340 supplies power to the mobile phone by using the power management module 341 while charging the battery 342.

The power management module 341 is configured to connect the battery 342 and the charging management module 340 to the processor 310. The power management module 341 receives an input from the battery 342 and/or the charging management module 340, and supplies power to the processor 310, the internal memory 321, an external memory, the display 394, the camera 393, the wireless communication module 360, and the like. In some embodiments, the power management module 341 may alternatively be disposed in the processor 310. In some other embodiments, the power management module 341 and the charging management module 340 may alternatively be disposed in a same device.

A wireless communication function of the mobile phone 300 may be implemented by using the antenna 1, the antenna 2, the mobile communication module 350, the wireless communication module 360, the modem processor, the baseband processor, and the like. The antenna 1 and the antenna 2 are configured to transmit and receive electromagnetic wave signals. In some embodiments, the antenna 1 of the mobile phone 300 is coupled to the mobile communication module 350, and the antenna 2 is coupled to the wireless communication module 360, so that the mobile phone 300 can communicate with a network and another device by using a wireless communication technology. The wireless communication technology may include a global navigation satellite system (GNSS), a wireless local area network (WLAN) (for example, a Wi-Fi network) technology, and the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS). For example, the mobile phone 300 may obtain real-time location information of the mobile phone 300 by using a positioning technology such as the GPS, the BDS, or the SBAS.

The mobile communication module 350 may provide a solution to wireless communication such as 2G/3G/4G/5G applied to the mobile phone 300. For example, the mobile phone 300 may send an email to a server by using the mobile communication module 350.

The wireless communication module 360 may provide a wireless communication solution that includes a WLAN (for example, a Wi-Fi network), Bluetooth (BT), a GNSS, near field communication (NFC), infrared (IR), frequency modulation (FM), or the like and that is applied to the mobile phone 300. For example, the mobile phone 300 may obtain real-time location information of the mobile phone 300 by using the GNSS positioning technology.

The mobile phone 300 implements a display function by using the GPU, the display 394, the application processor, and the like. The mobile phone 300 may implement a photographing function by using the ISP, the camera 393, the video codec, the GPU, the display 394, the application processor, and the like. The external memory interface 320 may be configured to connect to an external memory card, for example, a micro SD card, to extend a storage capability of the mobile phone 300. The internal memory 321 may be configured to store computer-executable program code. The executable program code includes instructions. The processor 310 runs the instructions stored in the internal memory 321, to perform various function applications of the mobile phone 300 and data processing. The mobile phone 300 may implement an audio function by using the audio module 370, the speaker 370A, the receiver 370B, the microphone 370C, the headset jack 370D, the application processor, and the like.

It may be understood that steps of the methods in subsequent embodiments of this application may be performed by the first electronic device and/or the second electronic device, or an execution body of steps of methods in embodiments of this application may be some functional modules in the first electronic device (such as a central processing unit (CPU)) and/or some function modules (such as a CPU) in the terminal of the second electronic device. This is not limited in embodiments of this application. In this embodiment of this application, the multi-screen collaborative display method provided in this embodiment of this application is described in detail by using an example in which the first electronic device and/or the second electronic device perform the multi-screen collaborative display method.

In this embodiment of this application, after the first electronic device projects the content of the interface image to the second electronic device, if the first electronic device receives an update operation performed by the user on the interface image of the first electronic device, the first electronic device updates the interface image. The first electronic device further indicates (or triggers) the second electronic device to update the interface image. To reduce time spent on encoding and decoding and transmission duration of encoded data, the first electronic device may compare each updated frame of interface image with a previous frame of interface image of the updated frame. If each frame of interface image has a small change compared with a previous frame of interface image of the frame of interface image, the first electronic device may encode only content that is in each frame of interface image and that is different from content of the previous frame of interface image to obtain encoded data, and transmit the encoded data to the second electronic device, so that the second electronic device updates the interface image by using the encoded data. A previous frame of interface images of each frame of interface image is an interface image whose generation time is earlier than a generation time of the frame of interface image and continuous with the generation time of the frame of interface image. Because the first electronic device encodes only the content that is in each frame of interface image and that is different from the content of the previous frame of interface image, time spent on encoding and decoding and transmission duration of the encoded data can be reduced. Further, a frame freezing problem that occurs when the second electronic device updates the interface image in a multi-screen collaboration scenario can be resolved, and a delay in reverse control performed by the first electronic device on the second electronic device in a reverse control scenario can be reduced.

Figure 7A:
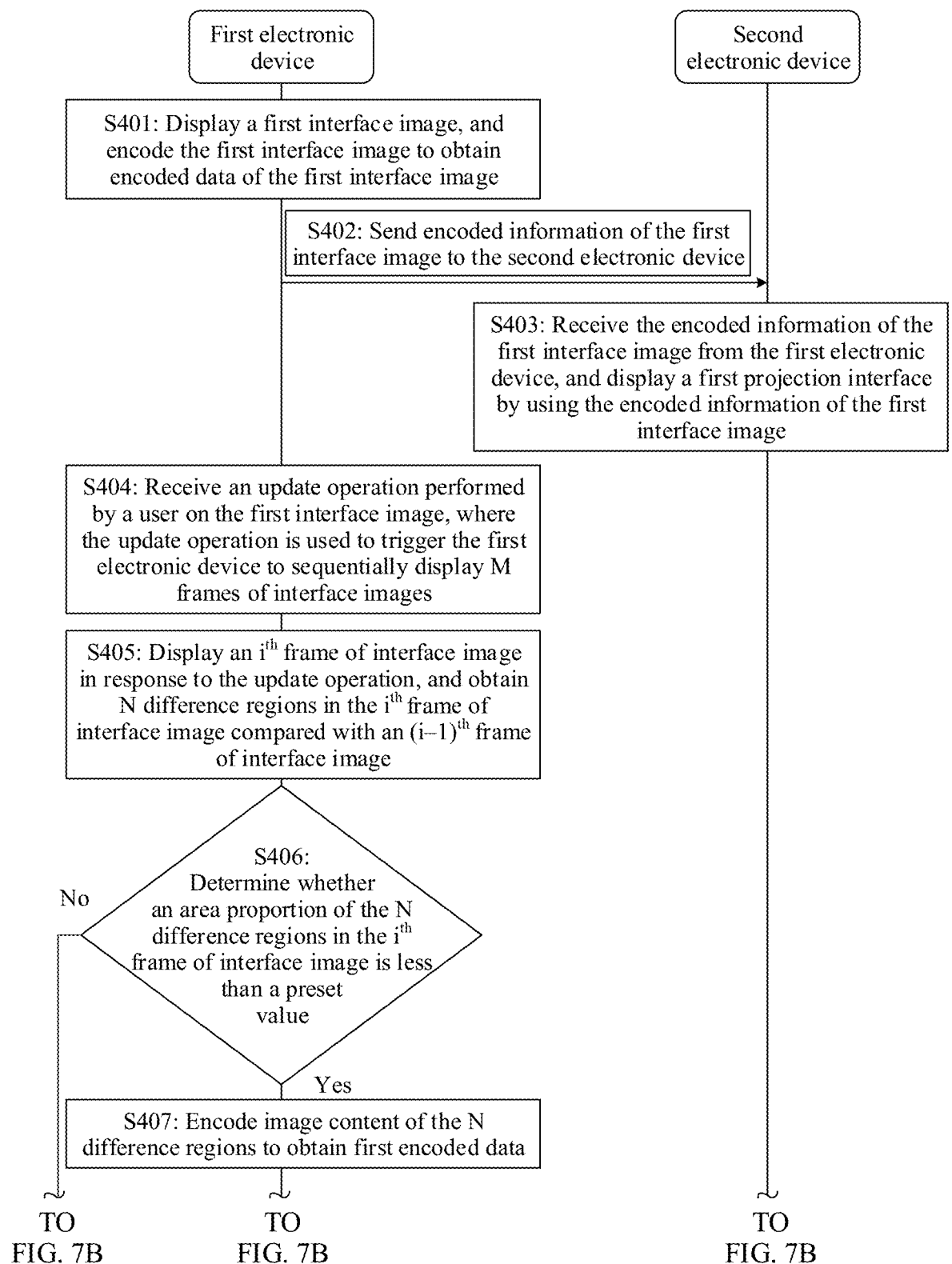
FIG. 7A and FIG. 7B are a flowchart 1 of a multi-screen collaborative display method in a first usage scenario according to an embodiment of this application.
Figure 7B:
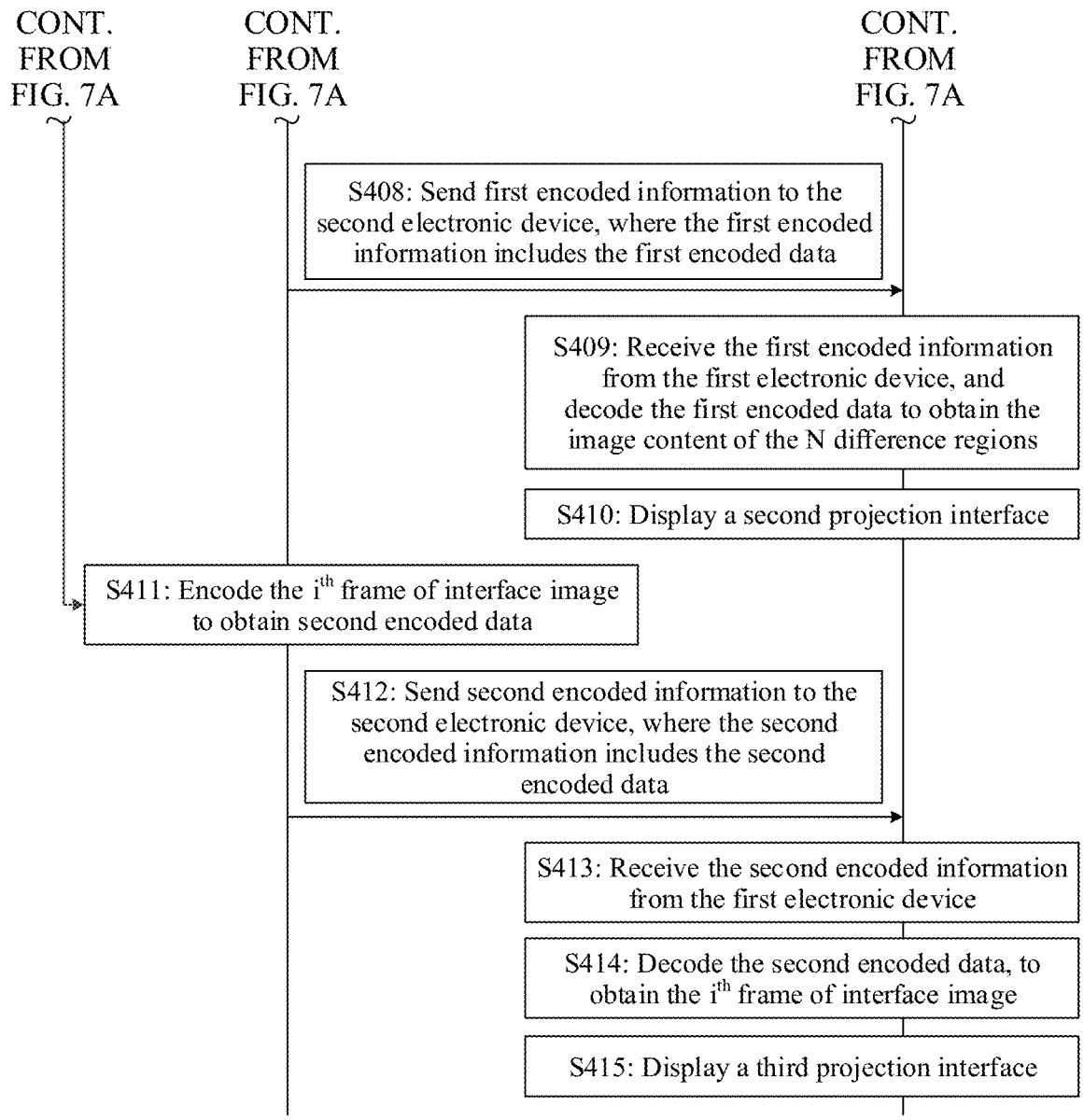

Refer to FIG. 7A and FIG. 7B. An embodiment of this application provides a multi-screen collaborative display method. The method is applied to a first electronic device and a second electronic device in the foregoing first usage scenario. The first electronic device is connected to the second electronic device. As shown in FIG. 7A and FIG. 7B, the display method may include S401 to S415.

S401: The first electronic device displays a first interface image, and encodes the first interface image to obtain encoded data of the first interface image.

The first electronic device displays the first interface image, encodes the first interface image to obtain the encoded data of the first interface image, and generates encoded information of the first interface image. The encoded information of the first interface image includes the encoded data of the first interface image. Optionally, in addition to the encoded data of the first interface image, the encoded information of the first interface image may further include a timestamp of the first interface image. The timestamp of the first interface image is used to record a time at which the first electronic device generates the first interface image. A second timestamp described in the following embodiment is a timestamp of the first interface image:

S402: The first electronic device sends the encoded information of the first interface image to the second electronic device.

The encoded information of the first interface image is used to trigger the second electronic device to display a first projection interface based on the encoded information of the first interface image, and content of the first projection interface is a mirror image of the first interface image.

After receiving the encoded information of the first interface image, the second electronic device generates the first projection interface by using the encoded information of the first interface image, and displays the first projection interface.

For example, the first electronic device is a mobile phone and the second electronic device is a notebook computer. As shown in FIG. 8(*a*)-1 and FIG. 8(*a*)-2, a first interface image 501 displayed by a mobile phone 300 is an editing interface image for editing a picture, and the mobile phone 300 indicates (or triggers) a notebook computer 510 to display a first projection interface 502. Content of the first interface image 501 includes: A current time is "8:00", and a collection time of a to-be-edited image is "Jun. 5, 2020, 5:10 p.m.", and a plurality of image editing options, such as "Graffiti", "Color", "Thickness", and "Eraser".

S403: The second electronic device receives the encoded information of the first interface image from the first electronic device, and displays the first projection interface by using the encoded information of the first interface image.

After receiving the encoded information of the first interface image from the first electronic device, the second electronic device decodes, by using a codec standard used by the first electronic device when generating the encoded data of the first interface image, the encoded data in the encoded information of the first interface image, to obtain the first interface image. The second electronic device generates the first projection interface by using the first interface image, and displays the first projection interface.

In this embodiment of this application, in the foregoing multi-screen extension scenario, the second electronic device may display the first projection interface in a full-screen manner.

In this embodiment of this application, in the foregoing multi-screen non-mirroring scenario, the second electronic device may display the first projection interface in a full-screen manner, or may display the first projection interface in a non-full-screen manner. When displaying the first projection interface in a non-full-screen manner in the multi-screen non-mirroring scenario, the second electronic device may further display another interface image, for example, display the another interface image on another region other than the first projection interface. The another interface image is different from the first interface image and the first projection interface.

In this embodiment of this application, in the foregoing multi-screen mirroring scenario, the second electronic device may display the first projection interface in a full-screen manner, or may display the first projection interface in a non-full-screen manner. When displaying the first projection interface in a non-full-screen manner in the multi-screen mirroring scenario, the second electronic device does not display other content. For example, another region may be black.

It should be noted that displaying a projection interface in a full-screen manner in this embodiment of this application means that the second electronic device may display the projection interface and a status bar of the second electronic device on a display, and does not display other content; or the second electronic device may display the projection interface on the display, and does not display a status bar of the second electronic device or other content.

S404: The first electronic device receives an update operation performed by a user on the first interface image, where the update operation is used to trigger the first electronic device to sequentially display M frames of interface images.

In the foregoing first usage scenario, the first electronic device may directly receive the update operation performed by the user on the first interface image. M is a positive integer (for example, 1, 2, or 3). A value of M depends on the update operation.

For example, the update operation may include an operation of switching the first interface image, an operation of drawing on the first interface image, an operation of loading new content on the first interface image, or the like. This is not limited in this embodiment of this application.

S405: The first electronic device displays an $i^{th}$ frame of interface image in response to the update operation, and obtains N difference regions in the $i^{th}$ frame of interface image compared with an $(i-1)^{th}$ frame of interface image.

The first electronic device sequentially generates M frames of interface images in response to the update operation, and displays the M frames of interface images. The first electronic device further obtains the N difference regions in the $i^{th}$ frame of interface image compared with the $(i-1)^{th}$ frame of interface image, and location information of the N difference regions in the $i^{th}$ frame of interface image. The location information is used to indicate (or represent) locations of the N difference regions in the $i^{th}$ frame of interface image, where i is sequentially set to values in $\{1, \ldots, M\}$, and a $0^{th}$ frame of interface image is the first interface image. A pixel value of a pixel in the N difference regions is different from a pixel value of a corresponding pixel in the $(i-1)^{th}$ frame of interface image, where N is a positive integer.

For example, the M frames of first interface images may include a first frame of interface image, a second frame of interface image, ..., the $i^{th}$ frame interface image, ..., and an $M^{th}$ frame of interface image. The first frame of interface image, the second frame of interface image, ..., the $i^{th}$ frame of interface image, ..., and the $M^{th}$ frame of interface image are interface images arranged in a generation time sequence. The $(i-1)^{th}$ frame of interface image is a previous frame of interface image of the $i^{th}$ frame of interface image.

In this embodiment of this application, N may be equal to any positive integer. If N is greater than 1, any two difference regions in the N difference regions may be independent and non-overlapping. Pixel values of all pixels in each of the N difference regions are different from pixel values of corresponding pixels in the $(i-1)^{th}$ frame of interface image, or pixel values of some pixels in each difference region are different from pixel values of corresponding pixels in the $(i-1)^{th}$ frame of interface image. The location information of the N difference regions may include N pieces of location information that are in a one-to-one correspondence with the N difference regions.

S406: The first electronic device determines whether an area proportion of the N difference regions in the $i^{th}$ frame of interface image is less than a preset value.

The first electronic device may first calculate the area proportion of the N difference regions in the $i^{th}$ frame of interface image, and then determine whether the area proportion is less than the preset value (for example, ¼ or ½). If the first electronic device determines that the area proportion is less than the preset value, the first electronic device performs S407 to S410. If the first electronic device determines that the area proportion is greater than or equal to the preset value, the first electronic device performs S411 to S415.

S407: The first electronic device encodes image content of the N difference regions to obtain first encoded data.

The first electronic device may encode the image content of the N difference regions in a lossy coding manner (for example, a JPEG file format, an RM file format, or a RealMedia variable bit rate) or a lossless coding manner (for example, a Huffman (Huffman) algorithm or an LZW (Lenpel-Ziv & Welch) compression algorithm), to obtain the first encoded data.

S408: The first electronic device sends first encoded information to the second electronic device, where the first encoded information includes the first encoded data.

After obtaining the N difference regions, the first electronic device may further obtain the location information of the N difference regions in the $i^{th}$ frame of interface image. Then, the first electronic device generates the first encoded information by using the location information and the first encoded data, and then sends the first encoded information to the second electronic device.

S409: The second electronic device receives the first encoded information from the first electronic device, and decodes the first encoded data to obtain the image content of the N difference regions.

The second electronic device decodes the first encoded data in the first encoded information by using a codec standard used by the first electronic device when generating the first encoded data, to obtain the image content of the N difference regions.

S410: The second electronic device displays a second projection interface.

Content of the second projection interface is a mirror image of the $i^{th}$ frame of interface image. The $i^{th}$ frame of interface image is obtained by the second electronic device by updating the $(i-1)^{th}$ frame of interface image based on the image content and the location information of the N difference regions.

In this embodiment of this application, the second electronic device updates the $(i-1)^{th}$ frame of interface image based on the location information of the N difference regions in the first encoded information and by using the image content of the N difference regions, to obtain the $i^{th}$ frame of interface image. The second electronic device then generates the second projection interface based on the $i^{th}$ frame of interface image, and displays the second projection interface in a full-screen manner or a non-full-screen manner.

It should be noted that for a specific process in which the second electronic device displays the second projection interface in a full-screen manner or a non-full-screen manner, refer to the detailed description of displaying the first projection interface by the second electronic device in a full-screen manner or a non-full-screen manner in S403. Details are not described herein in this embodiment of this application.

For example, the second electronic device may replace, with the image content of the N difference regions, content of regions indicated by the location information of the N difference regions in the $(i-1)^{th}$ frame of interface image, to obtain the $i^{th}$ frame of interface image.

Figures 1, 8A:
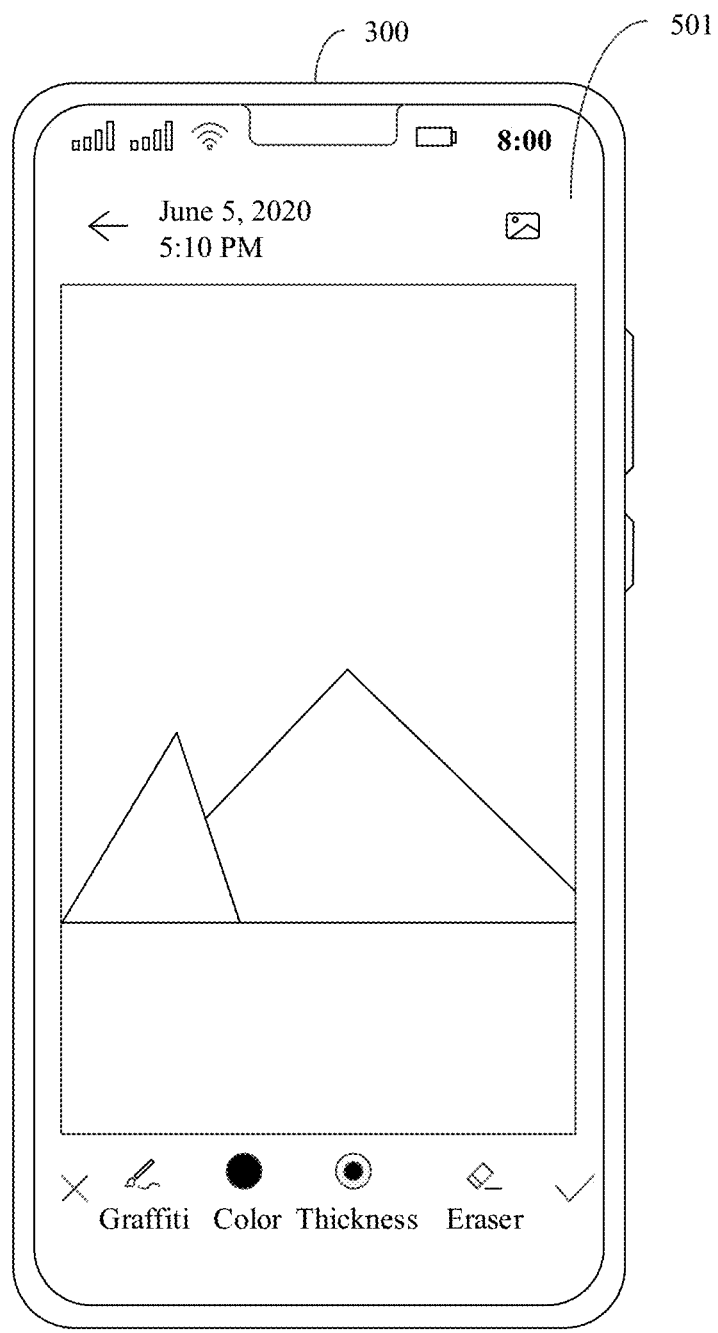
Figures 2, 8A:
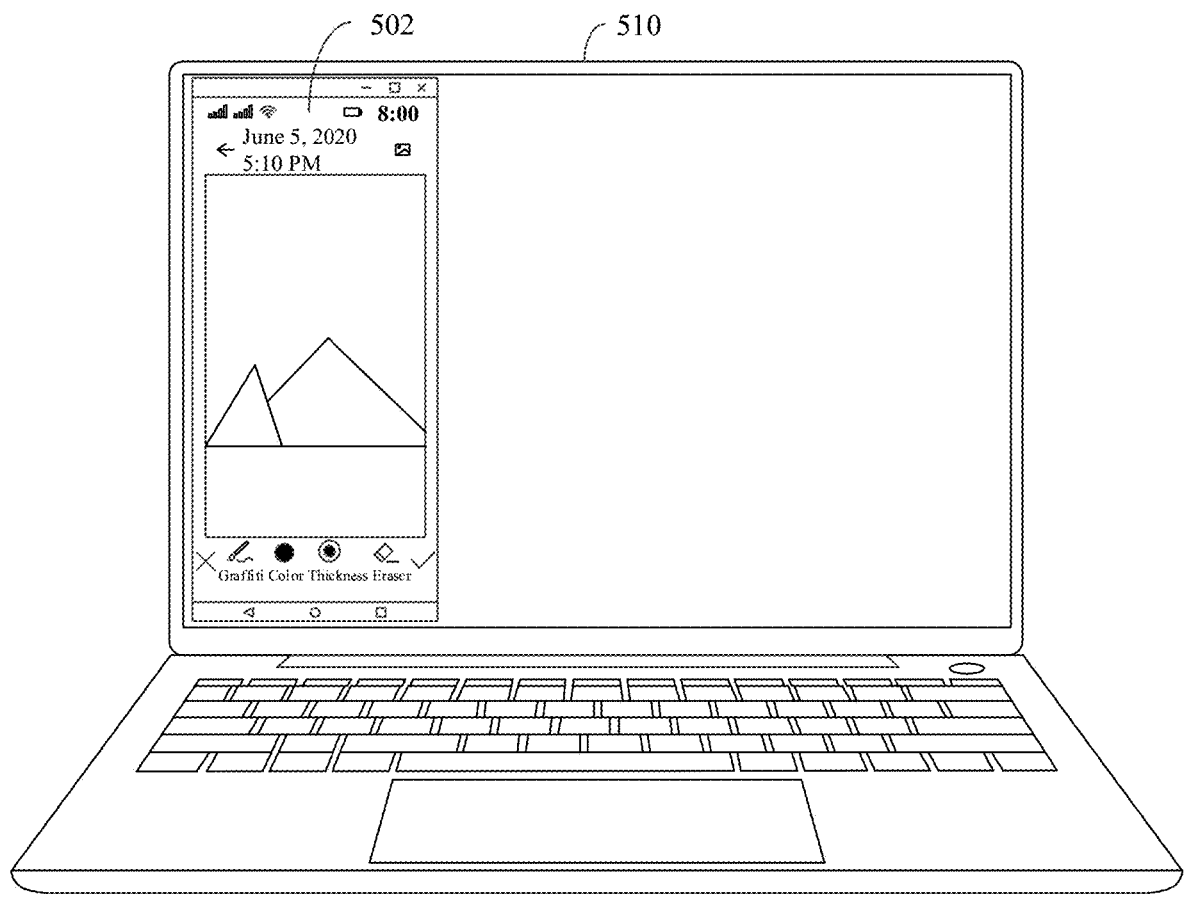
Figures 1, 8B:
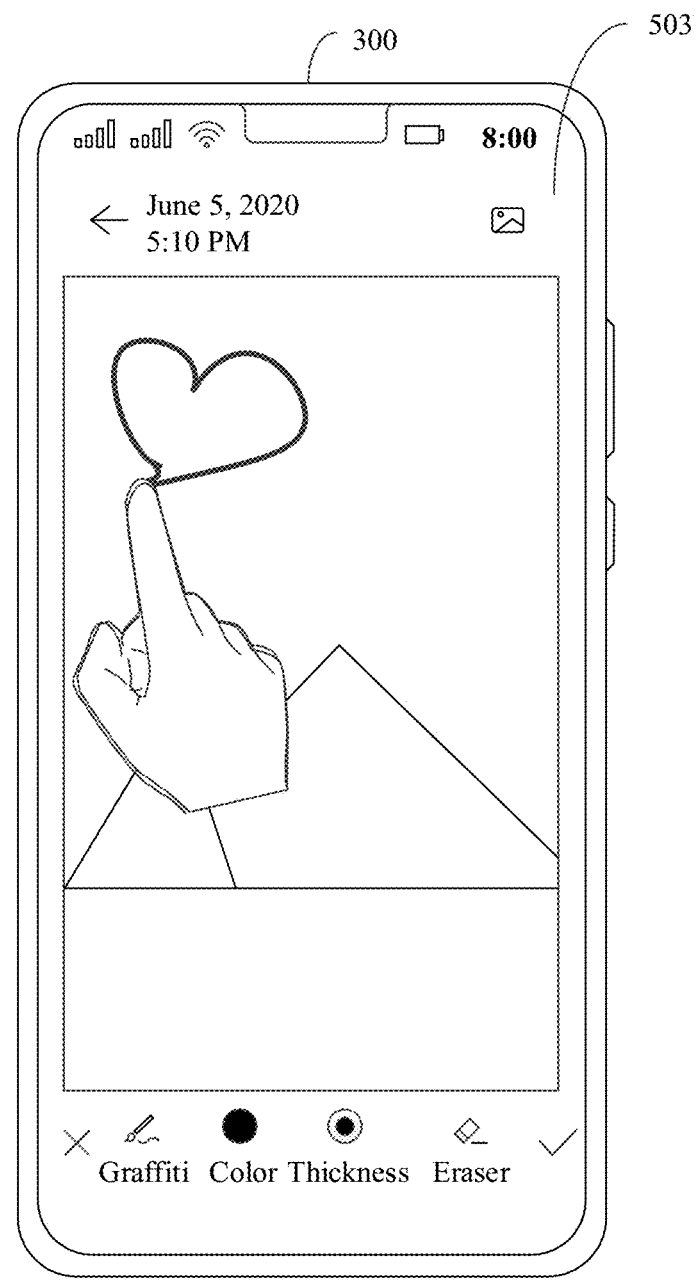
Figures 2, 8B:
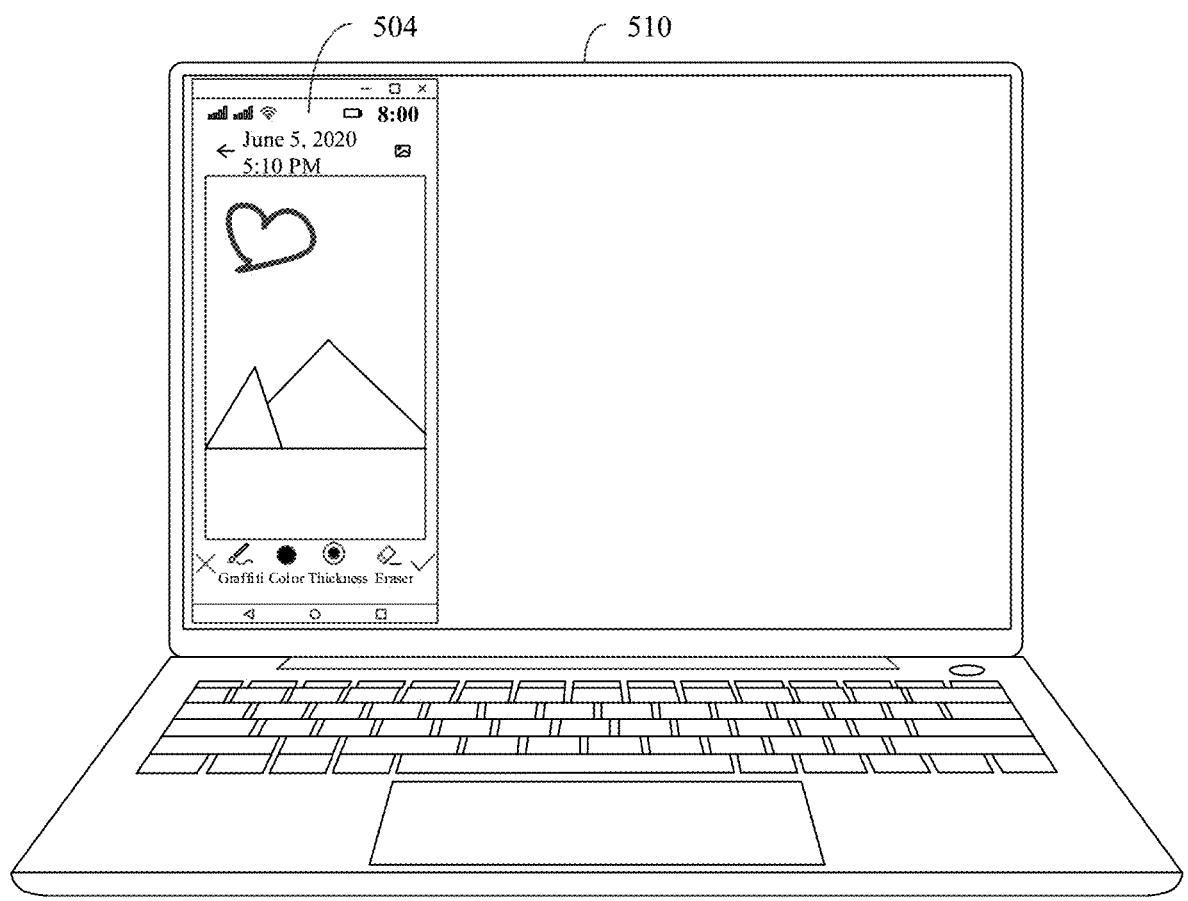

For example, in the foregoing first usage scenario, the first electronic device is a mobile phone and the second electronic device is a notebook computer. As shown in FIG. 8(b)-1 and FIG. 8(b)-2, a display of a mobile phone 300 is a touchscreen, and the mobile phone 300 receives an update operation performed by a user on a first interface image, for example, a drawing operation in which the user uses a finger to draw a heart on the display of the mobile phone 300. Then, in response to the drawing operation, the mobile phone 300 sequentially displays M frames of interface images in a process of drawing the heart, and displays an interface image 503 including the heart. In addition, the mobile phone 300 sends first encoded information or second encoded information of each of the M frames of interface images to a notebook computer 510. Because the mobile phone 300 may encode only content that is in each frame of interface image and that is different from a previous frame of interface image of each frame of interface image when each frame of interface image differs slightly from the previous frame of interface image, to obtain first encoded data, and transmit the first encoded information including the first encoded data to the second electronic device, time spent on encoding and decoding and transmission duration of the encoded data are reduced. Therefore, the notebook computer 510 displays a projection interface 504 including the heart quickly by using the received first encoded information or the received second encoded information.

S411: The first electronic device encodes the $i^{th}$ frame of interface image to obtain second encoded data.

In this embodiment of this application, the first electronic device may encode the $i^{th}$ frame of interface image by using a codec standard such as H.261, H.263, or H.264, to obtain the second encoded data.

The encoding of the $i^{th}$ frame of interface image by the first electronic device is encoding the complete $i^{th}$ frame of interface image by the first electronic device. In this case, the $i^{th}$ frame of interface image may be an intra-coded picture frame (I frame) or a predictive-coded picture frame (P frame).

It should be noted that if the area proportion of the N difference regions in the $i^{th}$ frame of interface image is greater than or equal to the preset value, time spent on encoding and decoding the N difference regions is similar to time spent on encoding and decoding the $i^{th}$ frame of interface image. In other words, when the first electronic device encodes the N difference regions and then transmits the N difference regions to the second electronic device or encodes the $i^{th}$ frame of interface image and then transmits the $i^{th}$ frame of interface image to the second electronic device, frame freezing degrees do not differ greatly when the second electronic device updates the interface image. Therefore, the first electronic device may directly encode the $i^{th}$ frame of interface image and transmit the $i^{th}$ frame of interface image when the area proportion of the N difference regions in the $i^{th}$ frame of interface image is greater than or equal to the preset value.

S412: The first electronic device sends second encoded information to the second electronic device, where the second encoded information includes the second encoded data.

S413: The second electronic device receives the second encoded information from the first electronic device.

The second encoded data is generated after the first electronic device encodes the $i^{th}$ frame of interface image. The second encoded information may further include a first timestamp of the $i^{th}$ frame. The first timestamp of the $i^{th}$ frame is used to record a time at which the first electronic device generates the $i^{th}$ frame of interface image.

S414: The second electronic device decodes the second encoded data, to obtain the $i^{th}$ frame of interface image.

The second electronic device may decode the second encoded data in the second encoded information by using a codec standard used by the first electronic device when generating the second encoded data to obtain the $i^{th}$ frame of interface image.

S415: The second electronic device displays a third projection interface.

The second electronic device may generate the third projection interface by using the $i^{th}$ frame of interface image, and display the third projection interface in a full-screen manner or a non-full-screen manner. Content of the third projection interface is a mirror image of the $i^{th}$ frame of interface image.

It should be noted that for a specific process in which the second electronic device displays the third projection interface in a full-screen manner or a non-full-screen manner, refer to the detailed description of displaying the first projection interface by the second electronic device in a full-screen manner or a non-full-screen manner in S403. Details are not described herein in this embodiment of this application.

Figure 9A:
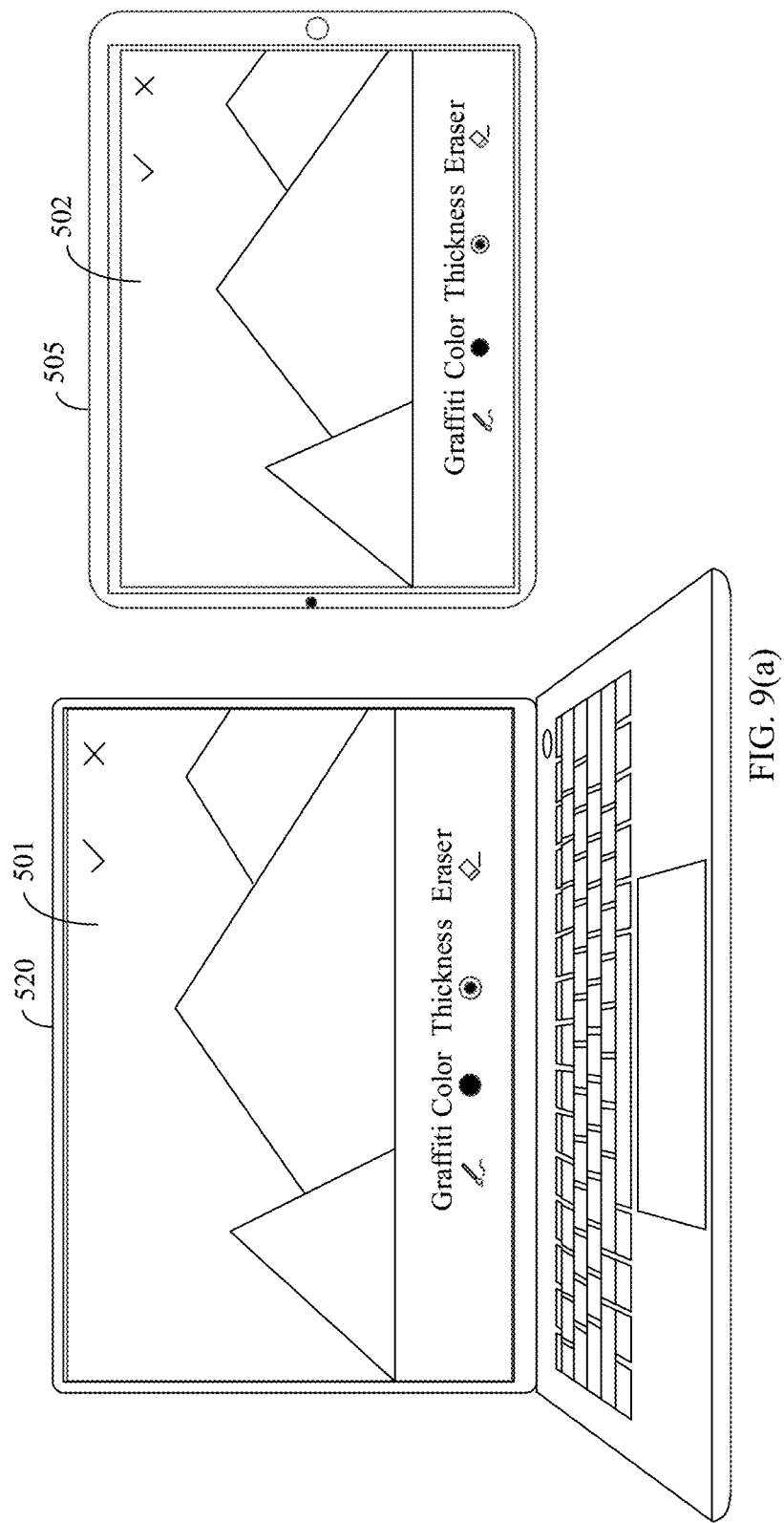
FIG. 9(a) and FIG. 9(b) each are a schematic diagram 2 of multi-screen display in a first usage scenario according to an embodiment of this application.
Figure 9B:
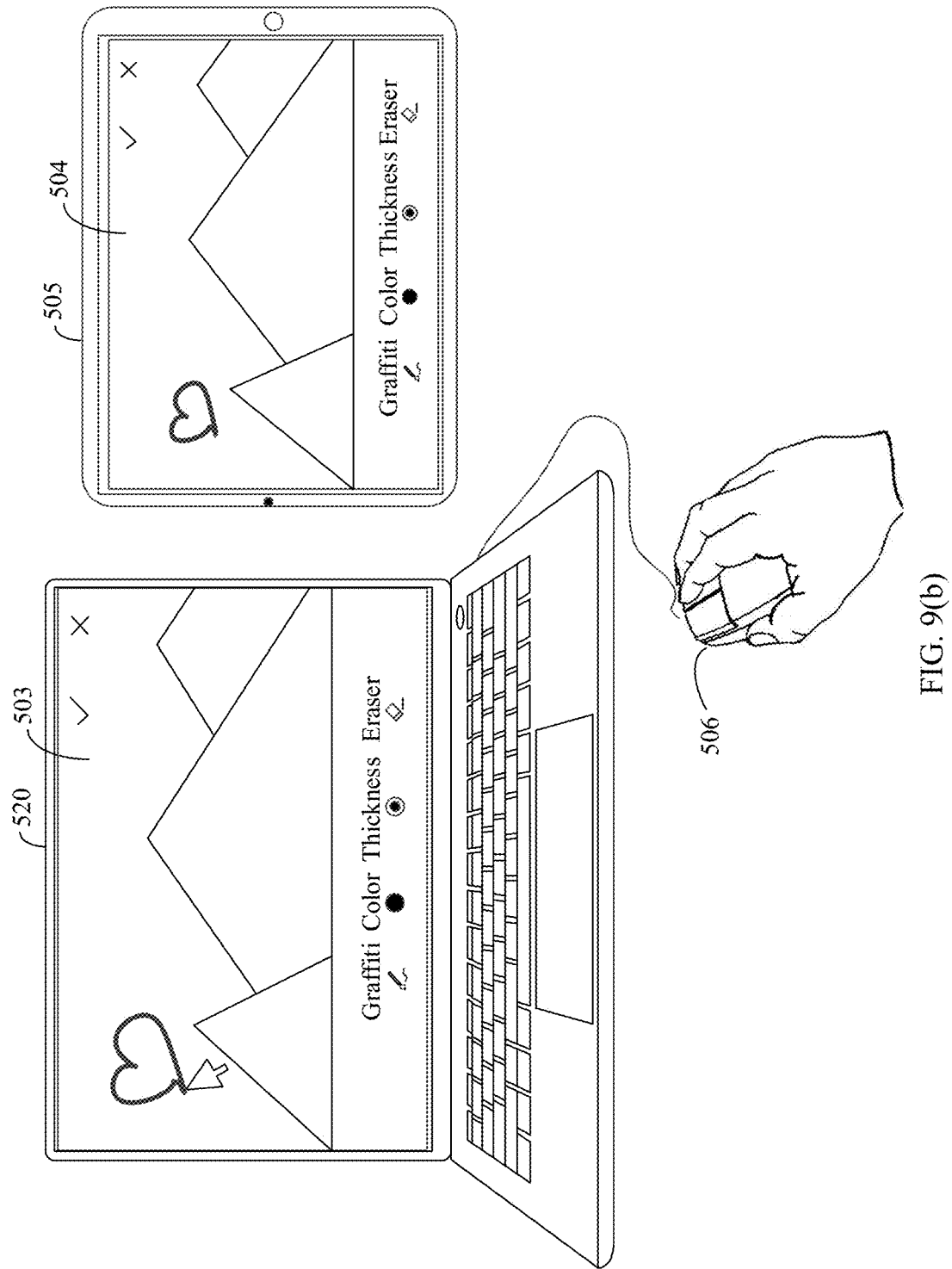

For example, in the foregoing first usage scenario, the first electronic device is a notebook computer and the second electronic device is a tablet computer. As shown in FIG. 9(a), a first interface image 501 displayed by a notebook computer 520 is an editing interface image for editing a picture, and the notebook computer 520 indicates (or triggers) a tablet computer 505 to display a first projection interface 502. The notebook computer 520 is connected to a mouse 506. As shown in FIG. 9(b), the notebook computer 520 receives an update operation performed by a user on the first interface image by using the mouse 506, for example, a drawing operation in which the user uses the mouse 506 to draw a heart on a display of the notebook computer 520. Then, in response to the drawing operation, the notebook computer 520 sequentially displays M frames of interface images in a process of drawing the heart, and displays an interface image 503 including the heart. At the same time, the notebook computer 520 sends first encoded information or second encoded information of each frame of interface image to the tablet computer 505. Because the notebook computer 520 may encode only content that is in each frame of interface image and that is different from a previous frame of interface image of each frame of interface image when each frame of interface image differs slightly from the previous frame of interface image, to obtain first encoded data, and transmit the first encoded information including the first encoded data to the second electronic device, time spent on encoding and decoding and transmission duration of the encoded data are reduced. Therefore, the tablet computer 505 displays a projection interface 504 including a heart quickly by using the received first encoded information or the received second encoded information.

It may be understood that, according to the multi-screen collaborative display method provided in this application, the first electronic device displays the first interface image, and projects the content of the first interface image onto the second electronic device. If the first electronic device receives the update operation on the first interface image, the first electronic device displays the M frames of interface images, and obtains the N difference regions in the $i^{th}$ frame of interface image compared with the $(i-1)^{th}$ frame of interface image. If the area proportion of the N difference regions in the $i^{th}$ frame of interface image is less than the preset value, the first electronic device encodes only the N difference regions to obtain the first encoded data, and then sends the first encoded information including the first encoded data to the second electronic device. The N difference regions are the pixels that are in the $i^{th}$ frame of interface image and whose pixel values are different from those of the $(i-1)^{th}$ frame of interface image. In this case, encoding the N difference regions by the first electronic device is encoding content that is in the $i^{th}$ frame of interface image and that is different from that in the $(i-1)^{th}$ frame of interface image. Compared with encoding the $i^{th}$ frame of interface image, this can reduce time spent on encoding and decoding and an amount of the first encoded data. In addition, transmission duration of the first encoded data may also be shortened by transmitting a smaller amount of the first encoded data. Further, because the time spent on encoding and decoding is reduced and the transmission duration of the first encoded data is shortened, the second electronic device may update the (i−1)th frame of interface image more quickly by using the first encoded information including the first encoded data, and display the mirror image of the $i^{th}$ frame of interface image. In this way, the frame freezing problem that occurs when the second electronic device updates the interface image in the multi-screen collaboration scenario can be resolved.

In this embodiment of this application, when obtaining the N difference regions, the first electronic device may compare a pixel value of each pixel in the $i^{th}$ frame of interface image with a pixel value of a corresponding pixel in the $(i-1)^{th}$ frame of interface image, to obtain a difference pixel in the $i^{th}$ frame of interface image; and then determine N difference regions including the difference pixel in the $i^{th}$ frame of interface image. A pixel value of the difference pixel is different from the pixel value of the corresponding pixel in the $(i-1)^{th}$ frame of interface image. The difference pixel may include a plurality of pixels.

After obtaining the difference pixel, the first electronic device may determine, based on a shape of a preset region, a minimum region including the difference pixel. The minimum region is the N difference regions. The shape of the preset region may be a rectangle, a circle, a polygon, or the like. Shapes of the N difference regions are the shapes of the preset region.

Alternatively, after obtaining the difference pixel, the first electronic device may use a region in which the difference pixel is located as the N difference regions.

For example, a process in which the first electronic device determines a minimum rectangular region including the difference pixel is described by using an example in which the shape of the preset region is a rectangle. The minimum rectangular region is the N difference regions. For an $(i-1)^{th}$ frame of interface image shown in (a) in FIG. 10 and an $i^{th}$ frame of interface image shown in (b) in FIG. 10, the first electronic device compares pixel values of pixels in the $i^{th}$ frame of interface image with pixel values of pixels in the (i−1)th frame of interface image, to obtain a difference pixel in the $i^{th}$ frame of interface image. A slash region in (c) in FIG. 10 includes all difference pixels in the $i^{th}$ frame of interface image. Then, the first electronic device determines a minimum rectangular region R1 including all the difference pixels, that is, the N difference regions R1.

Location information of the N difference regions R1 includes a horizontal coordinate xmin of an upper left vertex P1 (or a horizontal coordinate xmin of a lower left vertex P3), a horizontal coordinate xmax of an upper right vertex P2 (or a horizontal coordinate xmax of a lower right vertex P4), a vertical coordinate ymin of the upper left vertex P1 (or a vertical coordinate ymin of the upper right vertex P2), and a vertical coordinate ymax of the lower left vertex P3 (or a vertical coordinate ymax of the lower right vertex P4). Alternatively, the location information of the N difference regions R1 may include coordinates (xmin, ymin) of the upper left vertex P1, coordinates (xmax, ymin) of the upper right vertex P2, coordinates (xmin, ymax) of the lower left vertex P1, and coordinates (xmax, ymax) of the lower right vertex P4.

Coordinate values of xmin, xmax, ymin, and ymax may be coordinate values obtained in a first coordinate system. An origin of the first coordinate system is an upper left vertex of the $i^{th}$ frame of interface image, a positive direction of an X axis of the first coordinate system is a direction from the upper left vertex to an upper right vertex of the $i^{th}$ frame of interface image, and a positive direction of a Y axis of the first coordinate system is a direction from the upper left vertex to a lower left vertex of the $i^{th}$ frame of interface image.

Figure 10:
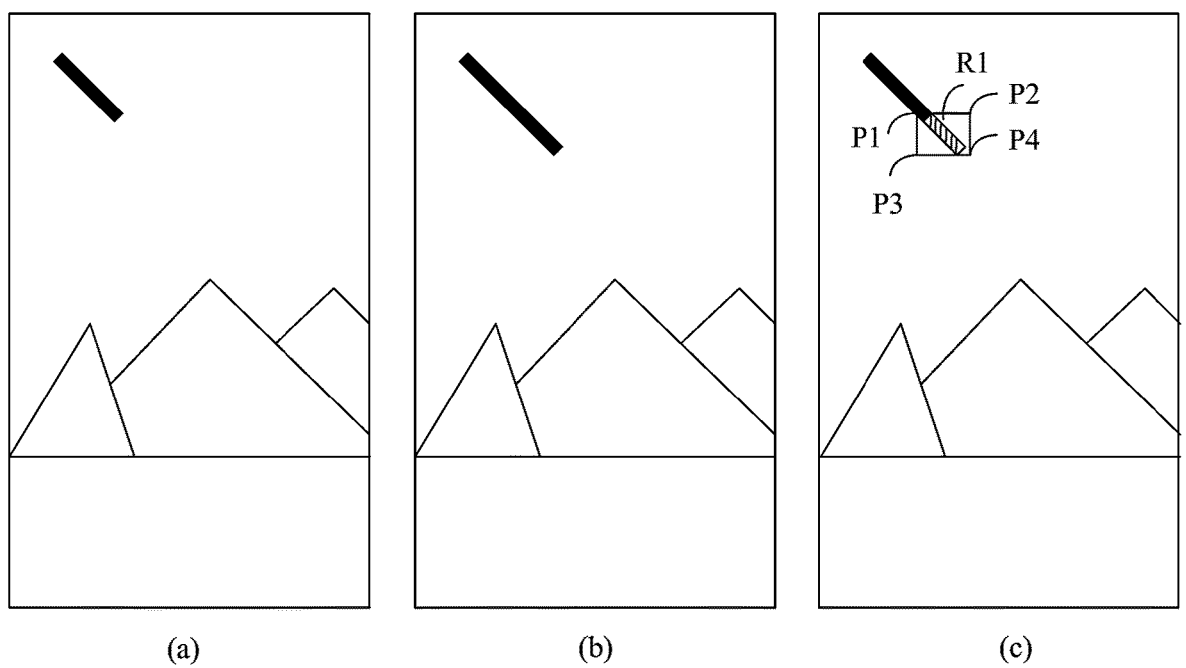
FIG. 10 is a schematic diagram of an interface of obtaining N difference regions by a first electronic device according to an embodiment of this application.

It should be noted that the N difference regions may include a plurality of independent regions. In FIG. 10, that the N difference regions are one region is used as an example. This is not limited in this embodiment of this application.

In this embodiment of this application, the first electronic device may generate the first timestamp of the $i^{th}$ frame in response to the update operation. The first timestamp of the $i^{th}$ frame is used to record a time at which the first electronic device generates the $i^{th}$ frame of interface image. The second encoded information further includes the first timestamp of the $i^{th}$ frame.

When generating the $i^{th}$ frame of interface image, the first electronic device generates the first timestamp of the $i^{th}$ frame. In addition, the first electronic device may add the first timestamp of the $i^{th}$ frame to the second encoded information, and send the second encoded information to the second electronic device.

It should be noted that, although the first electronic device sequentially sends to the second electronic device based on a sequence of generating the M frames of interface images, encoded information (that is, the first encoded information or the second encoded information) corresponding to the M frames of interface images, due to different amounts of encoded data, network fluctuation, or the like, a sequence in which the second electronic device receives the plurality of pieces of encoded information (that is, the first encoded information or the second encoded information) may be different from the sequence in which the second electronic device generates the M frames of interface images. For example, when the first electronic device sequentially sends to the second electronic device, the encoded information (that is, the first encoded information or the second encoded information) corresponding to the $i^{th}$ frame of interface image and the encoded information (that is, the first encoded information or the second encoded information) corresponding to the $(i+1)^{th}$ frame of interface image, due to different amounts of encoded data, network fluctuation, or the like, the second electronic device may first receive the encoded information corresponding to the $(i+1)^{th}$ frame of interface image, and then receive the encoded information corresponding to the $i^{th}$ frame of interface image. Therefore, both the first encoded information and the second encoded information may include the first timestamp of the $i^{th}$ frame, to indicate that the second electronic device may display the interface image in a time sequence with reference to the first timestamp.

In this embodiment of this application, the first electronic device may generate the second timestamp, and save the second timestamp. The second timestamp is used to record a time at which the first electronic device generates the first interface image, the second timestamp is a first reference timestamp of a first frame, and the first reference timestamp is a reference time at which the first electronic device records projection. In addition, if the area proportion of the N difference regions in the $i^{th}$ frame of interface image is greater than the preset value, the first electronic device determines that a first reference timestamp of the $(i+1)^{th}$ frame is the first timestamp of the $i^{th}$ frame; or if the area proportion of the N difference regions in the $i^{th}$ frame of interface image is less than the preset value, the first electronic device determines that the first reference timestamp of the $(i+1)^{th}$ frame is a first reference timestamp of the $i^{th}$ frame. The first encoded information further includes the first timestamp of the $i^{th}$ frame and the first reference timestamp of the $i^{th}$ frame.

When displaying the first interface image, the first electronic device may generate the second timestamp. When receiving the foregoing update operation, the first electronic device may use the second timestamp as the first reference timestamp of the first frame. When the area proportion of the N difference regions in the $i^{th}$ frame of interface image is greater than or equal to the preset value, the first electronic device may use the first timestamp of the $i^{th}$ frame as the first reference timestamp of the $(i+1)^{th}$ frame. When the area proportion of the N difference regions in the $i^{th}$ frame of interface image is less than the preset value, the first electronic device uses the first reference timestamp of the $i^{th}$ frame as the first reference timestamp of the $(i+1)^{th}$ frame, that is, the first reference timestamp of the $i^{th}$ frame continues to be used in the $(i+1)^{th}$ frame. In addition, the first electronic device may add the first timestamp of the $i^{th}$ frame and the first reference timestamp of the $i^{th}$ frame to the first encoded information, and send the first encoded information to the second electronic device.

The first reference timestamp of the $i^{th}$ frame is a reference time recorded by the first electronic device for projecting the $i^{th}$ frame of interface image onto the second electronic device. The second timestamp is the timestamp of the first interface image in S401.

It may be noted that if the area proportion of the N difference regions in the $i^{th}$ frame of interface image compared with the $(i-1)^{th}$ frame of interface image (N difference regions of the $i^{th}$ frame for short) in the $i^{th}$ frame of interface image is less than the preset value, it indicates that the $i^{th}$ frame of interface image differs slightly from the $(i-1)^{th}$ frame of interface image. In addition, if an area proportion of N difference regions in the $(i-1)^{th}$ frame of interface image compared with an $(i-2)^{th}$ frame of interface image (N difference regions of the $(i-1)^{th}$ frame for short) in the $(i-2)^{th}$ frame of interface image is greater than the preset value, it indicates that the (i-1)th frame of interface image differs greatly from the $(i-2)^{th}$ frame of interface image. The $i^{th}$ frame of interface image differs slightly from the $(i-1)^{th}$ frame of interface image, so that the $i^{th}$ frame of interface image also differs greatly from the $(i-2)^{th}$ frame of interface image.

Likewise, if an area proportion of N difference regions in an $(i-k)^{th}$ frame of interface image compared with an $(i-k-1)^{th}$ frame of interface image (N difference regions of the $(i-k)^{th}$ frame for short) in the $(i-k)^{th}$ frame of interface image is greater than the preset value, it indicates that the $(i-k)^{th}$ frame of interface image differs greatly from the $(i-k-1)^{th}$ frame of interface image and other interface images before the $(i-k-1)^{th}$ frame of interface image, where k is a positive integer. In addition, if an area proportion of N difference regions of any frame from an $(i-k+1)^{th}$ frame of interface image to the $i^{th}$ frame of interface image in any frame of interface image is less than the preset value, it indicates that the $i^{th}$ frame of interface image differs slightly from the $(i-k)^{th}$ frame of interface image and frames of interface images between the $(i-k)^{th}$ frame of interface image and the $i^{th}$ frame of interface image. Therefore, if the second electronic device first receives first encoded information of the $i^{th}$ frame of interface image before the $(i-k)^{th}$ frame of interface image due to different amounts of encoded data, network fluctuation, or the like, and displays content of the $i^{th}$ frame of interface image by using the received first encoded information before displaying the $(i-k)^{th}$ frame of interface image, a problem of picture misplacement occurs.

For the problem of picture misplacement, when determining that the area proportion of the N difference regions in the $i^{th}$ frame of interface image is greater than or equal to the preset value, the first electronic device uses the first timestamp of the $i^{th}$ frame as the first reference timestamp of the $(i+1)^{th}$ frame; otherwise, the first electronic device uses the first reference timestamp of the $i^{th}$ frame as the first reference timestamp of the $(i+1)^{th}$ frame. With reference to the foregoing description of "an area proportion of N difference regions of an $(i-k)^{th}$ frame in the $(i-k)^{th}$ frame of interface image is greater than the preset value", it may be learned that a first reference timestamp of the $(i-k+1)^{th}$ frame is equal to a first timestamp of the $(i-k)^{th}$ frame of interface image. With reference to the foregoing description of "an area proportion of N difference regions of any frame from an $(i-k+1)^{th}$ frame of interface image to the $i^{th}$ frame of interface image in any frame of interface image is less than the preset value", it may be learned that a first reference timestamp of any frame from the $(i-k+1)^{th}$ frame of interface image to the $i^{th}$ frame is equal to the first reference timestamp of the $(i-k+1)^{th}$ frame. Because the first reference timestamp of the $(i-k+1)^{th}$ frame is equal to the first timestamp of the $(i-k)^{th}$ frame of interface image, the first reference timestamp of the $i^{th}$ frame is equal to the first timestamp of the $(i-k)^{th}$ frame of interface image.

In addition, the first electronic device carries the first timestamp of the $i^{th}$ frame and the first reference timestamp of the $i^{th}$ frame in the first encoded information. Because the first reference timestamp of the $i^{th}$ frame is equal to the first timestamp of the $(i-k)^{th}$ frame of interface image, the first reference timestamp of the $i^{th}$ frame can be used to indicate the second electronic device to display the content of the $i^{th}$ frame of interface image after the $(i-k)^{th}$ frame of interface image. In this way, a problem of picture misplacement caused because the content of the $i^{th}$ frame of interface image is displayed before the $(i-k)^{th}$ frame of interface image can be avoided.

Figure 11A:
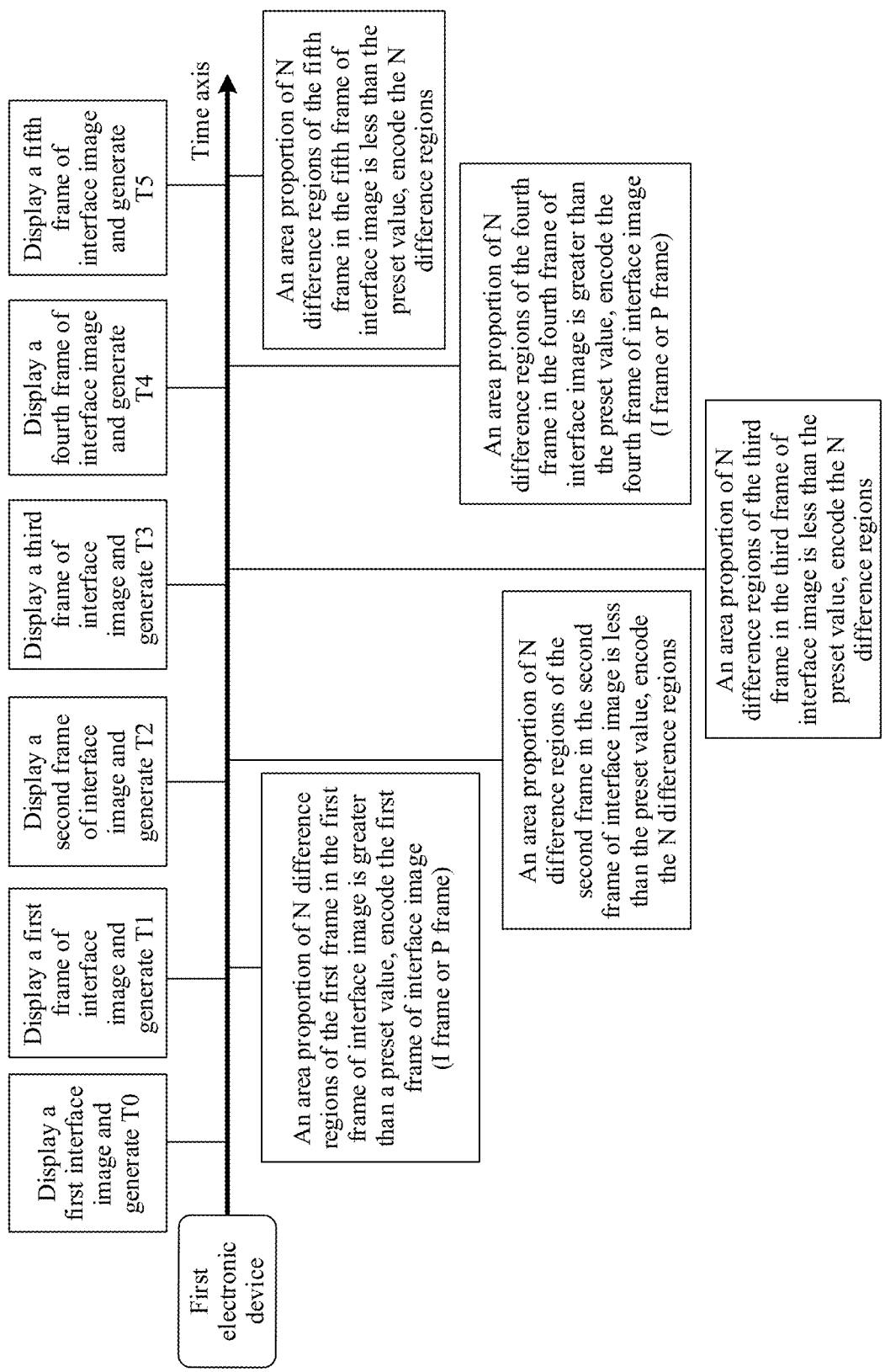
FIG. 11A is a time sequence diagram in which a first electronic device displays an interface image and updates a timestamp according to an embodiment of this application.

For example, M=5 is used as an example to describe a process in which a first electronic device generates a first reference timestamp. As shown in FIG. 11A, a first electronic device first displays a first interface image, and generates a second timestamp T0. Then, the first electronic device receives an update operation, and sequentially performs the following processes: displaying a first frame of interface image and generating a first timestamp T1 of the first frame, displaying a second frame of interface image and generating a first timestamp T2 of the second frame, displaying a third frame of interface image and generating a first timestamp T3 of the third frame, displaying a fourth frame of interface image and generating a first timestamp T4 of the fourth frame, and displaying a fifth frame of interface image and generating a first timestamp T5 of the fifth frame. An arrow direction of a time axis indicates a time sequence.

As shown in FIG. 11B, when receiving the update operation, the first electronic device may further use the second timestamp T0 as a first reference timestamp $T1_{1\text{-}jz}$ of the first frame. The first electronic device determines that an area proportion of N difference regions of the first frame of interface image compared with the first interface image (N difference regions of the first frame for short) in the first frame of interface image is greater than a preset value, and uses the first timestamp T1 of the first frame as a first reference timestamp $T2_{1\text{-}jz}$ of the second frame. The first electronic device determines that an area proportion of N difference regions of the second frame of interface image compared with the first frame of interface image (N difference regions of the second frame for short) in the second frame of interface image is less than the preset value, and uses the first reference timestamp $T2_{1\text{-}jz}$ of the second frame as a first reference timestamp $T3_{1\text{-}jz}$ of the third frame. The first electronic device determines that an area proportion of N difference regions of the third frame of interface image compared with the second frame of interface image (N difference regions of the third frame for short) in the third frame of interface image is less than the preset value, and uses the first reference timestamp $T3_{1\text{-}jz}$ of the third frame as a first reference timestamp $T4_{1\text{-}jz}$ of the fourth frame. The first electronic device determines that an area proportion of N difference regions of the fourth frame of interface image compared with the third frame of interface image (N difference regions of the fourth frame for short) in the fourth frame of interface image is greater than the preset value, and uses the first timestamp T4 of the fourth frame as a first reference timestamp $T5_{1\text{-}jz}$ of the fifth frame. The first electronic device further determines that an area proportion of N difference regions of the fifth frame of interface image compared with the fourth frame of interface image (N difference regions of the fifth frame for short) in the fifth frame of interface image is less than the preset value.

In addition, as shown in FIG. 11A, the first electronic device sequentially encodes the first frame of interface image (that is, an I frame or a P frame), the N difference regions of the second frame, the N difference regions of the third frame, the fourth frame of interface image (that is, an I frame or a P frame), and the N difference regions of the fifth frame. The first electronic device separately encodes the complete first frame of interface image and the complete fourth frame of interface image. In this case, the first frame of interface image may be an I frame or a P frame, and the fourth frame of interface image may be an I frame or a P frame.

In this embodiment of this application, to distinguish between the first encoded information and the second encoded information, the first encoded information may further include a first identifier representing the N difference regions, and the second encoded information may further include a second identifier representing the $i^{th}$ frame of interface image.

For example, if a transmission path used by the first electronic device to send the first encoded information to the second electronic device is different from a transmission path used to send the second encoded information, the first identifier may be information (for example, a port number) related to the transmission path used to send the first encoded information, and the second identifier may be information (for example, a port number) related to the transmission path used to send the second encoded information.

Further, a codec standard used by the first electronic device for encoding the image content of the N difference regions may be different from a codec standard used for encoding the $i^{th}$ frame of interface image. In this case, the first identifier may be used to indicate the second electronic device to decode the first encoded data by using a codec standard used by the first electronic device when the first electronic device generates the first encoded data, and the second identifier may be used to indicate the second electronic device to decode the second encoded data by using a codec standard used by the first electronic device when the first electronic device generates the second encoded data.

In this embodiment of this application, a data structure of the first encoded information may be shown in the following Table 1: Different bytes in the first encoded information store different data. The first encoded information specifically includes: (1) data indicating a encoding type of the first encoded data, where a value may be 0 or 1, 0 indicates that the first encoded data is original data (that is, pixel values of all pixels in the N difference regions), and 1 indicates JPEG or another coding manner; (2) a width video Width of the $(i-1)^{th}$ frame of interface image; (3) a height videoHeight of the $(I-1)^{th}$ frame of interface image, where a unit of the width and the height may be a pixel; (4) a first reference timestamp Basetimestamp of the $i^{th}$ frame; (5) a first timestamp Playtimestamp of the $i^{th}$ frame; (6) a total quantity N of difference regions; (7) a total length of the first encoded data (or a length len of a payload); (8) location information of a first difference region in the N difference regions, for example, xmin, xmax, ymin, and ymax of the first difference region; (9) a data length len1 occupied by the first difference region in the first encoded data (in other words, a length len1 of the first difference region); (10) encoded data data1 of the first difference region, where len1 is a length of data1; (11) location information of an $N^{th}$ difference region, for example, xmin, xmax, ymin, and ymax of the $N^{th}$ difference region; (12) a data length lenN occupied by the $N^{th}$ difference region in the first encoded data (in other words, a length lenN of the $N^{th}$ difference region); and (13) encoded data dataN of the $N^{th}$ difference region, where lenN is a length of dataN.

TABLE 1

| Frame header | unit8 | Data indicating an encoding type of first encoded data |
|---|---|---|
| | unit32 | Width videoWidth |
| | unit32 | Height videoHeight |
| | unit64 | First reference timestamp Basetimestamp of $i^{th}$ frame |
| | unit64 | First timestamp Playtimestamp of $i^{th}$ frame |
| | unit32 | N |
| | unit32 | Length len of payload |

TABLE 1-continued

| Payload | unit32 [4] | Location information of first difference region |
|---|---|---|
| | unit32 | Length len1 of first difference region |
| | unit8 [len1] | Encoded data data1 of first difference region |
| | ... | ... |
| | unit32 [4] | Location information of $N^{th}$ difference region |
| | unit32 | Length lenN of $N^{th}$ difference region |
| | unit8 [lenN] | Encoded data dataN of $N^{th}$ difference region | unit8 indicates that data is an unsigned 8-bit integer, unit32 indicates that data is an unsigned 32-bit integer, unit64 indicates that data is an unsigned 64-bit integer, unit32[4] indicates that data is an unsigned 32-bit integer whose length is equal to 4, unit8[len1] indicates that data is an unsigned 32-bit integer whose length is equal to len1, and unit8[lenN] indicates that data is an unsigned 32-bit integer whose length is equal to lenN. The first encoded information may be divided into a frame header and a payload, and is used to store different data.

In this embodiment of this application, the second encoded information further includes the first timestamp of the $i^{th}$ frame, and the first timestamp of the $i^{th}$ frame is used to record a time at which the first electronic device generates the $i^{th}$ frame of interface image. After the second electronic device receives the second encoded information from the first electronic device, the second electronic device determines that a second reference timestamp of an $(i+1)^{th}$ frame is the first timestamp of the $i^{th}$ frame, where the second reference timestamp is a reference time at which the second electronic device records projection.

For example, the second encoded information may include the foregoing second identifier. When determining that the second encoded information includes the second identifier, the second electronic device may determine that the second reference timestamp of the (i+1)th frame is the first timestamp of the $i^{th}$ frame.

In this embodiment of this application, the first encoded information further includes the first timestamp of the $i^{th}$ frame and the first reference timestamp of the $i^{th}$ frame, where the first reference timestamp is a reference time at which the first electronic device records projection. After the second electronic device receives the first encoded information from the first electronic device, and before the second electronic device decodes the first encoded data to obtain the image content of the N difference regions, the second electronic device determines that a time recorded by the first timestamp of the $i^{th}$ frame is later than a time recorded by the first reference timestamp of the $i^{th}$ frame, and the time recorded by the first reference timestamp of the $i^{th}$ frame is equal to a time recorded by the second reference timestamp of the $i^{th}$ frame.

After the second electronic device receives the first encoded information from the first electronic device, and when the second electronic device determines that the time recorded by the first timestamp of the $i^{th}$ frame is later than the time recorded by the first reference timestamp of the $i^{th}$ frame, and the time recorded by the first reference timestamp of the $i^{th}$ frame is equal to the time recorded by the second reference timestamp of the $i^{th}$ frame, the second electronic device decodes the first encoded data to obtain the image content of the N difference regions.

Further, after receiving the first encoded information from the first electronic device, the second electronic device may further determine that the second reference timestamp of the $(i+1)^{th}$ frame is the second reference timestamp of the $i^{th}$ frame.

It may be understood that, if the second electronic device receives the second encoded information of the $(i-1)^{th}$ frame of interface image (second encoded information of the $(i-1)^{th}$ frame for short), the second electronic device uses a first timestamp of the (i-1)th frame in the second encoded information of the $(i-1)^{th}$ frame as the second reference timestamp of the $i^{th}$ frame (that is, the second reference timestamp of the $i^{th}$ frame is equal to the first timestamp of the $(i-1)^{th}$ frame), and further displays content of the $(i-1)^{th}$ frame of interface image by using the second encoded information of the $(i-1)^{th}$ frame. That the second encoded information of the $(i-1)^{th}$ frame is received indicates that an area proportion of N difference regions of the $(i-1)^{th}$ frame in the $(i-1)^{th}$ frame of interface image is greater than the preset value, and that the area proportion of the N difference regions of the $(i-1)^{th}$ frame in the $(i-1)^{th}$ frame of interface image is greater than the preset value indicates that the $(i-1)^{th}$ frame of interface image differs greatly from the $(i-2)^{th}$ frame of interface image. Therefore, the $i^{th}$ frame of interface image differs more greatly from the $(i-2)^{th}$ frame of interface image. Then, if the second electronic device further receives the first encoded information of the $i^{th}$ frame of interface image (the first encoded information of the $i^{th}$ frame for short), it indicates that the area proportion of the N difference regions of the $i^{th}$ frame in the $i^{th}$ frame of interface image is less than the preset value, and that the area proportion of the N difference regions of the $i^{th}$ frame in the $i^{th}$ frame of interface image is less than the preset value indicates that the $i^{th}$ frame of interface image differs slightly from the $(i-1)^{th}$ frame of interface image. The first encoded information of the $i^{th}$ frame of interface image may include the first reference timestamp of the $i^{th}$ frame. When determining that the area proportion of the N difference regions of the $(i-1)^{th}$ frame in the $(i-1)^{th}$ frame of interface image is greater than the preset value, the first electronic device uses the first timestamp of the (i-1)th frame as the first reference timestamp of the $i^{th}$ frame, that is, the first reference timestamp of the $i^{th}$ frame is equal to the first timestamp of the $(i-1)^{th}$ frame. Further, because the second reference timestamp of the $i^{th}$ frame is equal to the first timestamp of the (i-1)th frame, it can be learned that the first reference timestamp of the $i^{th}$ frame is equal to the second reference timestamp of the $i^{th}$ frame.

In conclusion, it can be learned that, when the first reference timestamp of the $i^{th}$ frame is equal to the second reference timestamp of the $i^{th}$ frame, it indicates that the $i^{th}$ frame of interface image differs slightly from the $(i-1)^{th}$ frame of interface image, and further indicates that the second electronic device already displays the content of the (i-1)th frame of interface image. In this case, when the first reference timestamp of the $i^{th}$ frame is equal to the second reference timestamp of the $i^{th}$ frame, the second electronic device displays the content of the $i^{th}$ frame of interface image by using the first encoded information of the $i^{th}$ frame. Because the content of the $i^{th}$ frame of interface image differs slightly from the content of the displayed $(i-1)^{th}$ frame of interface image, a problem of picture misplacement because a sequence in which the second electronic device receives encoded information (that is, the first encoded information or the second encoded information) corresponding to the M frames of interface images is different from a sequence in which the first electronic device generates the M frames of interface images can be avoided.

In this embodiment of this application, when the second electronic device determines that the time recorded by the first timestamp of the $i^{th}$ frame is not later than (that is, earlier than or equal to) the time recorded by the first reference timestamp of the $i^{th}$ frame, or the time recorded by the first reference timestamp of the $i^{th}$ frame is earlier than the time recorded by the second reference timestamp of the $i^{th}$ frame, the second electronic device may skip processing the first encoded information of the $i^{th}$ frame of interface image, or delete the first encoded information. When the time recorded by the first timestamp of the $i^{th}$ frame is later than the time recorded by the first reference timestamp of the $i^{th}$ frame, and the time recorded by the first reference timestamp of the $i^{th}$ frame is later than the time recorded by the second reference timestamp of the $i^{th}$ frame, the second electronic device may skip processing the first encoding information of the $i^{th}$ frame of interface image.

Further, when the second electronic device receives second encoded information of a $j^{th}$ frame of interface image (second encoded information of the $j^{th}$ frame for short) when the time recorded by the first timestamp of the $i^{th}$ frame is later than the time recorded by the first reference timestamp of the $i^{th}$ frame, and the time recorded by the first reference timestamp of the $i^{th}$ frame is later than the time recorded by the second reference timestamp of the $i^{th}$ frame, the second electronic device uses a first timestamp of the $j^{th}$ frame as a second reference timestamp of a $(j+1)^{th}$ frame, and updates the interface image by using the second encoded information of the $j^{th}$ frame. The second electronic device may further perform S409 and S410 on the first encoded information of the $i^{th}$ frame of interface image when the time recorded by the first reference timestamp of the $i^{th}$ frame is equal to the time recorded by the second reference timestamp of the $(j+1)^{th}$ frame.

It may be understood that, in one aspect, the first encoded information of the $i^{th}$ frame received by the second electronic device includes the first timestamp of the $i^{th}$ frame and the first reference timestamp of the $i^{th}$ frame. If the time recorded by the first timestamp of the $i^{th}$ frame is not later than the time recorded by the first reference timestamp of the $i^{th}$ frame, the first encoded information of the $i^{th}$ frame is incorrect. Therefore, the second electronic device skips processing the first encoded information. If the time recorded by the first reference timestamp of the $i^{th}$ frame is earlier than the time recorded by the second reference timestamp of the $i^{th}$ frame, it indicates that the second electronic device already receives second encoded information of an $(i+h)^{th}$ frame of interface image (second encoded information of the $(i+h)^{th}$ frame for short), and uses a first timestamp of the $(i+h)^{th}$ frame in the second encoded information of the $(i+h)^{th}$ frame as the second reference timestamp of the $i^{th}$ frame. The second electronic device further displays content of the $(i+h)^{th}$ frame of interface image by using the second encoded information of the $(i+h)^{th}$ frame, and the content of the $i^{th}$ frame of interface image differs greatly from content of the currently displayed interface image. Therefore, the second electronic device skips processing the first encoded information of the $i^{th}$ frame, that is, the second electronic device does not display content of the $i^{th}$ frame of interface image, to avoid a problem of picture misplacement. h is a positive integer.

In another aspect, the first encoded information of the $i^{th}$ frame received by the second electronic device includes the first timestamp of the $i^{th}$ frame and the first reference timestamp of the $i^{th}$ frame. If the time recorded by the first timestamp of the $i^{th}$ frame is later than the time recorded by the first reference timestamp of the $i^{th}$ frame, and the time recorded by the first reference timestamp of the $i^{th}$ frame is later than the time recorded by the second reference timestamp of the $i^{th}$ frame, it indicates that the first reference timestamp of the $i^{th}$ frame is equal to the first timestamp of the $(i-k)^{th}$ frame, and the second reference timestamp of the $i^{th}$ frame is equal to a first timestamp of an $(i-k-q)^{th}$ frame. The second reference timestamp of the $i^{th}$ frame is equal to the first timestamp of the $(i-k-q)^{th}$ frame, which further indicates that the second electronic device has not received the second encoded information of the $(i-k)^{th}$ frame, and the second electronic device displays only content of interface images before the $(i-k)^{th}$ frame. In addition, the first reference timestamp of the $i^{th}$ frame is equal to the first timestamp of the $(i-k)^{th}$ frame, which further indicates that a difference between the $i^{th}$ frame of interface image and the $(i-k)^{th}$ frame of interface image is smaller than a difference between the $i^{th}$ frame of interface image and the interface images before the $(i-k)^{th}$ frame. Further, it may be learned that the content of the $i^{th}$ frame of interface image differs greatly from content of the interface image currently displayed by the second electronic device. Therefore, the first encoded information of the $i^{th}$ frame is not processed, that is, the content of the $i^{th}$ frame of interface image is not displayed. Then, if the second electronic device further receives the second encoded information of the $j^{th}$ frame, the second electronic device uses the first timestamp of the $j^{th}$ frame in the second encoded information of the $j^{th}$ frame as the second reference timestamp of the $(j+1)^{th}$ frame, and displays content of the $j^{th}$ frame of the interface image by using the second encoded information of the $j^{th}$ frame. In this case, if the first reference timestamp of the $i^{th}$ frame is equal to the second reference timestamp of the $(j+1)^{th}$ frame, it indicates that the $(j+1)^{th}$ frame is the $(i-k)^{th}$ frame, that is, the second electronic device displays content of the $(i-k)^{th}$ frame of interface image that has a small difference from the $i^{th}$ frame of interface image. Herein, the second electronic device further displays the content of the $i^{th}$ frame of interface image by using the first encoded information of the $i^{th}$ frame, so that a problem of picture misplacement because a sequence in which the second electronic device receives encoded information (that is, the first encoded information or the second encoded information) corresponding to the M frames of interface images is different from a sequence in which the first electronic device generates the M frames of interface images can be avoided. k and q are positive integers, and k and q may be equal or unequal.

For example, the five frames of interface images in FIG. 11A and FIG. 11B are used as an example again. As shown in (a) in FIG. 12, the first electronic device sequentially sends second encoded information of the first frame of interface image (second coded information of the first frame for short), first encoded information of the second frame of interface image (first encoded information of the second frame for short), first encoded information of the third frame of interface image (first encoded information of the third frame for short), second encoded information of the fourth frame of interface image (second encoded information of the fourth frame for short), and first encoded information of the fifth frame of interface image (first encoded information of the fifth frame for short) to the second electronic device. The second encoded information of the first frame includes the first timestamp T1 of the first frame. The first encoded information of the second frame includes the first timestamp T2 of the second frame and the first reference timestamp $T2_{1-jz}=T1$ of the second frame. The first encoded information of the third frame includes the first timestamp T3 of the third frame and the first reference timestamp $T3_{1-jz}=T2_{1-jz}=T1$ of the third frame. The second encoded information of the fourth frame includes the first timestamp T4 of the fourth frame. The first encoded information of the fifth frame includes the first timestamp T5 of the fifth frame and the first reference timestamp $T5_{1-jz}=T4$ of the fifth frame. The first electronic device may send the first encoded information by using a first transmission path, and send the second encoded information by using a second transmission path. However, due to different amounts of encoded data and network fluctuation, the second electronic device may sequentially receive the second encoded information of the first frame of interface image, the first encoded information of the second frame of interface image, the first encoded information of the third frame of interface image, the first encoded information of the fifth frame of interface image, and the second encoded information of the fourth frame of interface image.

Figure 12:
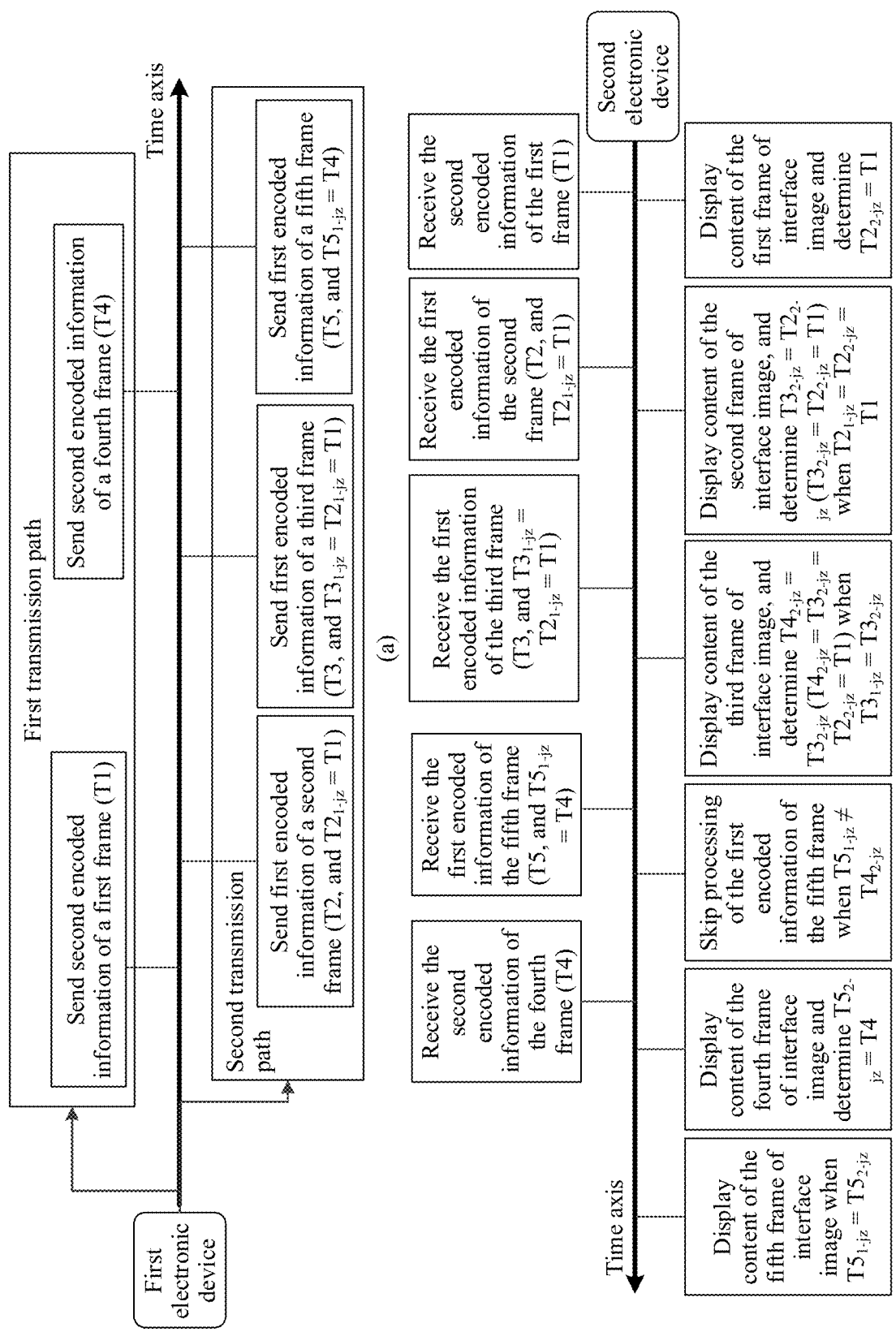
FIG. 12 is a time sequence diagram in which a first electronic device projects an interface onto a second electronic device according to an embodiment of this application.

As shown in (b) in FIG. 12, the second electronic device may receive the second encoded information (including the first time stamp T1 of the first frame) of the first frame, display the content of the first frame of interface image, and determine a second reference timestamp $T2_{2-jz}=T1$ of the second frame. The second electronic device then receives the first encoded information (including the first timestamp T2 of the second frame and the first reference time stamp $T2_{1-jz}=T1$ of the second frame) of the second frame, displays the content of the second frame of interface image when $T2_{1-jz}=T2_{2-jz}=T1$, and determines a second reference timestamp $T3_{2-jz}=T2_{2-jz}$ ($T3_{2-jz}=T2_{2-jz}=T1$) of the third frame. The second electronic device then receives the first encoded information (including T3 and $T3_{1-jz}=T2_{1-jz}=T1$) of the third frame, displays the content of the third frame of interface image when $T3_{1-jz}=T3_{2-jz}$, and determines a second reference timestamp $T4_{2-jz}=T3_{2-jz}$ ($T4_{2-jz}=T3_{2-jz}=T2_{2-jz}=T1$) of the fourth frame. The second electronic device then receives the first encoded information (including T5 and $T5_{1-jz}=T4$) of the fifth frame, and skips processing the first encoded information of the fifth frame when $T5_{1-jz}$ is not equal to $T4_{2-jz}$.

Finally, the second electronic device receives the second encoded information (including T4) of the fourth frame, displays the content of the fourth frame of interface image, and determines the second reference timestamp $T5_{2-jz}=T4$ of the fifth frame. Then, the first electronic device displays the content of the fifth frame of interface image when $T5_{1-jz}=T5_{2-jz}$.

Figure 13A:
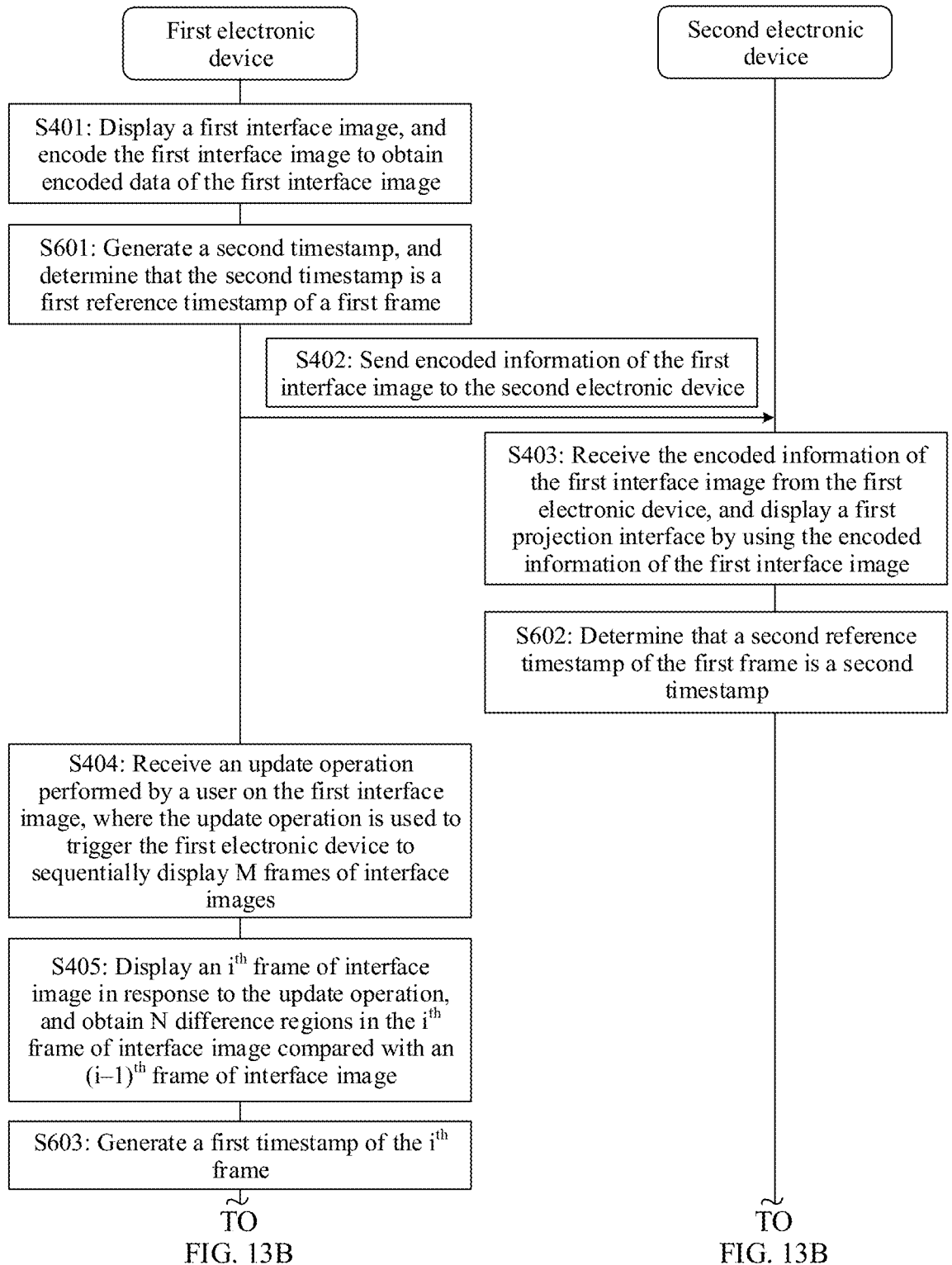
FIG. 13A to FIG. 13C are a flowchart 2 of a multi-screen collaborative display method in a first usage scenario according to an embodiment of this application.
Figure 13B:
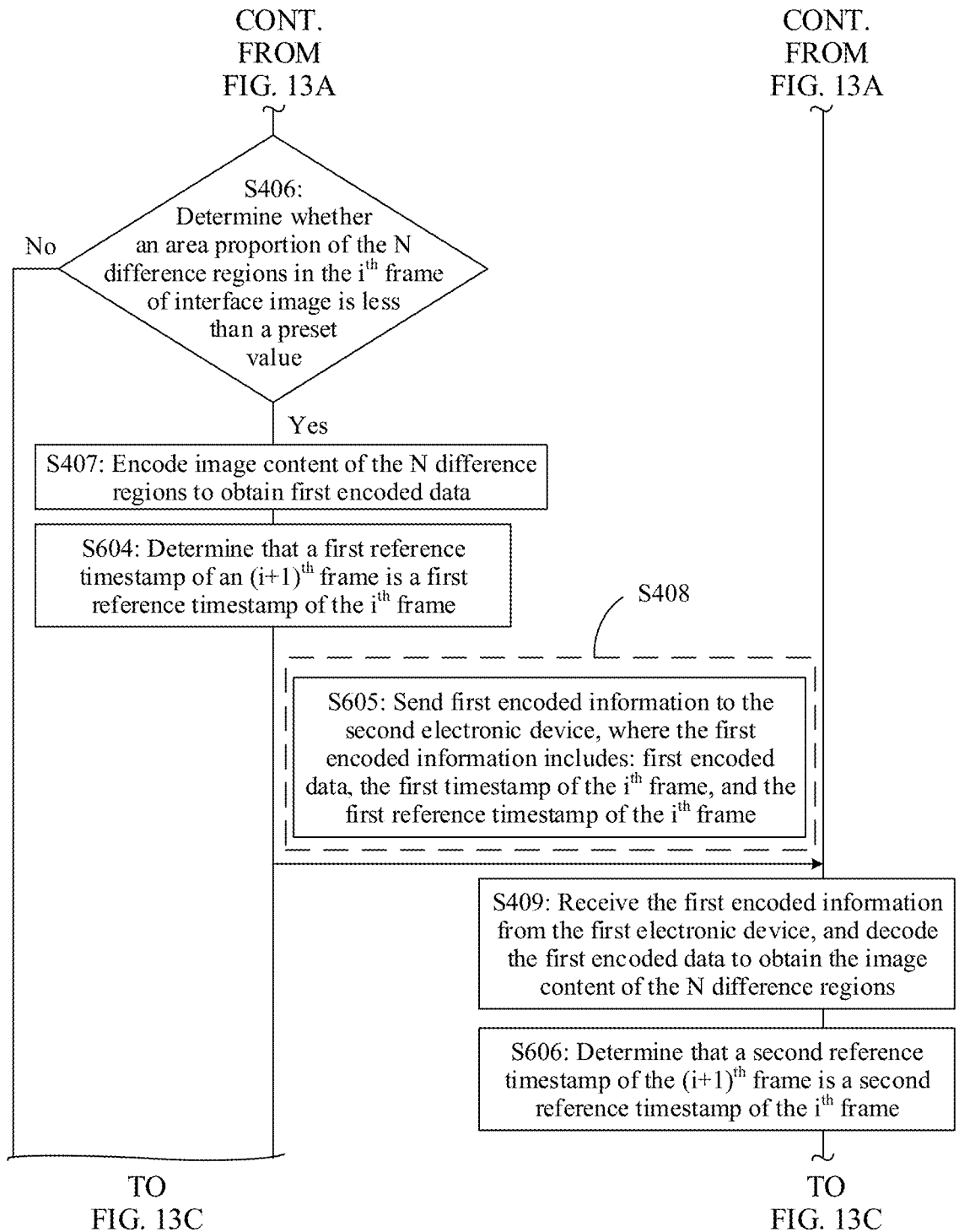
Figure 13C:
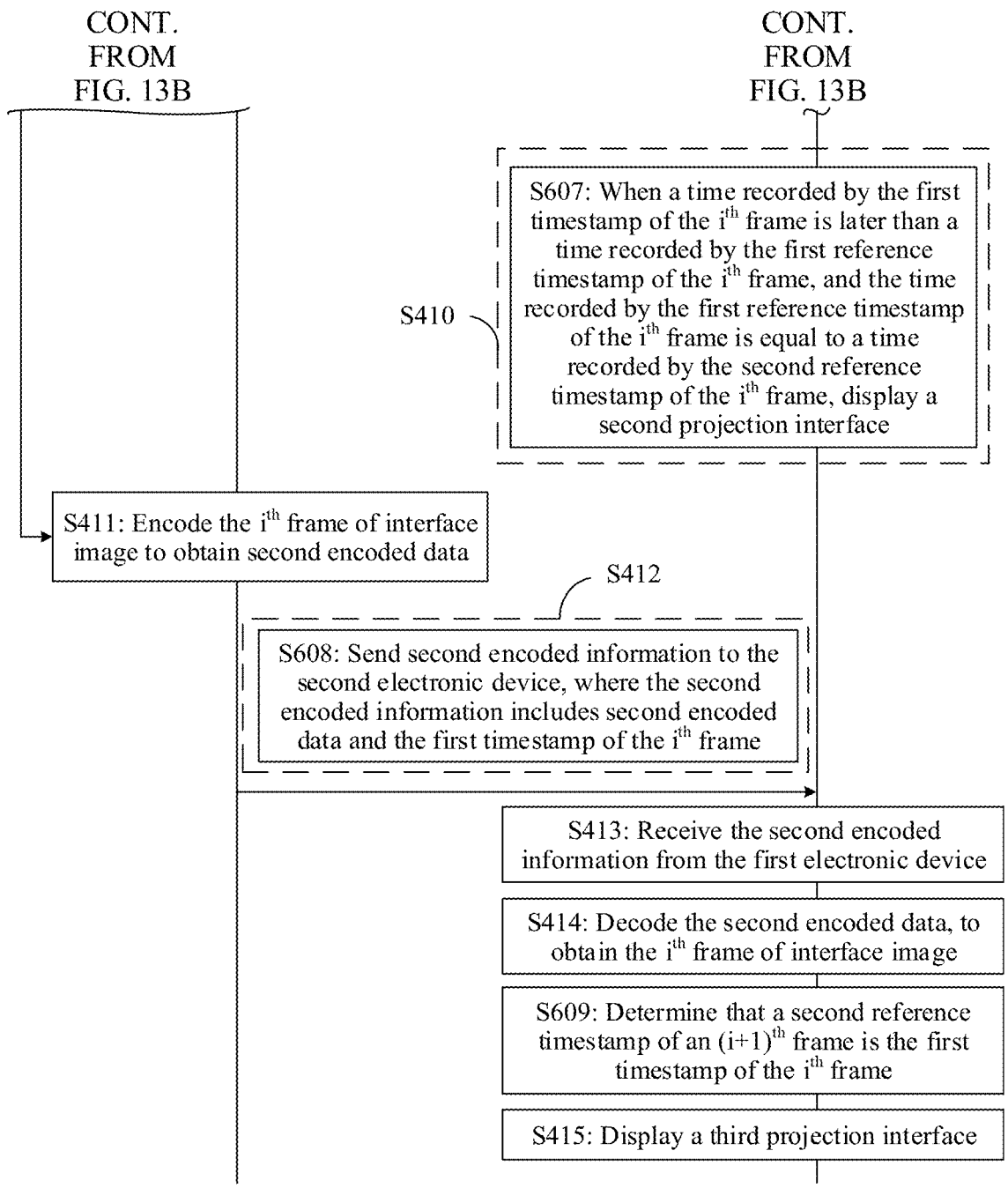

Refer to FIG. 13A to FIG. 13C. An embodiment of this application provides a multi-screen collaborative display method. The method is applied to a first electronic device and a second electronic device in the foregoing first usage scenario. The first electronic device is connected to the second electronic device. As shown in FIG. 13A to FIG. 13C, after S401 and before S402, the display method may include S601. After S403, the display method may include S602. After S405, the display method may include S603. After S407 and before S408, the display method may include S604. S408 in the display method may include S605. After S409, the display method may include S606. S410 in the display method may include S607. S412 in the display method may include S608. After S414, the display method may include S609.

S601: The first electronic device generates a second timestamp, and determines that the second timestamp is a first reference timestamp of a first frame.

The second timestamp is used to record a time at which the first electronic device generates the first interface image. The first reference timestamp is a reference time at which the first electronic device records projection.

S602: The second electronic device determines that a second reference timestamp of the first frame is a second timestamp.

S603: The first electronic device generates a first timestamp of the $i^{th}$ frame.

The first timestamp of the $i^{th}$ frame is used to record a time at which the first electronic device generates the $i^{th}$ frame of interface image.

S604: The first electronic device determines that a first reference timestamp of an $(i+1)^{th}$ frame is a first reference timestamp of the $i^{th}$ frame.

S605: The first electronic device sends first encoded information to the second electronic device, where the first encoded information includes: first encoded data, the first timestamp of the $i^{th}$ frame, and the first reference timestamp of the $i^{th}$ frame.

The first encoded information further includes location information of N difference regions in the $i^{th}$ frame of interface image compared with the $(i-1)^{th}$ frame of interface image (namely, location information of the N difference regions in the $i^{th}$ frame of interface image).

S606: The second electronic device determines that a second reference timestamp of the $(i+1)^{th}$ frame is a second reference timestamp of the $i^{th}$ frame.

S607: When a time recorded by the first timestamp of the $i^{th}$ frame is later than a time recorded by the first reference timestamp of the $i^{th}$ frame, and the time recorded by the first reference timestamp of the $i^{th}$ frame is equal to a time recorded by the second reference timestamp of the $i^{th}$ frame, the second electronic device displays a second projection interface.

S608: The first electronic device sends second encoded information to the second electronic device, where the second encoded information includes second encoded data and the first timestamp of the $i^{th}$ frame.

S609: The second electronic device determines that a second reference timestamp of an $(i+1)^{th}$ frame is the first timestamp of the $i^{th}$ frame.

Figure 14A:
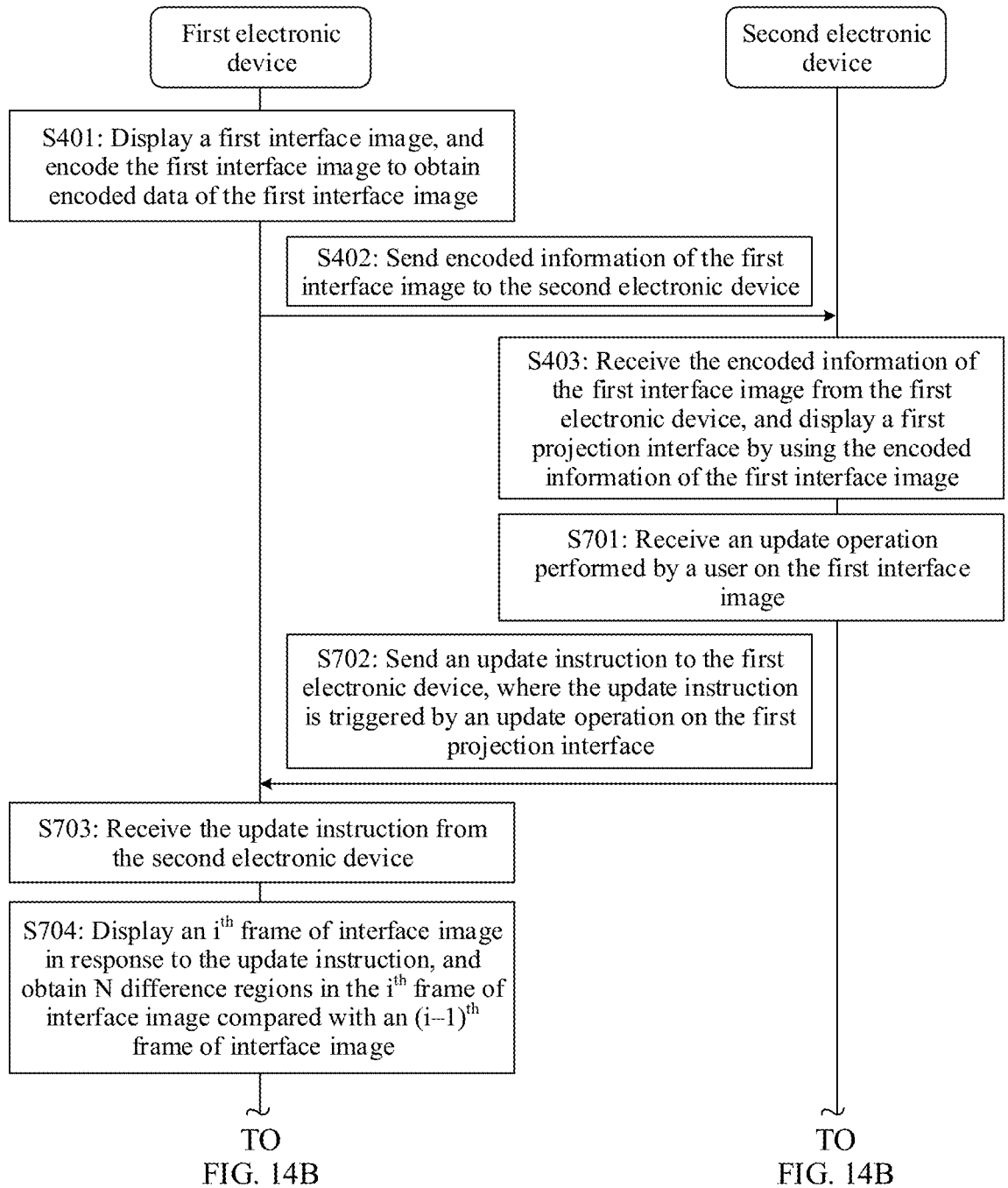
FIG. 14A and FIG. 14B are a flowchart 1 of a multi-screen collaborative display method in a reverse control scenario according to an embodiment of this application.
Figure 14B:
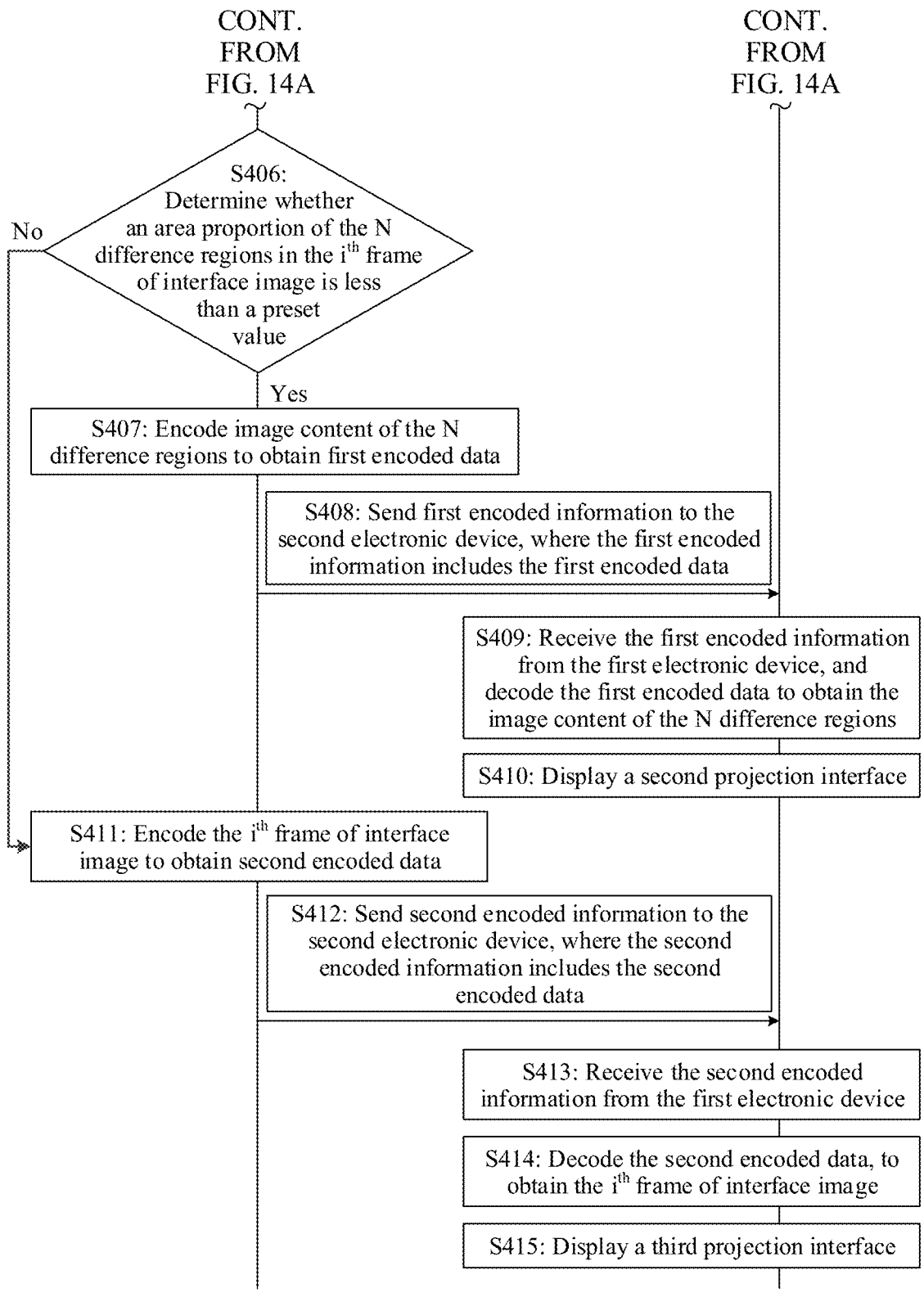

In this embodiment of this application, in the foregoing reverse control scenario, after the first electronic device is connected to the second electronic device, the first electronic device projects content of the interface image displayed by the first electronic device onto the second electronic device, and the second electronic device may further receive an update operation performed by a user on the interface image. In response to the update operation, the second electronic device indicates the first electronic device to update the interface image, receives an updated interface image from the first electronic device, and displays content of the updated interface image. Specifically, as shown in FIG. 14A and FIG. 14B, in the foregoing reverse control scenario, after S403 and before S406, S701 to S704 may be performed, and S404 to S405 may not be performed in the multi-screen collaborative display method applied to the first electronic device and the second electronic device.

S701: The second electronic device receives an update operation performed by a user on the first interface image.

The update operation is used to trigger the first electronic device to sequentially display M frames of interface images.

S702: The second electronic device sends an update instruction to the first electronic device, where the update instruction is triggered by an update operation on the first projection interface.

S703: The first electronic device receives the update instruction from the second electronic device.

The update instruction is used to trigger the first electronic device to sequentially display the M frames of interface images.

S704: Display an $i^{th}$ frame of interface image in response to the update instruction, and obtain N difference regions in the $i^{th}$ frame of interface image compared with an $(i-1)^{th}$ frame of interface image.

It should be noted that for a detailed process of displaying the $i^{th}$ frame of interface image by the first electronic device in response to the update instruction in S703, refer to the description of displaying the $i^{th}$ frame of interface image by the first electronic device in response to the update operation in S404. Details are not described herein again in this embodiment of this application.

Figures 1, 15A:
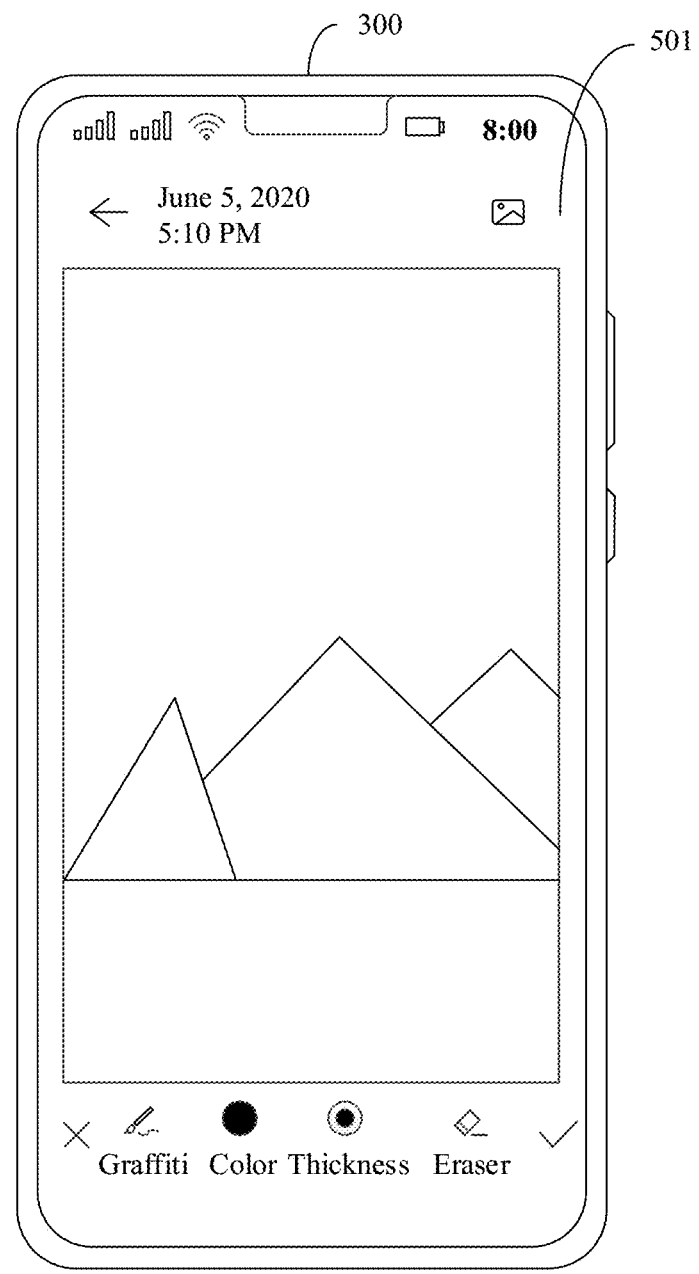
Figures 2, 15A:
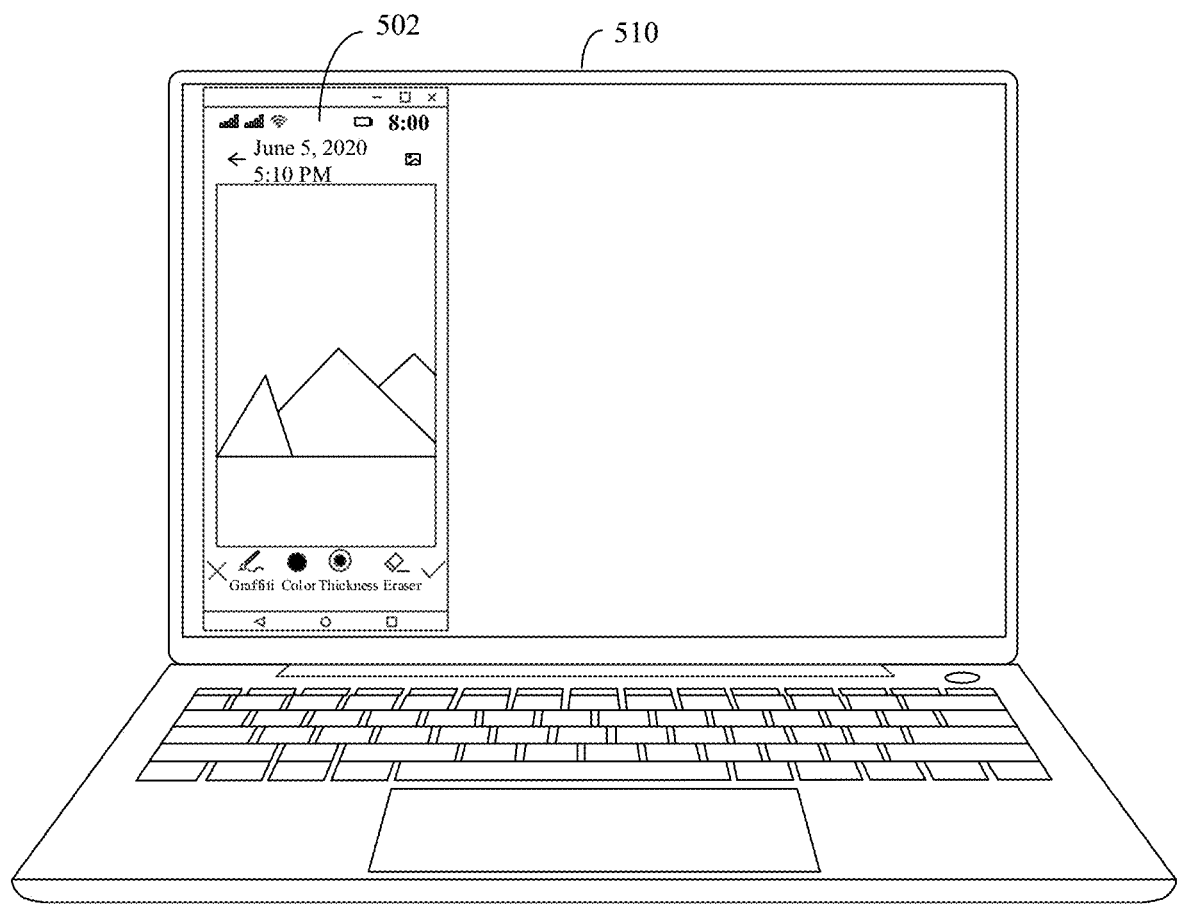
Figures 1, 15B:
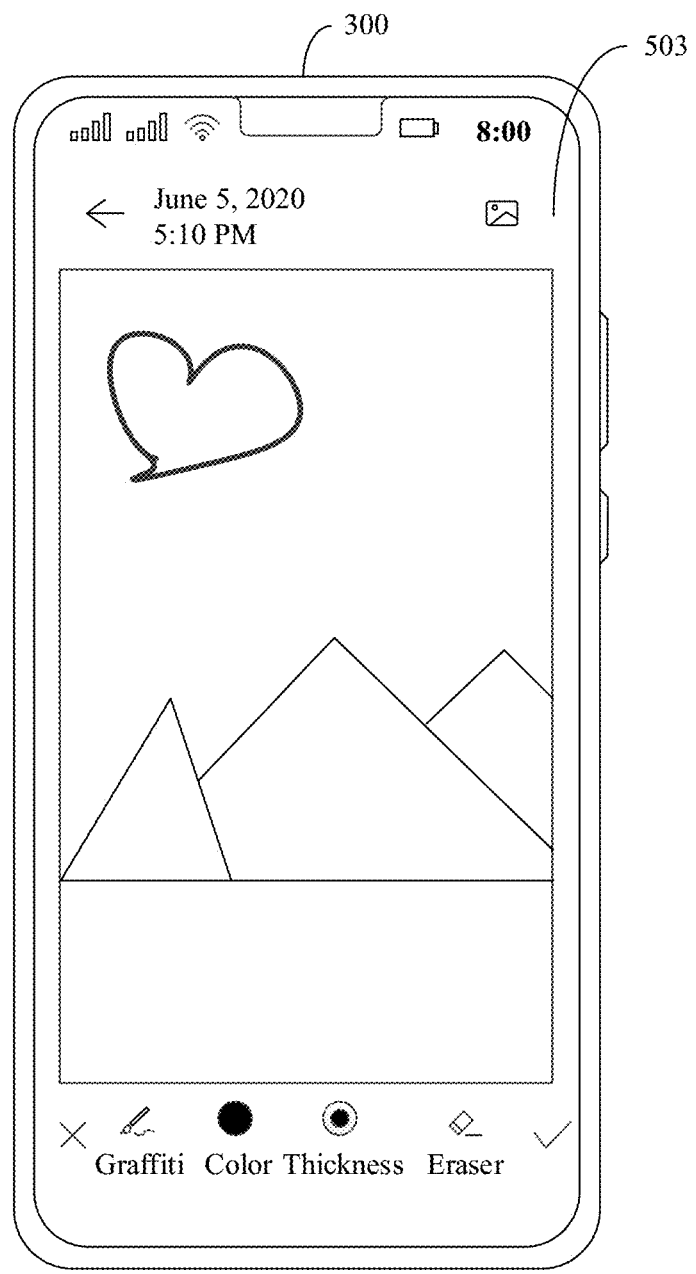
Figures 2, 15B:
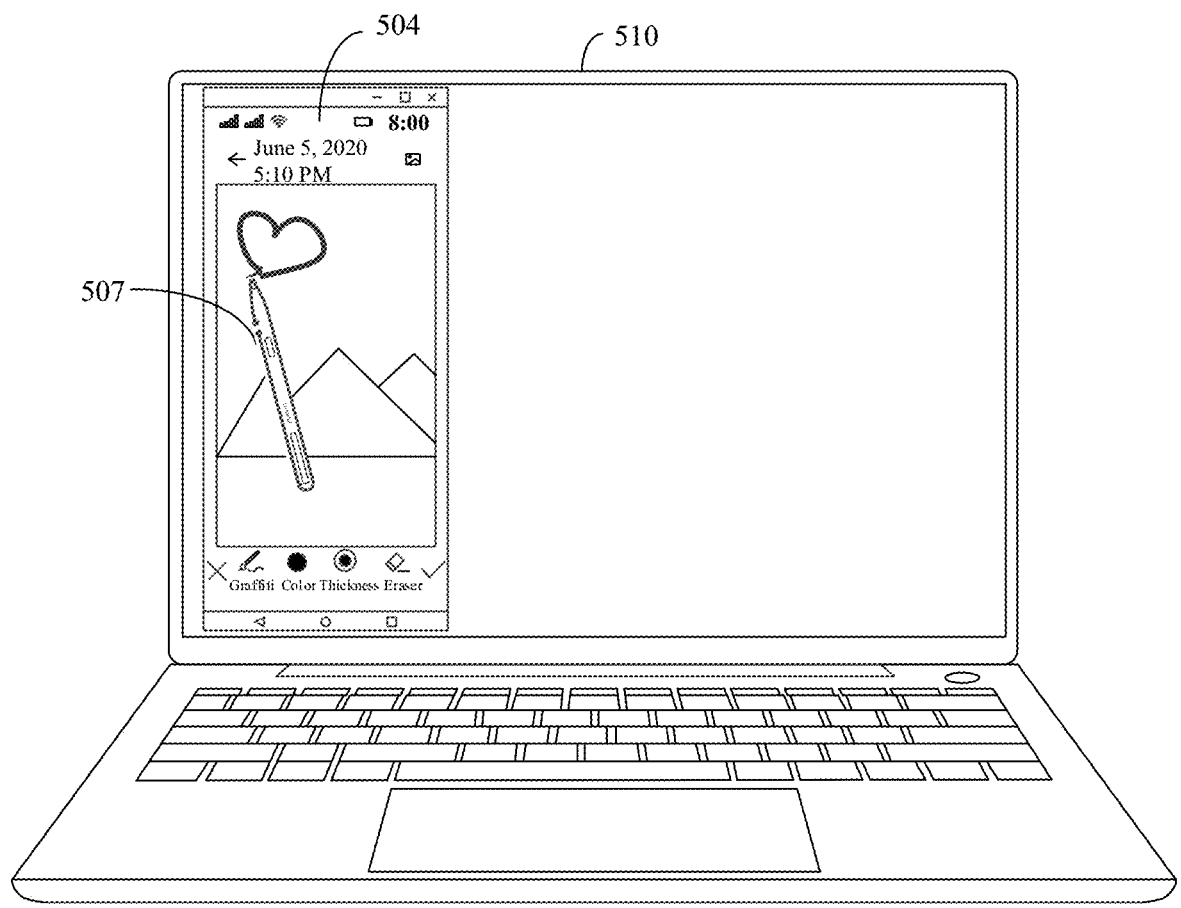

For example, in the foregoing reverse control scenario, the first electronic device is a mobile phone and the second electronic device is a notebook computer. As shown in FIG. 15(a)-1 and FIG. 15(a)-2, a first interface image 501 displayed by a mobile phone 300 is an editing interface image for editing a picture, and the mobile phone 300 indicates (or triggers) a notebook computer 510 to display a first projection interface 502. As shown in FIG. 15(b)-1 and FIG. 15(b)-2, the notebook computer 510 is connected to a stylus 507 in a wireless manner, and the notebook computer 510 receives an update operation of a user on the first interface image by using the stylus 507, for example, a drawing operation in which the user draws a heart on a display of the mobile phone 300 by using the stylus 507. Then, in response to the drawing operation, the mobile phone 300 sequentially displays M frames of interface images in a process of drawing the heart, and displays an interface image 503 including the heart. In addition, the mobile phone 300 sends first encoded information or second encoded information of each frame of interface image to the notebook computer 510. Because the mobile phone 300 may encode only content that is in each frame of interface image and that is different from a previous frame of interface image of each frame of interface image when each frame of interface image differs slightly from the previous frame of interface image, to obtain first encoded data, and transmit the first encoded information including the first encoded data to the second electronic device, time spent on encoding and decoding and transmission duration of the encoded data are reduced. Therefore, the notebook computer 510 displays a projection interface 504 including the heart quickly by using the received first encoded information or the received second encoded information.

Figure 16A:
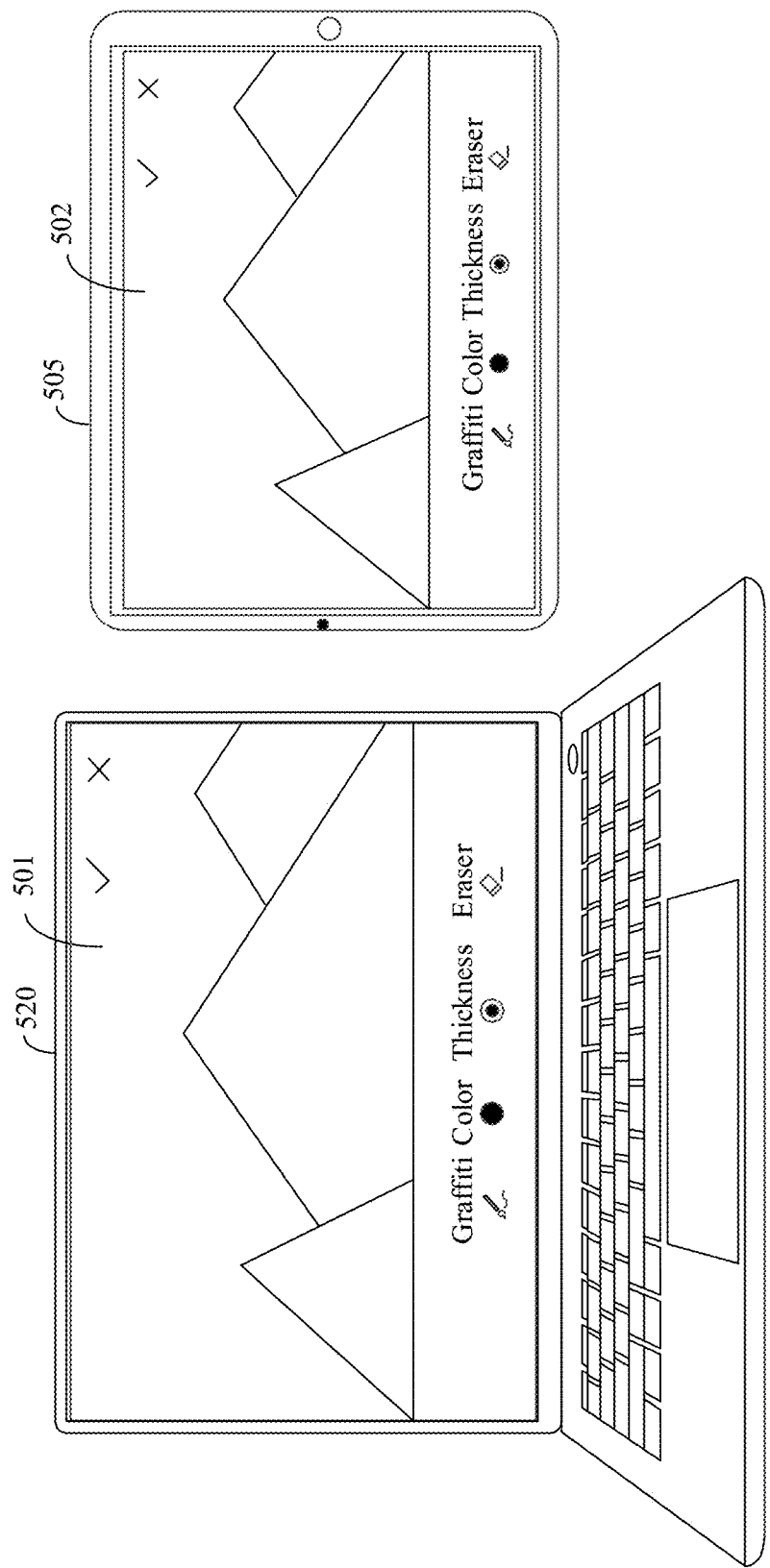
FIG. 16(a) and FIG. 16(b) each are a schematic diagram 2 of multi-screen display in a reverse control scenario according to an embodiment of this application.
Figure 16B:
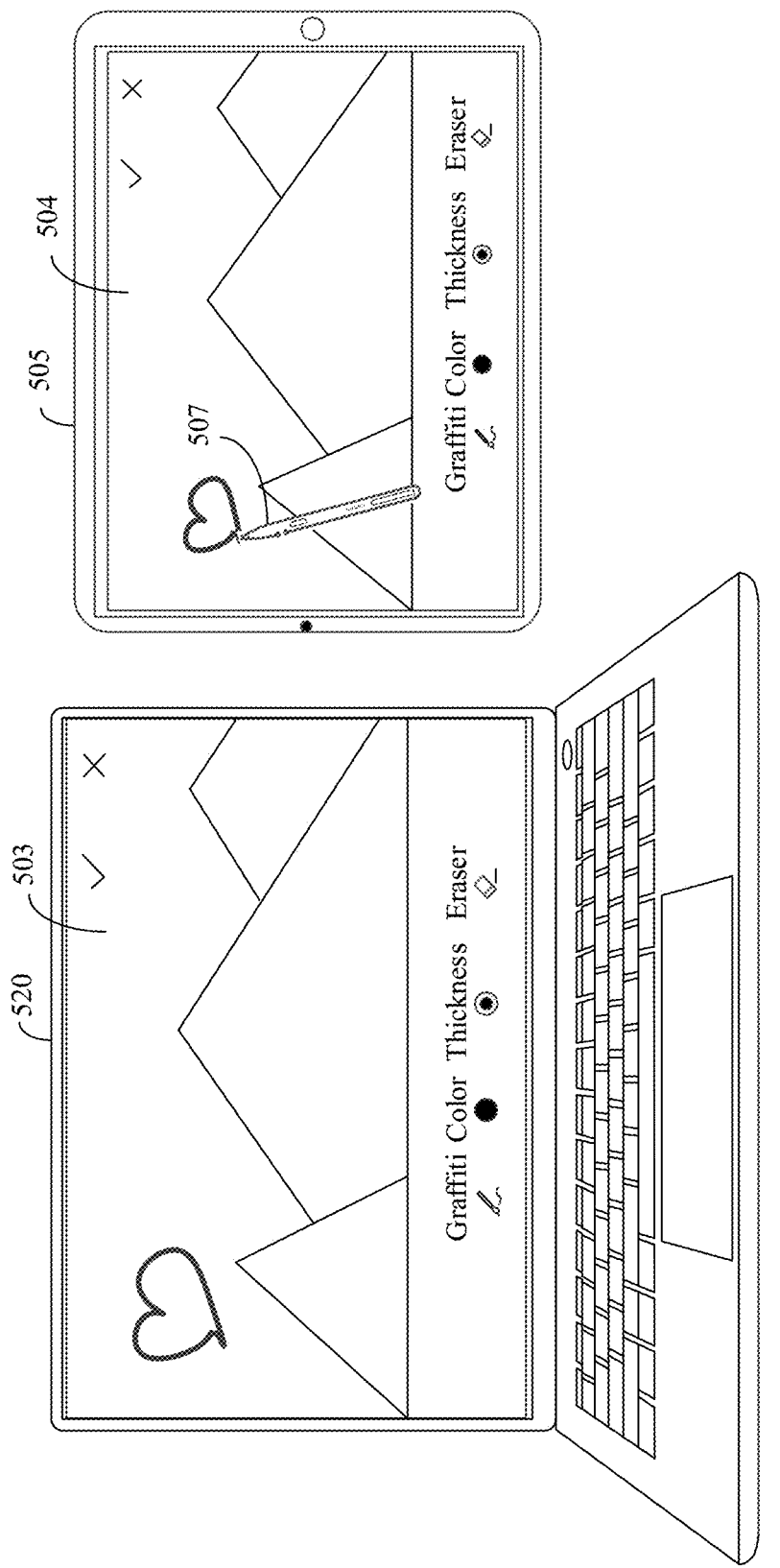

For example, in the foregoing reverse control scenario, the first electronic device is a notebook computer and the second electronic device is a tablet computer. As shown in FIG. 16(a), a first interface image 501 displayed by a notebook computer 520 is an editing interface image for editing a picture, and the notebook computer 520 indicates (or triggers) a tablet computer 505 to display a first projection interface 502. As shown in FIG. 16(b), the tablet computer 505 is connected to a stylus 507 in a wireless manner, and the tablet computer 505 receives an update operation of a user on the first interface image by using the stylus 507, for example, a drawing operation in which the user draws a heart on a display of the notebook computer 520 by using the stylus 507. Then, in response to the drawing operation, the notebook computer 520 sequentially displays M frames of interface images in a process of drawing the heart, and displays an interface image 503 including the heart. At the same time, the notebook computer 520 sends first encoded information or second encoded information of each frame of interface image to the tablet computer 505. Because the notebook computer 520 may encode only content that is in each frame of interface image and that is different from a previous frame of interface image of each frame of interface image when each frame of interface image differs slightly from the previous frame of interface image, to obtain first encoded data, and transmit the first encoded information including the first encoded data to the second electronic device, time spent on encoding and decoding and transmission duration of the encoded data are reduced. Therefore, the tablet computer 505 displays a projection interface 504 including the heart quickly by using the received first encoded information or the received second encoded information.

For example, as shown in Table 2, in the reverse control scenario, when displaying the first interface image, the first electronic device receives the update instruction from the second electronic device. The first electronic device displays, by using a conventional technology (for example, an H.264 encoding technology), the M frames of interface images in response to the update instruction, and indicates (or triggers) the second electronic device to display the M frames of interface images; measures that a frame rate (that is, a projection frame rate) at which the second electronic device displays the M frames of interface images is equal to 48 FPS in a process in which the second electronic device displays the M frames of interface images; and further measures that duration required by the second electronic device from receiving the update operation to displaying the M frames of interface images is 130 ms, that is, duration of reverse control performed by the first electronic device on the second electronic device is 130 ms. In a same scenario, the first electronic device displays the M frames of interface images in response to the update instruction by using the method provided in this embodiment of this application, and indicates (or triggers) the second electronic device to display the M frames of interface images; measures that a frame rate (that is, a projection frame rate) at which the second electronic device displays the M frames of interface images is equal to 60 FPS in a process in which the second electronic device displays the M frames of interface images; and further measures that duration required by the second electronic device from receiving the update operation to displaying the M frames of interface images is 58 ms, that is, duration of reverse control performed by the first electronic device on the second electronic device is 58 ms.

TABLE 2

|  | Projection frame rate | Duration of reverse control |
| --- | --- | --- |
| H.264 encoding technology | 48 FPS | 130 ms |
| Method provided in this embodiment of this application | 60 FPS | 58 ms |

It can be learned that, according to the method provided in this embodiment of this application, a delay in reverse control performed by the first electronic device on the second electronic device is shorter, and the frame rate at which the second electronic device displays the M frames of interface images is equal to 60 FPS, which indicates that no frame freezing occurs when the second electronic device updates the interface image.

Figure 17A:
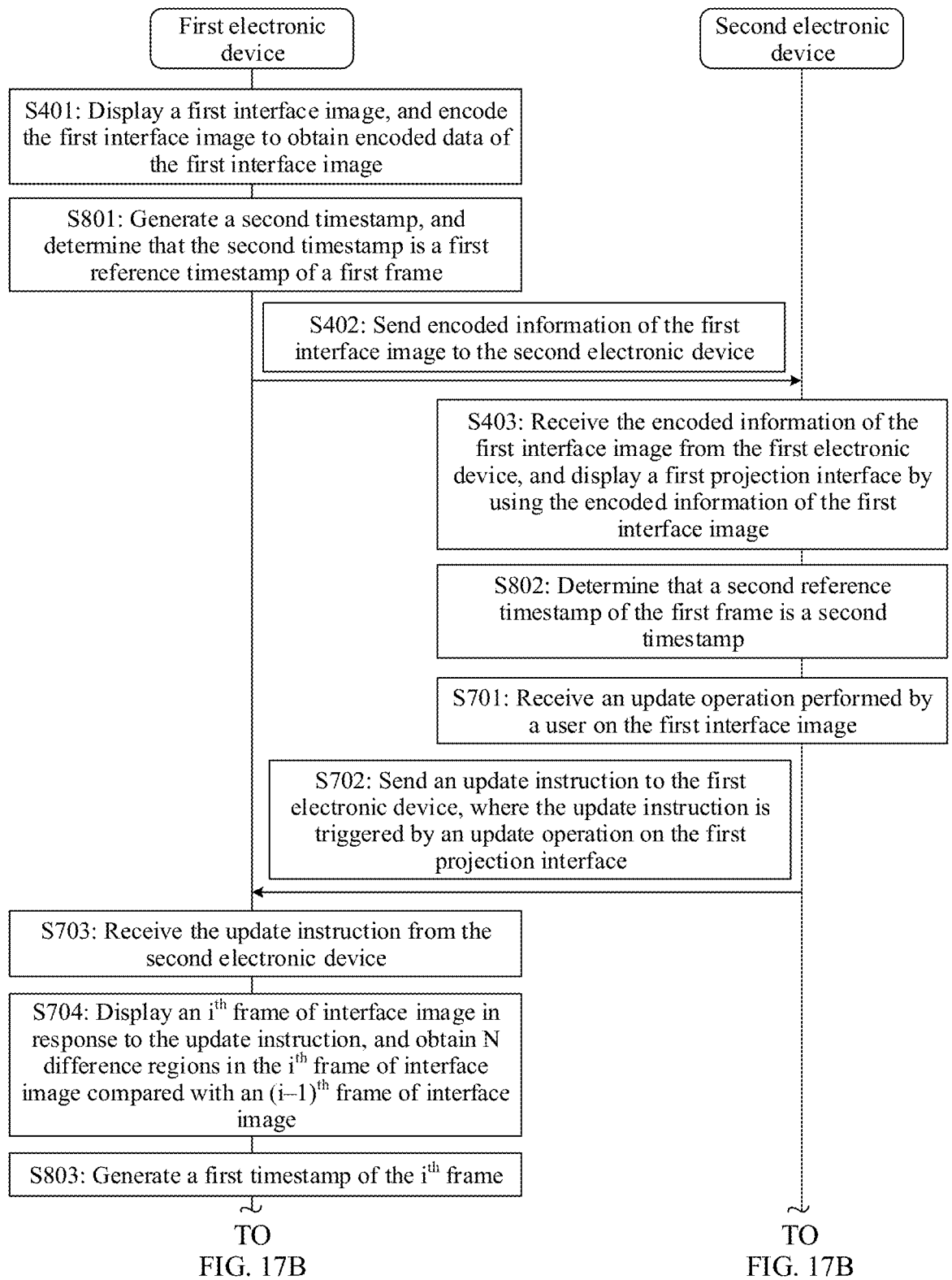
FIG. 17A to FIG. 17C are a flowchart 2 of a multi-screen collaborative display method in a reverse control scenario according to an embodiment of this application.
Figure 17B:
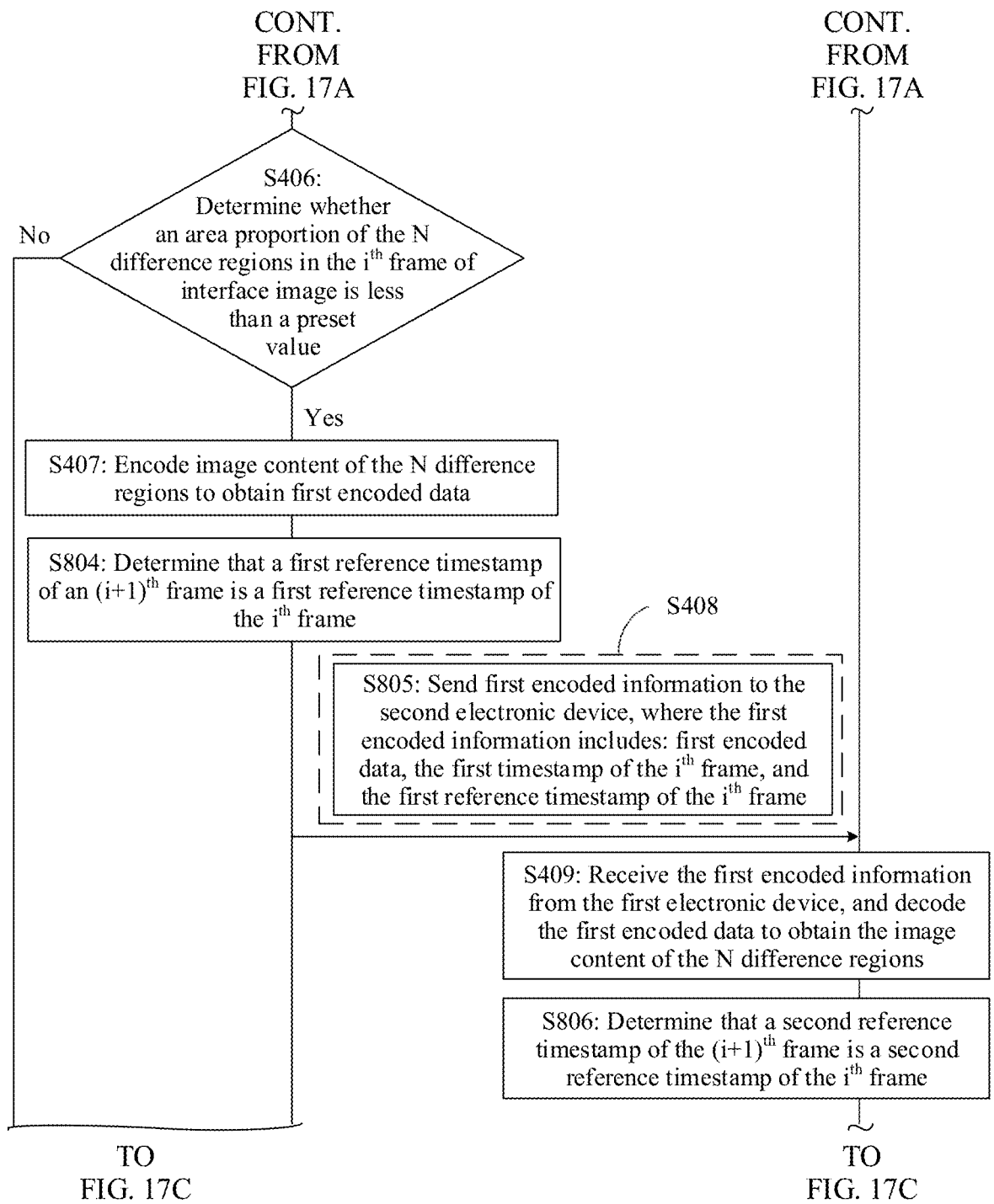
Figure 17C:
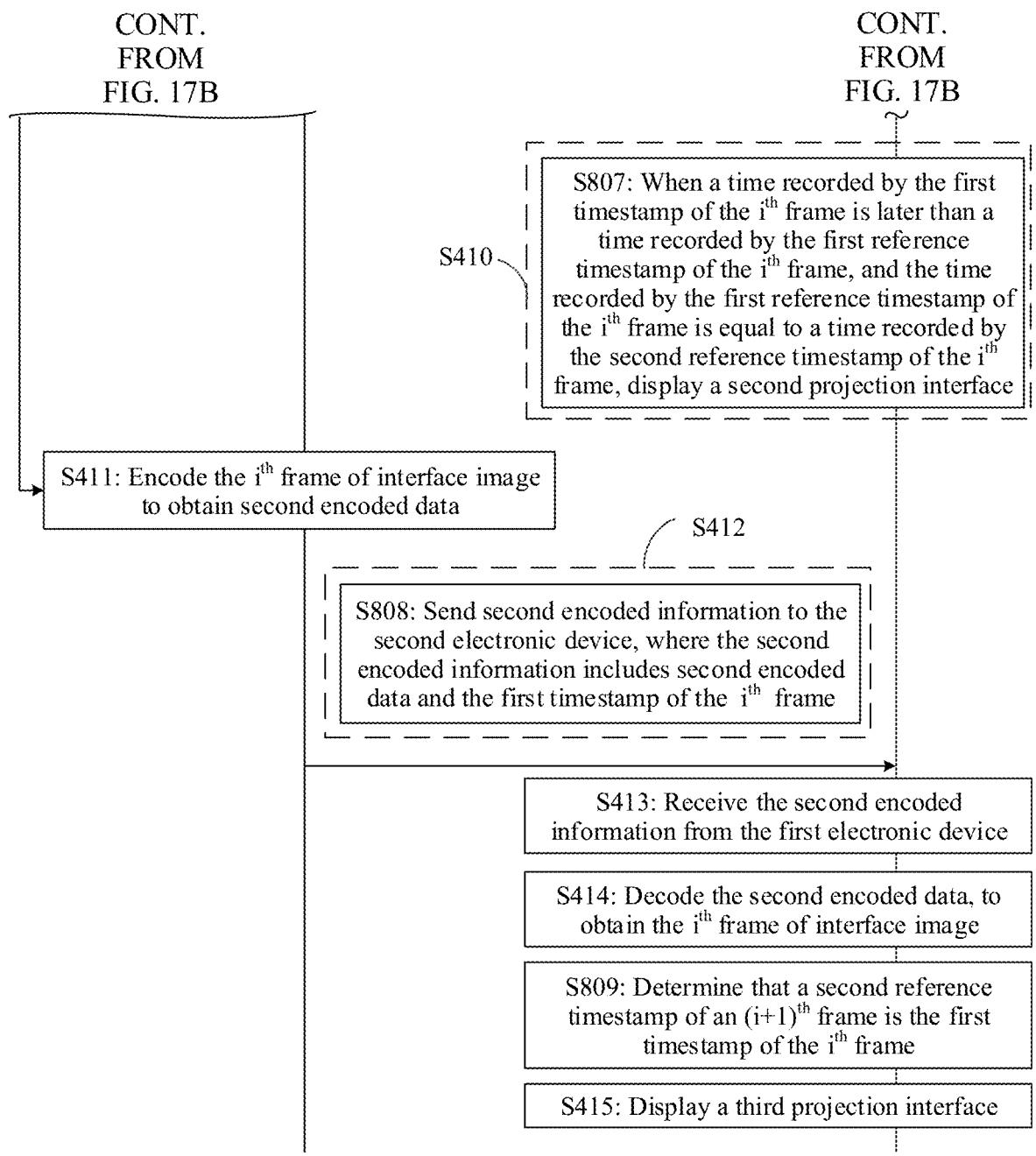

Refer to FIG. 17A to FIG. 17C. An embodiment of this application provides a multi-screen collaborative display method. The method is applied to a first electronic device and a second electronic device in the foregoing reverse control scenario. The first electronic device is connected to the second electronic device. As shown in FIG. 17A to FIG. 17C, after S401 and before S402, the display method may include S801. After S403, the display method may include S802. After S704, the display method may include S803. After S407 and before S408, the display method may include S804. S408 in the display method may include S805. After S409, the display method may include S806. S410 in the display method may include S807. S412 in the display method may include S808. After S414, the display method may include S809.

S801: The first electronic device generates a second timestamp, and determines that the second timestamp is a first reference timestamp of a first frame.

The second timestamp is used to record a time at which the first electronic device generates the first interface image. The first reference timestamp is a reference time at which the first electronic device records projection.

S802: The second electronic device determines that a second reference timestamp of the first frame is a second timestamp.

S803: The first electronic device generates a first timestamp of the $i^{th}$ frame.

S804: The first electronic device determines that a first reference timestamp of an $(i+1)^{th}$ frame is a first reference timestamp of the $i^{th}$ frame.

S805: The first electronic device sends first encoded information to the second electronic device, where the first encoded information includes: first encoded data, the first timestamp of the $i^{th}$ frame, and the first reference timestamp of the $i^{th}$ frame.

The first encoded information further includes location information of N difference regions in the $i^{th}$ frame of interface image compared with the $(i-1)^{th}$ frame of interface image (namely, location information of the N difference regions in the $i^{th}$ frame of interface image).

S806: The second electronic device determines that a second reference timestamp of the $(i+1)^{th}$ frame is a second reference timestamp of the $i^{th}$ frame.

S807: When a time recorded by the first timestamp of the $i^{th}$ frame is later than a time recorded by the first reference timestamp of the $i^{th}$ frame, and the time recorded by the first reference timestamp of the $i^{th}$ frame is equal to a time recorded by the second reference timestamp of the $i^{th}$ frame, the second electronic device displays a second projection interface.

S808: The first electronic device sends second encoded information to the second electronic device, where the second encoded information includes second encoded data and the first timestamp of the $i^{th}$ frame.

S809: The second electronic device determines that a second reference timestamp of an $(i+1)^{th}$ frame is the first timestamp of the $i^{th}$ frame.

It may be understood that the foregoing method may be implemented by a multi-screen collaborative display apparatus. To implement the foregoing functions, the multi-screen collaborative display apparatus includes a corresponding hardware structure and/or software module for performing each function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 18:
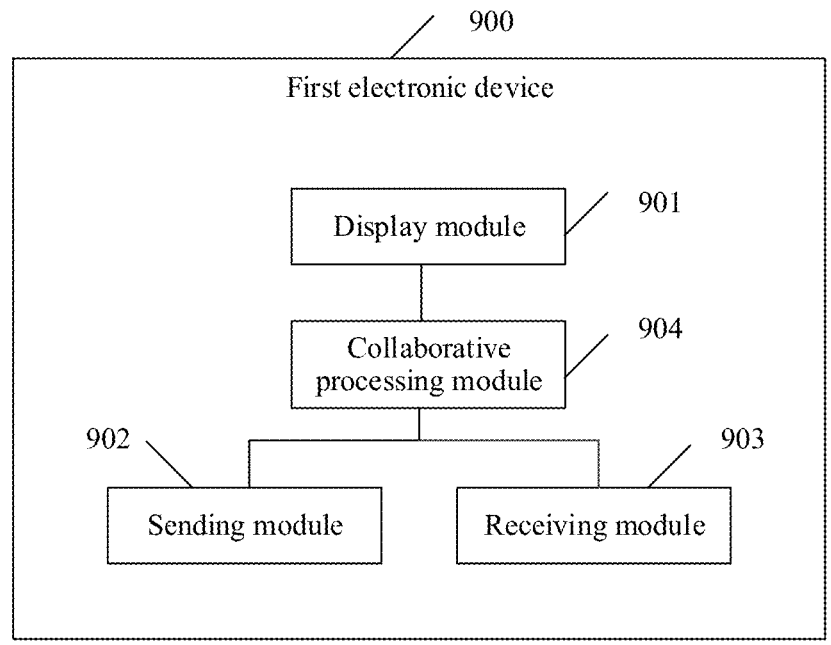
FIG. 18 is a schematic diagram of a structure of a first electronic device according to an embodiment of this application.

When each function module is obtained through division corresponding to each function, FIG. 18 is a possible schematic diagram of a structure of the first electronic device in the foregoing embodiments. The first electronic device 900 is connected to a second electronic device. The first electronic device 900 includes a display module 901, a sending module 902, a receiving module 903, and a collaborative processing module 904. The display module 901 is configured to display a first interface image. The collaborative processing module 904 is configured to encode the first interface image to obtain encoded data of the first interface image. The sending module 902 is configured to send encoded information of the first interface image to the second electronic device. The receiving module 903 is configured to receive an update operation on the first interface image, where the update operation is used to trigger the first electronic device 900 to sequentially display M frames of interface images, and M is a positive integer. The collaborative processing module 904 is further configured to: in response to the update operation, display an $i^{th}$ frame of interface image, and obtain N difference regions in the $i^{th}$ frame of interface image compared with an $(i-1)^{th}$ frame of interface image, and encode image content of the N difference regions to obtain first encoded data if an area proportion of the N difference regions in the $i^{th}$ frame of interface image is less than a preset value. The sending module 902 is further configured to send first encoded information to the second electronic device.

The encoded information of the first interface image includes the encoded data of the first interface image. The encoded information of the first interface image is used to trigger the second electronic device to display a first projection interface based on the encoded information of the first interface image, and content of the first projection interface is a mirror image of the first interface image. The first encoded information includes the first encoded data and location information of the N difference regions in the $i^{th}$ frame of interface image. The first encoded information is used to trigger the second electronic device to update, based on the first encoded information, the $(i-1)^{th}$ frame of interface image to obtain a second projection interface and display the second projection interface, where content of the second projection interface is a mirror image of the $i^{th}$ frame of interface image. i is sequentially set to values in $\{1, \ldots, M\}$. An interface image of frame 0 is the first interface image. A pixel value of a pixel in the N difference regions is different from a pixel value of a corresponding pixel in the $(i-1)^{th}$ frame of interface image, where N is a positive integer.

In a possible implementation, that the receiving module 903 is configured to receive an update operation on the first interface image includes: The receiving module 903 is specifically configured to receive an update instruction from the second electronic device, or receive the update operation performed by a user on the first interface image displayed by the first electronic device 900. The update instruction is triggered by an update operation on the first projection screen.

In another possible implementation, that the collaborative processing module 904 is configured to obtain N difference regions in the $i^{th}$ frame of interface image compared with an $(i-1)^{th}$ frame of interface image includes: The collaborative processing module 904 is specifically configured to compare a pixel value of each pixel in the $i^{th}$ frame of interface image with a pixel value of a corresponding pixel in the $(i-1)^{th}$ frame of interface image, to obtain a difference pixel in the $i^{th}$ frame of interface image; and determine the N difference regions including the difference pixel in the $i^{th}$ frame of interface image. A pixel value of the difference pixel is different from the pixel value of the corresponding pixel in the $(i-1)^{th}$ frame of interface image.

In another possible implementation, the collaborative processing module 904 is further configured to: if the area proportion of the N difference regions in the $i^{th}$ frame of interface image is greater than the preset value, encode the $i^{th}$ frame of interface image, to obtain second encoded data. The sending module 902 is further configured to send second encoded information to the second electronic device. The second encoded information includes the second encoded data, the second encoded information is used to trigger the second electronic device to display a third projection interface based on the second encoded information, and content of the third projection interface is a mirror image of the $i^{th}$ frame of interface image.

In another possible implementation, the collaborative processing module 904 is further configured to generate a first timestamp of the $i^{th}$ frame in response to the update operation, where the first timestamp of the $i^{th}$ frame is used to record a time at which the first electronic device generates the $i^{th}$ frame of interface image, and the second encoded information further includes the first timestamp of the $i^{th}$ frame.

In another possible implementation, the collaborative processing module 904 is further configured to: generate a second timestamp, and save the second timestamp; and if the area proportion of the N difference regions in the $i^{th}$ frame of interface image is greater than the preset value, determine that a first reference timestamp of an $(i+1)^{th}$ frame is the first timestamp of the $i^{th}$ frame; or if the area proportion of the N difference regions in the $i^{th}$ frame of interface image is less than the preset value, determine that the first reference timestamp of the $(i+1)^{th}$ frame is a first reference timestamp of the $i^{th}$ frame. The second timestamp is used to record a time at which the first electronic device generates the first interface image, the second timestamp is a first reference timestamp of a first frame, and the first reference timestamp is a reference time at which the first electronic device records projection. The first encoded information further includes the first timestamp of the $i^{th}$ frame and the first reference timestamp of the $i^{th}$ frame.

An embodiment of this application further provides an electronic device, and the electronic device is a first electronic device. The first electronic device may include a processor and a memory. The memory is configured to store computer program code, and the computer program code includes computer instructions. The processor is configured to run the computer instructions, so that the first electronic device is enabled to perform functions or steps performed by the mobile phone 300 or the notebook computer 520 in the foregoing method embodiments. For another hardware structure of the first electronic device, refer to detailed descriptions of the mobile phone 300 shown in FIG. 6 in the foregoing embodiment. Details are not described herein in this embodiment of this application.

Figure 19:
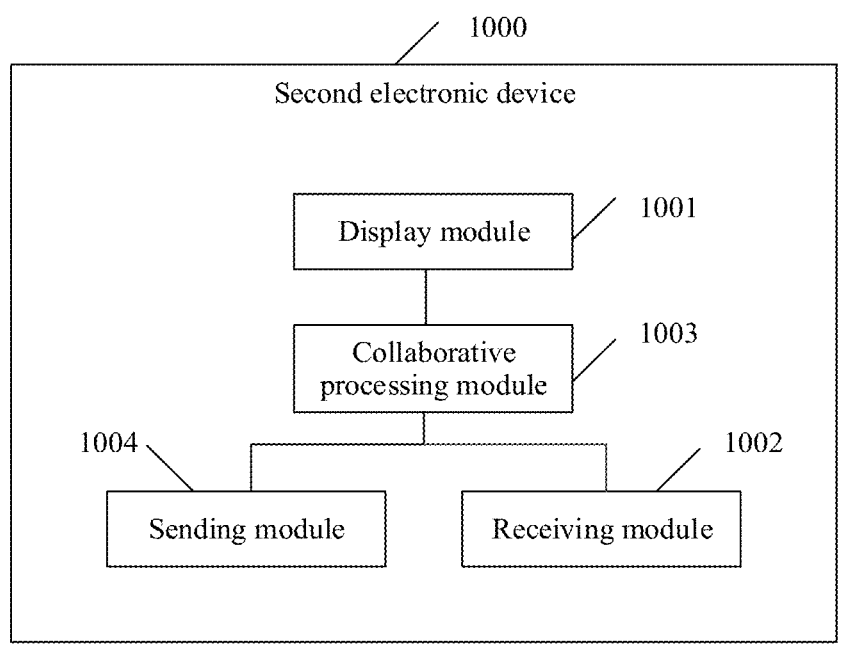
FIG. 19 is a schematic diagram of a structure of a second electronic device according to an embodiment of this application.

When each function module is obtained through division corresponding to each function, FIG. 19 is a possible schematic diagram of a structure of the second electronic device in the foregoing embodiments. The second electronic device 1000 is connected to a first electronic device. The second electronic device 1000 includes a display module 1001, a receiving module 1002, and a collaborative processing module 1003. The display module 1001 is configured to display a first projection interface, where content of the first projection screen interface is a mirror image of a first interface image displayed by a first electronic device. The receiving module 1002 is configured to receive first encoded information from the first electronic device, where the first encoded information includes first encoded data and location information of N difference regions in the $i^{th}$ frame of interface image compared with an $(i-1)^{th}$ frame of interface image. The collaborative processing module 1003 is configured to decode the first encoded data to obtain the image content of the N difference regions. The display module 1001 is further configured to display a second projection interface.

The $i^{th}$ frame of interface image is generated by the first electronic device in response to an update operation, the update operation is used to trigger the first electronic device to sequentially display M frames of interface images, M is a positive integer, i is sequentially set to values in $\{1, \ldots, M\}$, and an interface image of frame 0 is the first interface image. A pixel value of a pixel in the N difference regions is different from a pixel value of a corresponding pixel in the $(i-1)^{th}$ frame of interface image, where N is a positive integer. The first encoded data is obtained by encoding image content of the N difference regions. Content of the second projection interface is a mirror image of the $i^{th}$ frame of interface image, and the $i^{th}$ frame of interface image is obtained by updating the $(i-1)^{th}$ frame of interface image based on the image content of the N difference regions and the location information.

In a possible implementation, the second electronic device 1000 further includes a sending module 1004. The receiving module 1002 is further configured to: before receiving the first encoded information from the first electronic device, receive the update operation performed by a user on the first projection interface. The sending module 1004 is configured to send an update instruction to the first electronic device in response to the update operation, where the update instruction is used to trigger the first electronic device to sequentially display the M frames of interface images.

The sending module receives, by using an external device connected to the second electronic device 1000, the update operation on the first projection interface, where the external device includes any one of a display, a remote control, a mouse, or a stylus of the second electronic device 1000.

In another possible implementation, the receiving module 1002 is further configured to receive second encoded information from the first electronic device, where the second encoded information includes second encoded data, and the second encoded data is obtained by encoding the $i^{th}$ frame of interface image. The collaborative processing module 1003 is further configured to decode the second encoded data to obtain the $i^{th}$ frame of interface image. The display module 1001 is further configured to display a third projection interface, where content of the third projection interface is the mirror image of the $i^{th}$ frame of interface image.

In another possible implementation, the second encoded information further includes a first timestamp of the $i^{th}$ frame, and the first timestamp of the $i^{th}$ frame is used to record a time at which the first electronic device generates the $i^{th}$ frame of interface image. The collaborative processing module 1003 is further configured to: after the receiving module receives second encoded information from the first electronic device, determine that a second reference timestamp of an $(i+1)^{th}$ frame is the first timestamp of the $i^{th}$ frame, where the second reference timestamp is a reference time at which the second electronic device records projection.

In another possible implementation, the first encoded information further includes the first timestamp of the $i^{th}$ frame and a first reference timestamp of the $i^{th}$ frame, where the first reference timestamp is a reference time at which the first electronic device records projection. The collaborative processing module 1003 is further configured to: after the receiving module receives the first encoded information from the first electronic device, and before decoding the first encoded data to obtain the image content of the N difference regions, determine that a time recorded by the first timestamp of the $i^{th}$ frame is later than a time recorded by the first reference timestamp of the $i^{th}$ frame, and the time recorded by the first reference timestamp of the $i^{th}$ frame is equal to a time recorded by a second reference timestamp of the $i^{th}$ frame.

An embodiment of this application further provides an electronic device, and the electronic device is a second electronic device. The second electronic device includes a processor and a memory. The memory is configured to store computer program code, and the computer program code includes computer instructions. The processor is configured to run the computer instructions, so that the second electronic device is enabled to perform functions or steps performed by the notebook computer 510 or the tablet computer 505 in the foregoing method embodiments. For another hardware structure of the second electronic device, refer to detailed descriptions of the mobile phone 300 shown in FIG. 6 in the foregoing embodiment. Details are not described herein in this embodiment of this application.

Another embodiment of this application provides a computer-readable storage medium, where the computer-readable storage medium stores computer instructions, and when the computer instructions are run on a first electronic device (for example, the mobile phone 300 shown in any one of FIG. 6, FIG. 8(a)-1 to FIG. 8(b)-2, and FIG. 15(a)-1 to FIG. 15(b)-2, the notebook computer 520 shown in FIG. 9(a) and FIG. 9(b) or FIG. 16(a) and FIG. 16(b), and the first electronic device 900 shown in FIG. 18), the first electronic device is enabled to perform functions or steps performed by the mobile phone 300, the notebook computer 520, or the first electronic device 900 in the foregoing method embodiments. For example, the computer-readable storage medium may be a read-only memory (ROM), a random access memory (RAM), a compact disc read-only memory (CD-ROM), a tape, a floppy disk, an optical data storage device, or the like.

Another embodiment of this application provides a computer program product, including one or more instructions, where the one or more instructions may be run on a first electronic device (for example, the mobile phone 300 shown in any one of FIG. 6, FIG. 8(a)-1 to FIG. 8(b)-2, and FIG. 15(a)-1 to FIG. 15(b)-2, the notebook computer 520 shown in FIG. 9(a) and FIG. 9(b) or FIG. 16(a) and FIG. 16(b), and the first electronic device 900 shown in FIG. 18), so that the first electronic device is enabled to perform functions or steps performed by the mobile phone 300, the notebook computer 520, or the first electronic device 900 in the foregoing method embodiments.

Another embodiment of this application provides a computer-readable storage medium, where the computer-readable storage medium stores computer instructions, and when the computer instructions are run on a second electronic device (for example, the notebook computer 510 shown in FIG. 8(a)-1 to FIG. 8(b)-2 or FIG. 15(a)-1 to FIG. 15(b)-2, the tablet computer 505 shown in FIG. 9(a) and FIG. 9(b) or FIG. 16(a) and FIG. 16(b), and the second electronic device 1000 shown in FIG. 19), the second electronic device is enabled to perform functions or steps performed by the notebook computer 510, the tablet computer 505, or the second electronic device 1000 in the foregoing method embodiments. For example, the computer-readable storage medium may be a ROM, a RAM, a CD-ROM, a magnetic tape, a floppy disk, or an optical data storage device.

Another embodiment of this application provides a computer program product, including one or more instructions, where the one or more instructions may be run on a second electronic device (for example, the notebook computer 510 shown in FIG. 8(a)-1 to FIG. 8(b)-2 or FIG. 15(a)-1 to FIG. 15(b)-2, the tablet computer 505 shown in FIG. 9(a) and FIG. 9(b) or FIG. 16(a) and FIG. 16(b), and the second electronic device 1000 shown in FIG. 19), so that the second electronic device is enabled to perform functions or steps performed by the notebook computer 510, the tablet computer 505, or the second electronic device 1000 in the foregoing method embodiments.

Based on the foregoing descriptions of the implementations, a person skilled in the art may clearly understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multi-screen collaborative display method, applied to a first electronic device, wherein the first electronic device is connected to a second electronic device, and the method comprises:

displaying, by the first electronic device, a first interface image;

encoding, by the first electronic device, the first interface image to obtain encoded data of the first interface image;

sending, by the first electronic device, encoded information of the first interface image to the second electronic device, wherein the encoded information of the first interface image comprises the encoded data of the first interface image, the encoded information of the first interface image is used to trigger the second electronic device to display a first projection interface based on the encoded information of the first interface image, and content of the first projection interface is a mirror image of the first interface image;

receiving, by the first electronic device, an update operation on the first interface image, wherein the update operation is used to trigger the first electronic device to sequentially display M frames of interface images, and M is a positive integer;

displaying, by the first electronic device in response to the update operation, an $i^{th}$ frame of interface image;

obtaining, by the first electronic device, N difference regions in the $i^{th}$ frame of interface image compared with an $(i-1)^{th}$ frame of interface image, wherein i is sequentially set to values in $\{1, \ldots, M\}$, a $0^{th}$ frame of interface image is the first interface image, a pixel value of a pixel in the N difference regions is different from a pixel value of a corresponding pixel in the $(i-1)^{th}$ frame of interface image, and N is a positive integer;

in response to determining that an area proportion of the N difference regions in the $i^{th}$ frame of interface image is less than a preset value, encoding, by the first electronic device, image content of the N difference regions to obtain first encoded data; and sending, by the first electronic device, first encoded information to the second electronic device, wherein the first encoded information comprises the first encoded data and location information of the N difference regions in the $i^{th}$ frame of interface image, the first encoded information is used to trigger the second electronic device to update, based on the first encoded information, the $(i-1)^{th}$ frame of interface image to obtain a second projection interface and display the second projection interface, and content of the second projection interface is a mirror image of the $i^{th}$ frame of interface image.

2. The method according to claim 1, wherein the receiving, by the first electronic device, an update operation on the first interface image comprises:

receiving, by the first electronic device, an update instruction from the second electronic device, wherein the update instruction is triggered by an update operation on the first projection interface; or receiving, by the first electronic device, the update operation performed by a user on the first interface image displayed by the first electronic device.

3. The method according to claim 1, wherein the obtaining N difference regions in the $i^{th}$ frame of interface image compared with an $(i-1)^{th}$ frame of interface image comprises:

comparing, by the first electronic device, a pixel value of each pixel in the $i^{th}$ frame of interface image with a pixel value of a corresponding pixel in the $(i-1)^{th}$ frame of interface image, to obtain a difference pixel in the $i^{th}$ frame of interface image, wherein a pixel value of the difference pixel is different from the pixel value of the corresponding pixel in the $(i-1)^{th}$ frame of interface image; and determining, by the first electronic device, the N difference regions comprising the difference pixel in the $i^{th}$ frame of interface image.

4. The method according to claim 2, wherein the obtaining N difference regions in the $i^{th}$ frame of interface image compared with an $(i-1)^{th}$ frame of interface image comprises:

comparing, by the first electronic device, a pixel value of each pixel in the $i^{th}$ frame of interface image with a pixel value of a corresponding pixel in the $(i-1)^{th}$ frame of interface image, to obtain a difference pixel in the $i^{th}$ frame of interface image, wherein a pixel value of the difference pixel is different from the pixel value of the corresponding pixel in the $(i-1)^{th}$ frame of interface image; and determining, by the first electronic device, the N difference regions comprising the difference pixel in the $i^{th}$ frame of interface image.

5. The method according to claim 1, wherein the method further comprises:

in response to determining that the area proportion of the N difference regions in the $i^{th}$ frame of interface image is greater than the preset value, encoding, by the first electronic device, the $i^{th}$ frame of interface image to obtain second encoded data; and sending, by the first electronic device, second encoded information to the second electronic device, wherein the second encoded information comprises the second encoded data, the second encoded information is used to trigger the second electronic device to display a third projection interface based on the second encoded information, and content of the third projection interface is the mirror image of the $i^{th}$ frame of interface image.

6. The method according to claim 5, wherein the method further comprises:
generating, by the first electronic device, a first timestamp of the $i^{th}$ frame in response to the update operation, wherein the first timestamp of the $i^{th}$ frame is used to record a time at which the first electronic device generates the $i^{th}$ frame of interface image, and the second encoded information further comprises the first timestamp of the $i^{th}$ frame.

7. The method according to claim 1, wherein the method further comprises:
generating, by the first electronic device, a second timestamp;
saving the second timestamp, wherein the second timestamp is used to record a time at which the first electronic device generates the first interface image, the second timestamp is a first reference timestamp of a first frame, and the first reference timestamp is a reference time at which the first electronic device records projection, wherein the first encoded information further comprises a first timestamp of the $i^{th}$ frame and the first reference timestamp of the $i^{th}$ frame; and
in response to determining that the area proportion of the N difference regions in the $i^{th}$ frame of interface image is greater than the preset value, determining, by the first electronic device, that a first reference timestamp of an $(i+1)^{th}$ frame is the first timestamp of the $i^{th}$ frame; or
in response to determining that the area proportion of the N difference regions in the $i^{th}$ frame of interface image is less than the preset value, determining, by the first electronic device, that the first reference timestamp of the $(i+1)^{th}$ frame is a first reference timestamp of the $i^{th}$ frame.

8. A first electronic device comprising:
at least one processor; and
one or more memories coupled to the at least one processor and storing programming instructions for execution by the at least one processor to perform operations comprising:
displaying a first interface image;
encoding the first interface image to obtain encoded data of the first interface image, the first electronic device is connected to a second electronic device;
sending encoded information of the first interface image to the second electronic device, wherein the encoded information of the first interface image comprises the encoded data of the first interface image, the encoded information of the first interface image is used to trigger the second electronic device to display a first projection interface based on the encoded information of the first interface image, and content of the first projection interface is a mirror image of the first interface image;
receiving an update operation on the first interface image, wherein the update operation is used to trigger the first electronic device to sequentially display M frames of interface images, and M is a positive integer;
displaying, in response to the update operation, an $i^{th}$ frame of interface image;
obtaining N difference regions in the $i^{th}$ frame of interface image compared with an $(i-1)^{th}$ frame of interface image, wherein i is sequentially set to values in $\{1, \ldots, M\}$, a $0^{th}$ frame of interface image is the first interface image, a pixel value of a pixel in the N difference regions is different from a pixel value of a corresponding pixel in the $(i-1)^{t}$ frame of interface image, and N is a positive integer;
in response to determining that an area proportion of the N difference regions in the $i^{th}$ frame of interface image is less than a preset value, encoding image content of the N difference regions to obtain first encoded data; and
sending first encoded information to the second electronic device, wherein the first encoded information comprises the first encoded data and location information of the N difference regions in the $i^{th}$ frame of interface image, the first encoded information is used to trigger the second electronic device to update, based on the first encoded information, the $(i-1)^{th}$ frame of interface image to obtain a second projection interface and display the second projection interface, and content of the second projection interface is a mirror image of the $i^{th}$ frame of interface image.

9. The first electronic device according to claim 8, wherein the receiving, by the first electronic device, an update operation on the first interface image comprises:
receiving an update instruction from the second electronic device, wherein the update instruction is triggered by an update operation on the first projection interface; or
receiving the update operation performed by a user on the first interface image displayed by the first electronic device.

10. The first electronic device according to claim 8, wherein the obtaining N difference regions in the $i^{th}$ frame of interface image compared with an $(i-1)^{th}$ frame of interface image comprises:
comparing a pixel value of each pixel in the $i^{th}$ frame of interface image with a pixel value of a corresponding pixel in the $(i-1)^{th}$ frame of interface image, to obtain a difference pixel in the $i^{th}$ frame of interface image, wherein a pixel value of the difference pixel is different from the pixel value of the corresponding pixel in the $(i-1)^{th}$ frame of interface image; and
determining the N difference regions comprising the difference pixel in the $i^{th}$ frame of interface image.

11. The first electronic device according to claim 9, wherein the obtaining N difference regions in the $i^{th}$ frame of interface image compared with an $(i-1)^{th}$ frame of interface image comprises:
comparing a pixel value of each pixel in the $i^{th}$ frame of interface image with a pixel value of a corresponding pixel in the $(i-1)^{th}$ frame of interface image, to obtain a difference pixel in the $i^{th}$ frame of interface image, wherein a pixel value of the difference pixel is different from the pixel value of the corresponding pixel in the $(i-1)^{th}$ frame of interface image; and
determining the N difference regions comprising the difference pixel in the it frame of interface image.

12. The first electronic device according to claim 8, wherein the operations further comprise:
in response to determining that the area proportion of the N difference regions in the $i^{th}$ frame of interface image is greater than the preset value, encoding, the $i^{th}$ frame of interface image to obtain second encoded data; and
sending second encoded information to the second electronic device, wherein the second encoded information comprises the second encoded data, the second encoded information is used to trigger the second electronic device to display a third projection interface based on the second encoded information, and content of the third projection interface is the mirror image of the $i^{th}$ frame of interface image.

13. The first electronic device according to claim 12, wherein the operations further comprise:

generating a first timestamp of the $i^{th}$ frame in response to the update operation, wherein the first timestamp of the it frame is used to record a time at which the first electronic device generates the $i^{th}$ frame of interface image, and the second encoded information further comprises the first timestamp of the $i^{th}$ frame.

14. The first electronic device according to claim 8, wherein the operations further comprise:

generating a second timestamp;

saving the second timestamp, wherein the second timestamp is used to record a time at which the first electronic device generates the first interface image, the second timestamp is a first reference timestamp of a first frame, and the first reference timestamp is a reference time at which the first electronic device records projection, wherein the first encoded information further comprises a first timestamp of the $i^{th}$ frame and the first reference timestamp of the $i^{th}$ frame; and in response to determining that the area proportion of the N difference regions in the $i^{th}$ frame of interface image is greater than the preset value, determining that a first reference timestamp of an $(i+1)^{th}$ frame is the first timestamp of the $i^{th}$ frame; or in response to determining that the area proportion of the N difference regions in the $i^{th}$ frame of interface image is less than the preset value, determining that the first reference timestamp of the $(i+1)^{th}$ frame is a first reference timestamp of the $i^{th}$ frame.

15. A second electronic device comprising:

at least one processor; and one or more memories coupled to the at least one processor and storing programming instructions for execution by the at least one processor to perform operations comprising:

displaying a first projection interface, wherein content of the first projection interface is a mirror image of a first interface image displayed by a first electronic device, and the second electronic device is connected to the first electronic device;

receiving first encoded information from the first electronic device, wherein the first encoded information comprises first encoded data and location information of N difference regions in an $i^{th}$ frame of interface image compared with an $(i-1)^{th}$ frame of interface image, a pixel value of a pixel in the N difference regions is different from a pixel value of a corresponding pixel in the $(i-1)^{th}$ frame of interface image, and N is a positive integer, the first encoded data is obtained by encoding image content of the N difference regions, and the $i^{th}$ frame of interface image is generated by the first electronic device in response to an update operation, the update operation is used to trigger the first electronic device to sequentially display M frames of interface images, M is a positive integer, i is sequentially set to values in $\{1, \ldots, M\}$, and a $0^{th}$ frame of interface image is the first interface image;

decoding the first encoded data to obtain the image content of the N difference regions; and displaying a second projection interface, wherein content of the second projection interface is a mirror image of the $i^{th}$ frame of interface image, and the $i^{th}$ frame of interface image is obtained by updating the $(i-1)^{th}$ frame of interface image based on the image content of the N difference regions and the location information.

16. The second electronic device according to claim 15, wherein before the receiving, by the second electronic device, first encoded information from the first electronic device, the operations further comprise:

receiving the update operation performed by a user on the first projection interface; and sending an update instruction to the first electronic device in response to the update operation, wherein the update instruction is used to trigger the first electronic device to sequentially display the M frames of interface images, wherein the second electronic device receives, by using an external device connected to the second electronic device, the update operation on the first projection interface, wherein the external device comprises any one of a display, a remote control, a mouse, or a stylus of the second electronic device.

17. The second electronic device according to claim 15, wherein the operations further comprise:

receiving second encoded information from the first electronic device, wherein the second encoded information comprises second encoded data, and the second encoded data is obtained by encoding the $i^{th}$ frame of interface image;

decoding the second encoded data to obtain the $i^{th}$ frame of interface image; and displaying a third projection interface, wherein content of the third projection interface is the mirror image of the $i^{th}$ frame of interface image.

18. The second electronic device according to claim 17, wherein the second encoded information further comprises a first timestamp of the $i^{th}$ frame, and the first timestamp of the $i^{th}$ frame is used to record a time at which the first electronic device generates the $i^{th}$ frame of interface image, and wherein after the receiving, by the second electronic device, second encoded information from the first electronic device, the operations further comprise:

determining that a second reference timestamp of an $(i+1)^{th}$ frame is the first timestamp of the $i^{th}$ frame, wherein the second reference timestamp is a reference time at which the second electronic device records projection.

19. The second electronic device according to claim 15, wherein the first encoded information further comprises a first timestamp of the $i^{th}$ frame and a first reference timestamp of the $i^{th}$ frame, and the first reference timestamp is a reference time at which the first electronic device records projection, and wherein after the receiving first encoded information from the first electronic device, and before the decoding the first encoded data to obtain the image content of the N difference regions, the operations further comprise:

determining that a time recorded by the first timestamp of the $i^{th}$ frame is later than a time recorded by the first reference timestamp of the $i^{th}$ frame, and the time recorded by the first reference timestamp of the $i^{th}$ frame is equal to a time recorded by a second reference timestamp of the it frame.

20. The second electronic device according to claim 16, wherein the first encoded information further comprises a first timestamp of the $i^{th}$ frame and a first reference timestamp of the it frame, and the first reference timestamp is a reference time at which the first electronic device records projection, and wherein after the receiving first encoded information from the first electronic device, and before the decoding the first encoded data to obtain the image content of the N difference regions, the operations further comprise:
    determining that a time recorded by the first timestamp of the it frame is later than a time recorded by the first reference timestamp of the $i^{th}$ frame, and the time recorded by the first reference timestamp of the $i^{th}$ frame is equal to a time recorded by a second reference timestamp of the $i^{th}$ frame.

* * * * *

UNITED STATES PATENT AND TRADEMARK OFFICE
CERTIFICATE OF CORRECTION

PATENT NO. : 11,977,810 B2
APPLICATION NO. : 18/254472
DATED : May 7, 2024
INVENTOR(S) : Guanqi Peng et al.

It is certified that error appears in the above-identified patent and that said Letters Patent is hereby corrected as shown below:

In the Claims

In Column 46, In Line 1, In Claim 8, delete "(i-1)$^{t}$" and insert -- (i-1)$^{th}$ --.

In Column 46, In Line 53, In Claim 11, delete "it" and insert -- i$^{th}$ --.

In Column 47, In Line 5, In Claim 13, delete "it" and insert -- i$^{th}$ --.

In Column 48, In Line 60, In Claim 19, delete "it" and insert -- i$^{th}$ --.

In Column 48, In Line 64, In Claim 20, delete "it" and insert -- i$^{th}$ --.

In Column 49, In Line 4, In Claim 20, delete "it" and insert -- i$^{th}$ --.

Signed and Sealed this
Twenty-ninth Day of October, 2024

Katherine Kelly Vidal
*Director of the United States Patent and Trademark Office*